US005502766A

United States Patent [19]

Boebert et al.

[11] Patent Number: 5,502,766
[45] Date of Patent: * Mar. 26, 1996

[54] DATA ENCLAVE AND TRUSTED PATH SYSTEM

[75] Inventors: William E. Boebert, Minneapolis; Thomas R. Markham, Anoka; Robert A. Olmsted, Minnetonka, all of Minn.

[73] Assignee: Secure Computing Corporation, Roseville, Minn.

[*] Notice: The portion of the term of this patent subsequent to Apr. 17, 2012, has been disclaimed.

[21] Appl. No.: 142,904

[22] Filed: Oct. 26, 1993

Related U.S. Application Data

[63] Continuation of Ser. No. 870,556, Apr. 17, 1992, Pat. No. 5,276,735.

[51] Int. Cl.$^6$ ...................................................... H04K 1/00
[52] U.S. Cl. ................... 380/25; 380/4; 380/23; 380/49
[58] Field of Search ........................... 380/21, 23, 24, 380/25, 49, 50, 3, 4

[56] References Cited

U.S. PATENT DOCUMENTS

| | | | |
|---|---|---|---|
| 4,227,253 | 10/1980 | Ehrsam et al. | 375/2 |
| 4,238,854 | 12/1980 | Ehrsam et al. | 375/2 |
| 4,264,782 | 4/1981 | Konheim | 178/22 |
| 4,629,872 | 12/1986 | Hällberg | 235/380 |
| 4,652,698 | 3/1987 | Hale et al. | 380/24 |
| 4,713,753 | 12/1987 | Boebert et al. | 380/25 X |
| 4,746,788 | 5/1988 | Kawana | 380/23 X |
| 4,825,050 | 4/1989 | Griffith et al. | 235/379 |
| 4,888,801 | 12/1989 | Foster et al. | 380/21 |
| 4,980,913 | 12/1990 | Skret | 380/23 |
| 5,018,096 | 5/1991 | Aoyama | 364/900 |
| 5,046,094 | 9/1991 | Kawamura et al. | 380/46 |
| 5,052,040 | 9/1991 | Preston et al. | 380/25 X |
| 5,065,429 | 11/1991 | Lang | 380/25 |
| 5,253,295 | 11/1993 | Saada et al. | 380/23 |
| 5,272,754 | 12/1993 | Boerbert | 380/25 |
| 5,276,735 | 1/1994 | Boebert et al. | 380/25 X |

FOREIGN PATENT DOCUMENTS

| | | |
|---|---|---|
| 421409 | 4/1991 | European Pat. Off. . |
| 471538 | 2/1992 | European Pat. Off. . |

OTHER PUBLICATIONS

W. E. Boebert et al., "Secure Computing: The Secure Ada Target Approach," *Lock Selected Papers*, Secure Computing Technology Corp., Arden Hills, Minnesota (1985–1988).

W. E. Boebert et al., "Secure Ada Target: Issues, System Design and Verification," *Proceedings of the Symposium on Security and Privacy*, Oakland, Calif., (Apr. 22–24, 1985).

Thomas Kibalo et al., "Using Embedded COMSEC: An Integrator's Viewpoint," *Proceedings of the 1st AFCEA Mid–Atlantic Intelligence Symposium* (1986).

*Primary Examiner*—David C. Cain
*Attorney, Agent, or Firm*—Schwegman, Lundberg & Woessner

[57] ABSTRACT

A data communication system providing for the secure transfer and sharing of data via a local area network and/or a wide area network. The system includes a secure processing unit which communicates with a personal keying device and a crypto media controller attached to a user's Workstation. The communication between these processing elements generates a variety of data elements including keys, identifiers, and attributes. The data elements are used to identify and authenticate the user, assign user security access rights and privileges, and assign media and device attributes to a data access device according to a predefined security policy. The data elements are manipulated, combined, protected, and distributed through the network to the appropriate data access devices, which prevents the user from obtaining unauthorized data.

11 Claims, 37 Drawing Sheets

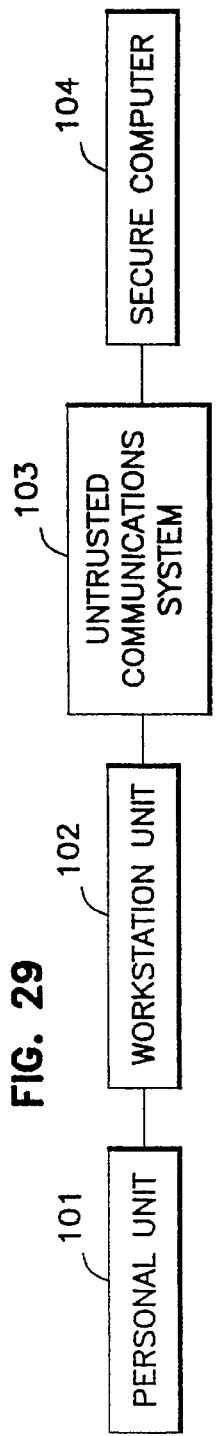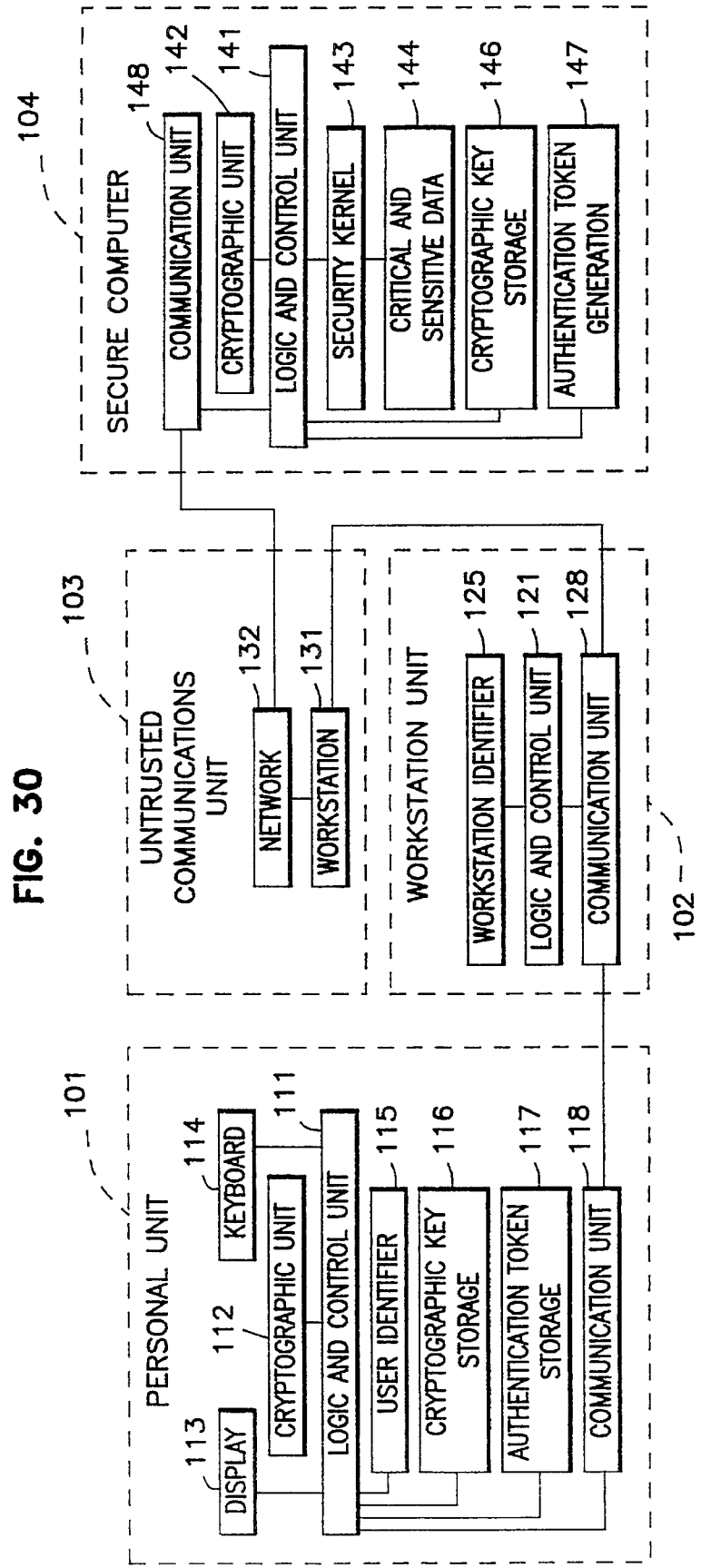

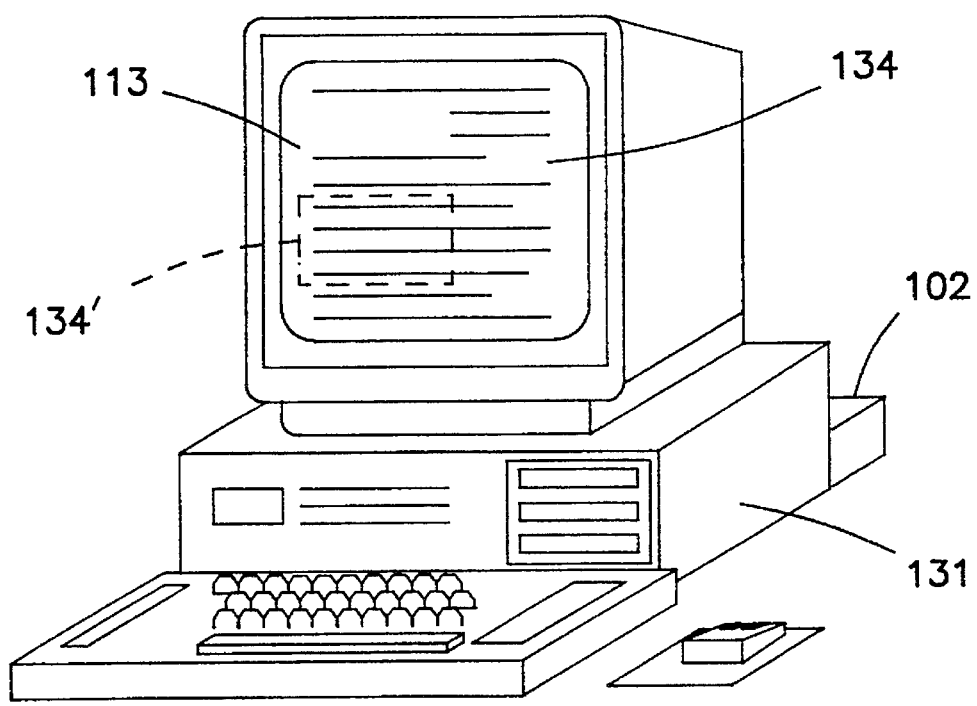
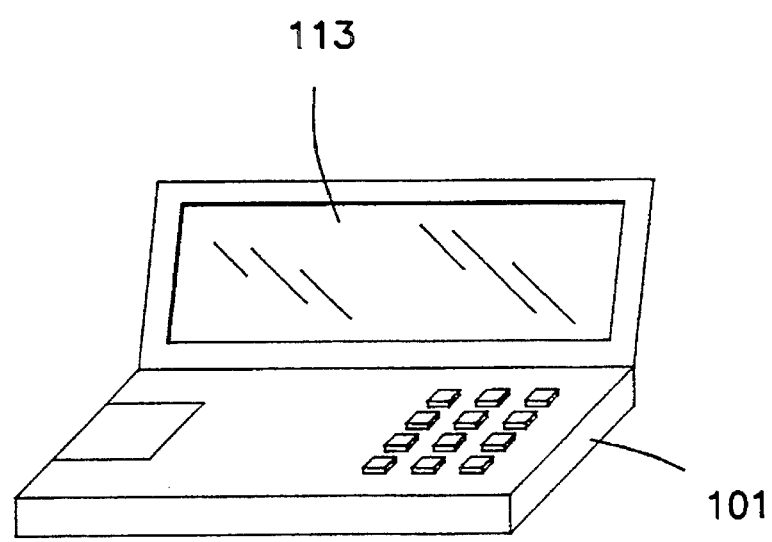
FIG. 34

DATA ENCLAVE AND TRUSTED PATH SYSTEM

This is a continuation of application Ser. No. 07/870,556, filed Apr. 17, 1992, now U.S. Pat. No. 5,276,735.

FIELD OF THE INVENTION

This invention relates generally to data communication systems, and more specifically to secure data processing on a data communication system.

BACKGROUND OF THE INVENTION

Data Enclave

Individuals working in a departmental computing environment typically have a substantial amount of computing power on their desks in the form of personal computers and workstations. A workstation has a computational subsystem, keyboard, and display for user interaction, and typically substantial amounts of local data storage in the form of fixed and removable media.

In order for the individual in the departmental computing environment to interact and share data, their workstations are typically attached to a local area network (LAN) which permits the transfer of data files and electronic mail between the workstations. In addition, "servers" may be attached to the LAN to provide specialized services, such as the management of centralized databases, which are not practical for individual workstations.

Departmental computing environments are typically members of a larger organization or have other reasons to communicate with computing facilities outside themselves. They therefore make use of a special kind of server, called a "gateway", to gain access to a wide area network (WAN). WANs are often interconnected (called "internetting") to provide world-wide data transmission paths.

Departmental Computing Environment

A typical overall departmental computing environment is shown in FIG. 1. In the departmental computer environment 1, large amounts of valuable data is stored on magnetic or other electronic Media 2, 4 for processing in the Workstations 10 and file servers (not shown). This media offers the benefits of compact storage, easy retrieval, and in the case of removable Media 4 (e.g., "diskettes"), convenient sharing and distribution.

In addition, data is transmitted freely around the Local Area Network 12 and occasionally through a Gateway 14 to the Wide Area Network 16 and Remote Sites 18. This transmission is necessary in order for the organization performing departmental computing to perform its internal work and interact with the outside world.

There is also a requirement that certain operations, including but not limited to the transmission of data to the outside world, be restricted to individuals who possess special privileges. Examples of such operations are messages (electronic mail) which are directive in nature, such as users to transfer funds, and operations such as the adding of new orders or the granting of limited access to departmental data to users on the Wide Area Network 16 (remote login and file transfer).

Threats Against Department Computing Environment

The threats against the departmental computing environment are shown in FIG. 2.

The data in this environment is vulnerable to theft and tampering. Removable media can be stolen, copied, and returned with no sign that loss has occurred. The fruits of thousands of hours of labor can be stolen in a package that fits easily in a coat pocket. Crucial data can be modified or destroyed, either directly or through the agency of technical entities such as "viruses", which are introduced into the Workstations 10 and servers through the agency of corrupted media or through the wide area network connection.

There are also threats to the privileged operations. Unauthorized individuals, masquerading as someone else, can cause disruptive or erroneous directives to be issued and thereby perpetrate sabotage and fraud. Malicious "hackers" with access to the wide area network can use that network to "reach in" to the departmental computing environment and masquerade as authorized users or otherwise obtain access to data, which they can then transfer worldwide, again with no sign that compromise has occurred.

Accordingly, there is a need for techniques whereby a departmental computing system 1 can be converted into a "data enclave." Within such an enclave:

(1) Data can be restricted to a single organization, such as a government agency or a corporation.

(2) Sharing of data between organizational elements (directorates, departments, projects, etc.) can be controlled. For example, it may be required that data such as a telephone directory be accessible by every employee, but data such as engineering drawings should not be allowed to circulate throughout the whole corporation.

(3) Sharing of data between individuals in organizational elements can be controlled. For example, even though an individual is a member of the engineering department, that individual may not have a "need to know" for all of the drawings in the department.

(4) Data is protected from technical attacks such as "viruses" and "worms."

(5) Intellectual property is protected irrespective of whether it is on electronic media, being processed in a Workstation, or being transferred around the local area network.

(6) The protections are achieved with minimum cost and disruption of operations, such as would occur if access to the wide area network were forbidden.

(7) Privileged operations are restricted to those users possessing the requisite privileges and cannot be invoked, through masquerading or other technical means, by unauthorized users.

As shown in overview form in FIG. 3, and as will be described more fully in the Detailed Description of the Invention, the facilities provided by the present invention convert a departmental computing environment into a "data enclave" 20 with a well-defined perimeter 22. Sharing of data within the Enclave 20 is controlled, and movement of data within and outside the enclave can only be effected by authorized individuals with suitable privilege. There are no "sneak paths" or "holes" that exist.

The present invention also minimizes the damage that can be done by privileged individuals who become subverted. Cryptographic keys are transmitted and stored entirely in enciphered form, and well-known techniques (called "antitamper" technology) can be used to protect an enclave key when it is in use inside a cryptographic device. Theft of elements of the present invention does not compromise any part of the operation of the invention.

Individuals desiring access to Media 2,4 have to deal with a Secure Computer 24, in this case a security server, only when Media 2,4 is initialized. "Unlocking" a unit of Media 2,4 requires an operation no more complicated than using a television remote control. Overhead and delay is concentrated at the time a Media 2,4 is "unlocked", and no delays or incompatibilities are introduced during operations using the Media 2 or 4.

Remotely invoked privileged operations at the security server 24 are under the positive control of the user. That control is cryptographically protected and mutually authenticated.

Identification and authentication of users to the security server 24 is both simpler and more robust than former implementations such as passwords. The same basic steps are used for security operations dealing with Media 2,4 and dealing with the security server 24.

In the data protection area, the system associates Media 2 or 4 primarily with users and secondarily with machines or Workstations 10. This is a more natural structure than one where media is only useable on a single machine or Workstation 10.

Control logic computes allowed access at the last possible moment using the combination of an "access vector" assigned to an individual and the "device attributes" assigned to a particular Workstation 10, which can be used to enforce a variety of security policies. For example, an individual's access to data may be restricted not only on the basis of the individual's attributes but also to protected physical locations. Thus an individual's access vector may grant "read" access to a unit of media which contains proprietary engineering data, but the comparison against the device attributes making the access, may restrict display of the contents of the unit of media to those machines inside a particular facility or office. Physical security measures can then be used to restrict who may be in the vicinity when the data is displayed. Previous implementations in this area have permitted only an "all or nothing" approach to access.

Trusted Path

The problems addressed by the Trusted Path functions arise because of the use of networks 12 and Workstations 10 to communicate between human users and secure computers 24. Malicious hardware and/or software in the Workstation 10 or network, possibly operating in concert with a subverted user, has the ability to perform the following hostile actions.

(1) Masquerade as a secure computer. In this attack, a bogus secure computer (not shown) is installed on the Network 12 and logically interposed between the legitimate Secure Computer 24 and the human user. The bogus secure computer then makes requests of the human user, displays forged or modified data, or otherwise induces the user to perform some insecure act. For example, the bogus secure computer may intercept and discard a message giving a critical order, while all the time presenting displays to the human user which indicate that the message was sent.

(2) Masquerade as a user site. This is the symmetric attack to that described in the previous paragraph. A bogus user site (not shown) is interposed between the legitimate human user and the Secure Computer 24. This bogus user site then accesses data, or performs operations, which are in violation of the security policy. The location of the bogus user site enables it to intercept responses from the Secure Computer 24, so that the legitimate user is unaware that a bogus site is on the network. The bulk of the so-called "hacker" attacks that appear in the popular press are of this class.

(3) Masquerade as another user. In this attack, a subverted or malicious individual gains access to a legitimate site, but then is able to masquerade as a different, and in general more privileged, human user. The majority of the so-called "insider" attacks are of this form.

(4) Surreptitiously transform data. This is a sophisticated and extremely dangerous form of attack in which some intermediate element in the path between the human user 5 and the secure computer performs "two-faced" actions. That is, the element displays one set of data to the human user 5 while simultaneously transmitting something else to the Secure Computer 24. For example, malicious software in a Workstation may be programmed to detect a funds transfer order, and then modify the amount or the recipient in ways not intended for use by the human user 5.

(5) Misdirect or appropriate cryptographic keys. In this attack, some intermediate element diverts, copies, or otherwise appropriates cryptographic keys destined to some authorized user 5 and methods and redirects them to unauthorized persons who have obtained cryptographic devices and wish to use them to either decrypt intercepted data or prepare and encipher forgeries of data to be submitted to the secure computer.

The Trusted Path, according to the present invention, is used for security-relevant interactions between a human user and a Secure Computer 24. These interactions fall into four broad categories, as set forth below.

(1) Identification and Authentication. In these operations, the human user is identifying himself or herself to the Secure Computer 24 for purposes of secure processing. There are two aspects to identification and authentication: authenticating the identity of the human user and authenticating the location (e.g. a Workstation 10) from which the human user is accessing the Secure Computer 24. Both aspects are used by the Secure Computer 24 to determine the nature of information it will display to, or the kinds of actions it will permit to be initiated by, the human user. The use of both aspects enables the implementation of sophisticated security policies by the Secure Computer 24. For example, an individual may be authorized to access engineering drawings, but only from terminals located inside the engineering area; even though the individual is authorized for information, the policy may prohibit the individual from exercising the authorization when in a residence or temporary lodgings.

(2) Trusted Command Initiation. These are operations performed by the human user which have serious security consequences; they will, in general, involve the exercise of some special privilege by the user. An example of trusted command initiation is the decision to override the security policy enforced by the secure computer and release data to persons who would normally be unauthorized to access it. Such a facility is necessary to prevent the security policy from interfering with proper operation in exceptional or emergency situations. Another example is the exercise of a human user of the privilege to send an official, cryptographically authenticated message which has the effect of an order or directive.

(3) Trusted Review. These are operations in which the human user wishes to be assure that some element of data contained in the Secure Computer 24 is exactly as the user intended. For example, a human user may wish to perform a trusted review of the aforementioned directive prior to performing the trusted command which adds an authenticator to the message and releases it as "signed" by that user.

(4) Key Management. In these operations, the user is obtaining cryptographic keys from some central key distribution center and loading them in to local cryptographic devices 26 at the user's Workstation 10.

The protocols of the Trusted Path are arranged so that all security alarms are raised at specified secure computers 24, and there is no user responsibility for responding to an alarm. This feature is an improvement over traditional cryptographic checksum and other means which display alarms to users and require them to notify the proper authorities, since it permits the present invention to provide security for users 5 who may be in physical locations where such notification is not possible.

The protocols in the Trusted Path operate at Layers 5, 6, and 7 of the ISO standard for communications protocols. This means that they are independent of the nature or topology of the network. All prior means for achieving Trusted Path have depended somewhat on the nature or topology of the network.

The elements of the present invention are either free-standing units, parts of an already distinguished Secure Computer 24, or devices which attach to existing interfaces to commercial Workstations 10. The only modification required to a commercial Workstation 10 is a software modification. No security reliance is placed on this modification, so that it can be rapidly and economically made to the software of a wide variety of commercial units.

The present invention uses a small number of special elements in a wide variety of ways. Maximum use is made of the cryptographic devices, which are typically the most expensive parts of a data security device. The same devices are used for media protection and authenticated interactions with the Secure Computer 24. Moreover, the elements of the invention are such that they can be constructed from readily available commercial technology.

SUMMARY OF THE INVENTION

The present invention provides a data enclave for securing data carried on physical units of fixed and removable media in a network including a server and one or more workstations, with one or more of the workstations including the physical units of fixed media. Protected storage is provided in the server and in each of the workstations, which also each include a crypto media controller in each workstation that can be used to read the fixed media and the removable media.

A personal keying device is assigned to each user in the enclave, and an enclave key is held in the protected storage in the server and in each of the workstations, and used to protect other keys stored or transmitted on the network. Each user is provided a personal identification number (PIN). A user unique identifier (user UID) is assigned to each user in the enclave and is stored in the user's personal keying device encrypted with the enclave key. User attributes are associated with each user to which a user UID has been assigned, and used to represent the privileges and other security related information that pertains to that user.

A media key is provided for each unit of media, and used to encrypt and protect data carried on the media, with the media keys stored in the personal keying devices. A media unique identifier (media UID) is provided for each unit of media, stored on the media, and used to identify the corresponding media key for the unit of media stored in a personal keying device, and to identify media attributes assigned to the unit of media. Media attributes are associated with each unit of media to which a media UID has been assigned, and used to represent the sensitivity or other security related information that may pertain to the data carried on that unit of media.

An access vector is associated with each media key to form media key/access vector pairs, stored in the personal keying devices, and used to represent the possible conditions of access to the data encrypted on the media for the user assigned to the personal keying device holding the media key/access vector pair or pairs, with each access vector formed using the corresponding media attributes and user attributes, and a set of access rules. The media key/access vector pairs are stored in the personal keying devices enciphered with a combined key including the user's UID, the user's PIN and the enclave key. Device attributes are assigned to each workstation, stored in that device's crypto media controller, and used to represent the security attributes of the workstations.

Each crypto media controller includes access control logic for restricting access to the data on the media based on the user's PIN, the access vector and the device attributes for the workstation from which access is attempted.

According to another aspect of the invention, there is provided a Trusted Path for communication between a workstation and a secure computer over a untrusted communication medium, the Trusted Path comprising a logic and control unit in the workstation and in the secure computer, and an end-to-end authentication token exchange protocol used to assure the logic and control unit in the workstation is communicating with an authentic logic and control unit in the secure computer, and vice versa. The token exchange protocol operating by chaining transactions together so that a forged transaction entered into the interaction between workstation and secure computer is detected the very next time a legitimate transaction is received by a logic and control unit. The system further including a cryptographic checksum protocol used to assure transactions between the logic and control units have not been tampered with, the checksum protocol authenticating single transactions between the workstation and the secure computer rather than sequences of transactions. The system also including an identification and authentication protocol invoked when a user wishes to interact with the secure computer for some period of time, using the keyboard and display of the workstation and the untrusted communications medium, the period of interaction being a session, and the act of initiating a session called logon, and that of terminating one is called logout.

BRIEF DESCRIPTION OF THE DRAWINGS

The operational enhancements and features of the present invention become more apparent from a consideration of the drawings and following detailed description.

FIG. 29 is a block diagram of a secure data processing system illustrating the Trusted Path implementation.

FIG. 30 is a simplified block diagram showing the elements of the Trusted Path when Workstation Unit 102 is used only for authenticated communications between Workstation 131 and Secure Computer 104.

FIG. 34 is a pictorial diagram displaying the locations of the user-visible elements of the Trusted Review Protocol used in Trusted Path operation.

DETAILED DESCRIPTION OF THE INVENTION

In the following detailed description of the preferred embodiments, reference is made to the accompanying drawings which form a part hereof, and in which is shown by way of illustration, specific embodiments in which the invention may be practiced. It is to be understood that other embodiments may be utilized and structural changes may be made without departing from the scope of the present invention.

The term "logic" is used throughout the ensuing description with reference to the structure of various electronic components of the invention. The term is intended to have a broad meaning, and to encompass hardware implemenations, software implementations, and combinations thereof.

Processing Elements

Figure 4:
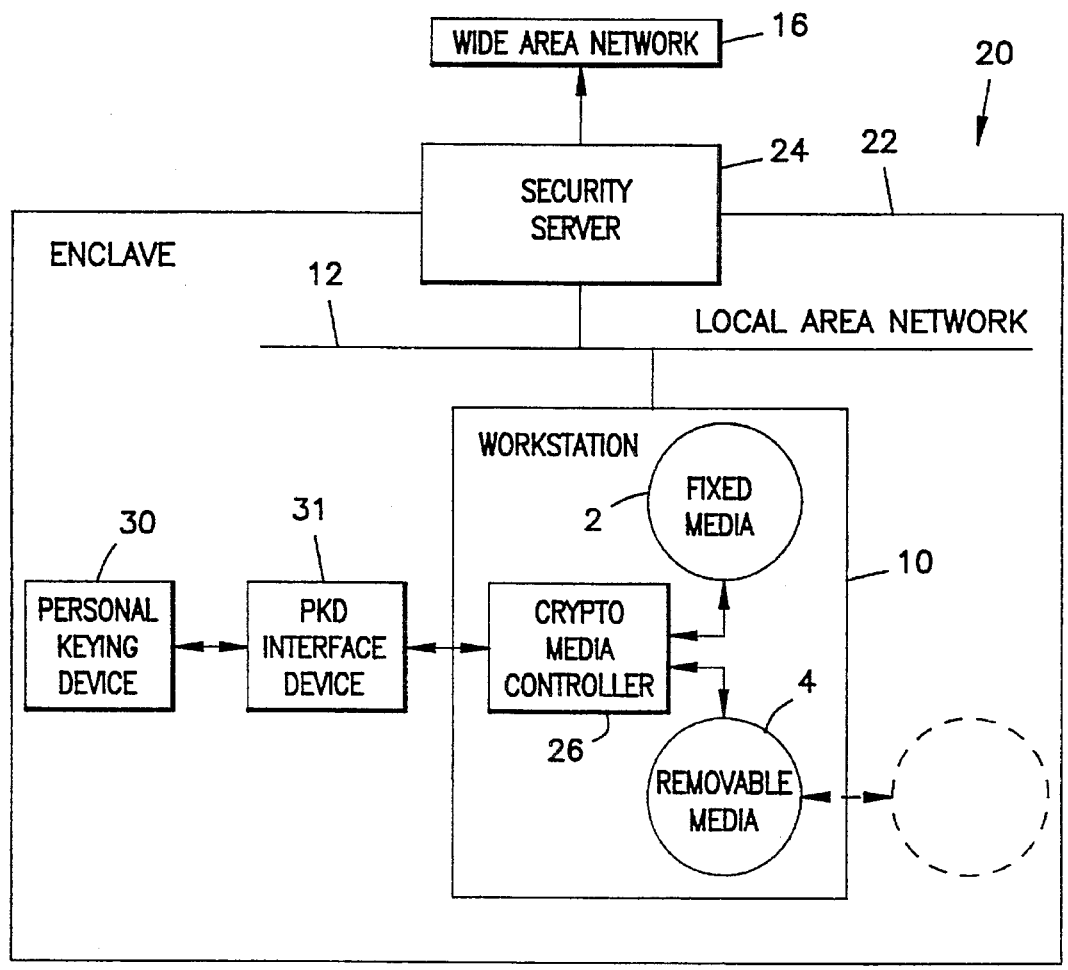
FIG. 4 is a simplified block diagram of the main data processing elements in the apparatus implementing the present invention.
Figure 5:
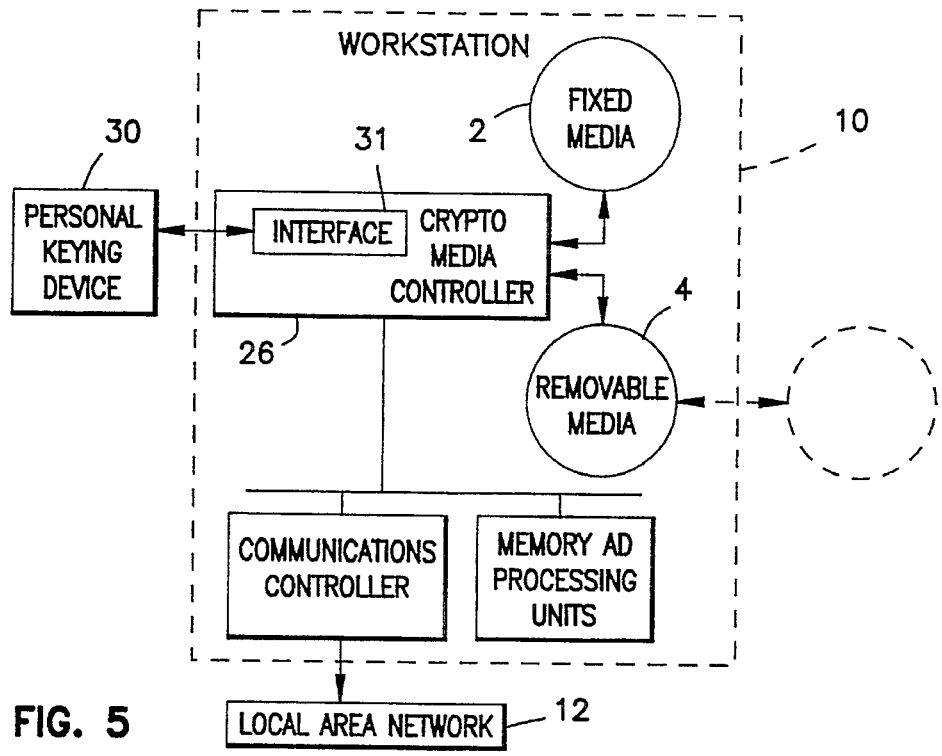
FIG. 5 is a simplified block diagram of the Workstation data processing elements using a Workstation configuration supporting coprocessor cryptography.

The present invention consists of processing elements and data elements. The interrelation of the processing elements is shown generally in FIGS. 3 and 4 (in part described above) and in more detail in FIGS. 5 and 6. The descriptions given below show cryptographic protection provided only to those distinguished transmissions required in the operation of the invention. In such a case, the elements of the invention are preferably arranged with regard to the Workstation 10 as shown in FIG. 5.

Figure 6:
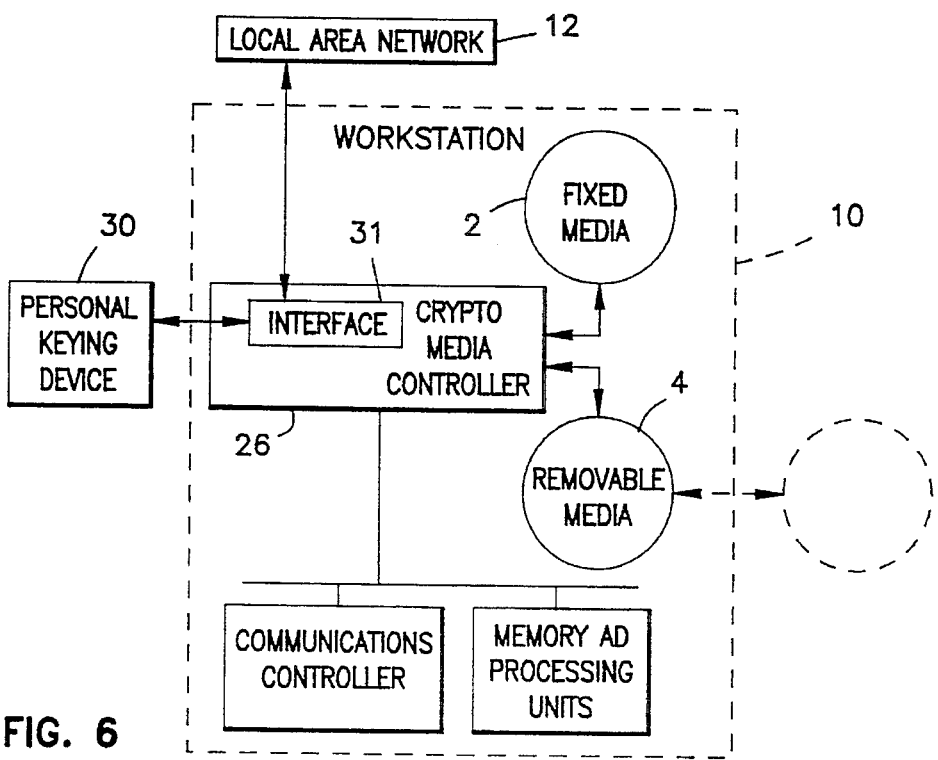
FIG. 6 is a simplified block diagram of the Workstation data processing elements using a Workstation configuration supporting inline cryptography.

If it is desired to protect all transmissions over the Local Area Network 12, e.g., to prevent wiretapping or other monitoring by unauthorized personnel, then the Crypto Media Controller 26 could be used to encipher and decipher all data going out over the Network 12. In this case, the elements of the invention could be arranged with regard to the Workstation 10 as shown in FIG. 6.

Security Server

The Security Server 24, a secure computer, is a distinguished server that performs gateway and security functions at the interface between the Local Area Network 12 and the Wide Area Network 16. It also performs the key management and backup functions for the cryptography in the Enclave 20. The Security Server 24 can be implemented in the form of a secure computer for example, as disclosed in U.S. Pat. Nos. 4,621,321 to Boebert et al, entitled "Secure Data Processing System Architecture", 4,713,753 to Boebert et al, entitled "Secure Data Processing System Architecture with Format Control", and 4,701,840 to Boebert et al, entitled "Secure Data Processing System Architecture".

Personal Keying Device

Figure 6A:
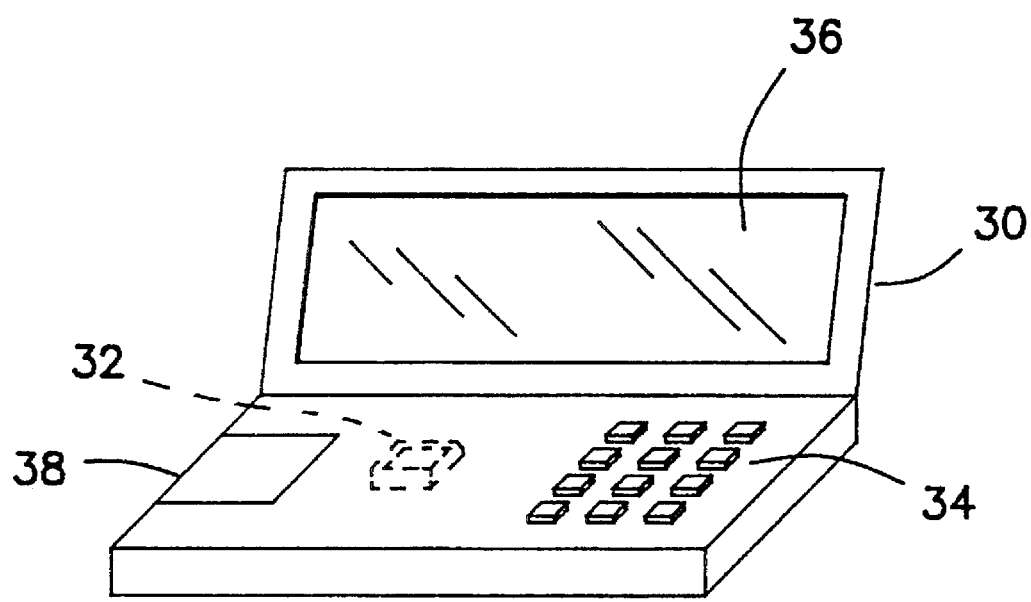
FIG. 6a is a pictorial diagram of a personal keying device illustrating the appearance, features, and functions.

Each user 5 is issued a Personal Keying Device 30. Personal Keying Devices 30 are used for key insertion and individual authentication. A Personal Keying Device 30 (shown in more detail in FIG. 6a) preferably contains fixed or removable electronic storage and processor 32, a keypad 34, a display 36, and a data transfer interface 38 that can be either wired or wireless (e.g., radio, infrared) and is compatible with an interface 31 on a Crypto Media Controller 26. The Personal Keying Device 30 can be highly portable, e.g., pocket calculator size. Personal Keying Devices 30 may also be equipped with theft detection circuitry to prevent them from being physically removed from the enclave working area.

Crypto Media Controller

The standard media controller on each Workstation 10 is replaced with a Crypto Media Controller 26. Crypto Media Controllers 26 perform key management, media encryption and decryption, and authentication functions. A Crypto Media Controller 26 has the same interfaces as the standard media controllers, as well as a data transfer interface that is compatible with the one on the Personal Keying Device 30. The Crypto Media Controllers 26 can be the same size as the standard media controllers they replace.

Data Elements

Figure 6B:
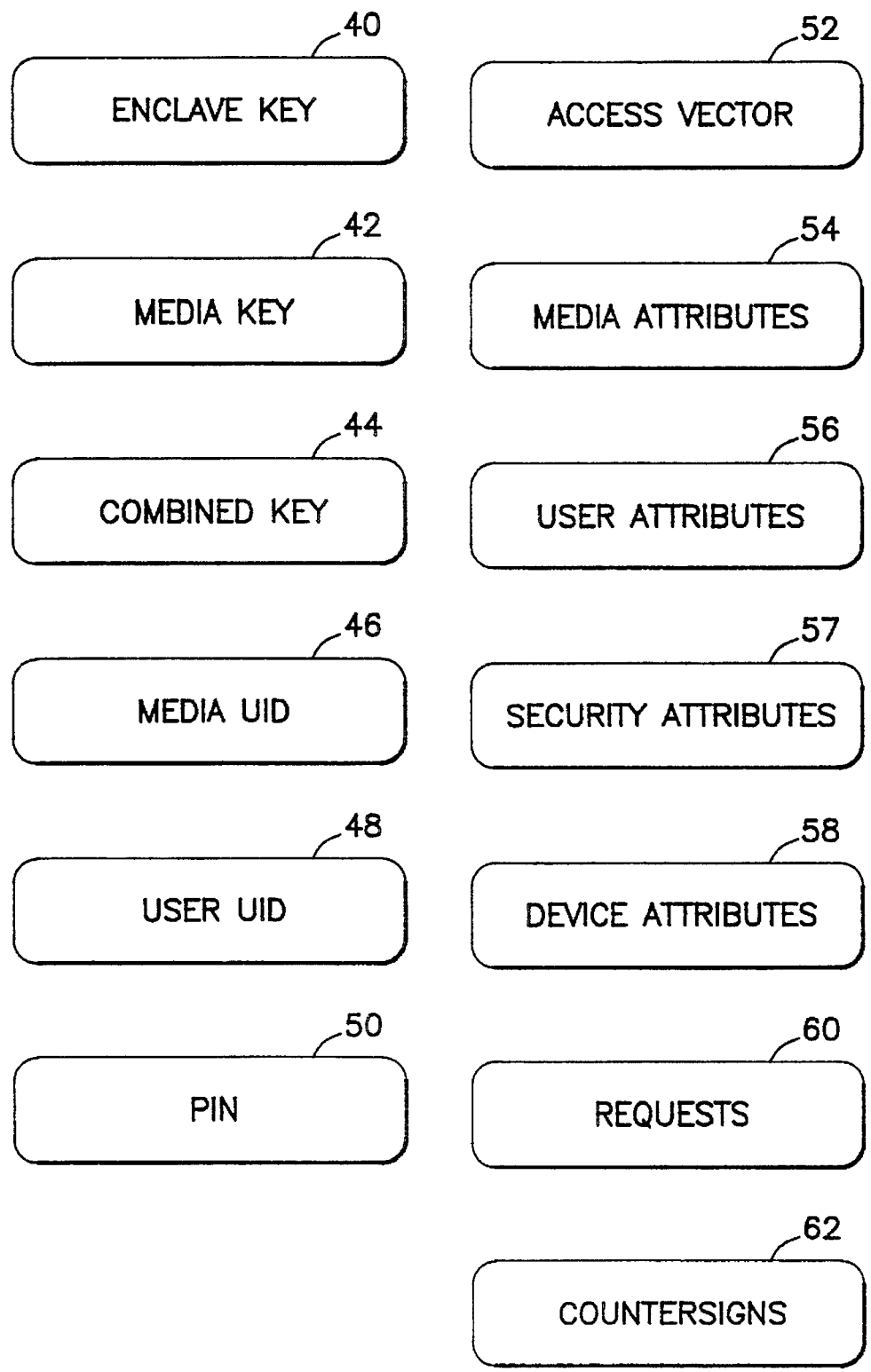
FIG. 6b is a schematic diagram of the data elements created and utilized for the protection of data in the present invention.

The present invention also includes a variety of data elements, as described below and schematically represented in FIG. 6b.

Enclave Key

There is one Enclave Key 40 per organization. It is held in protected storage in the Security Server 24 and the Crypto Media Controllers 26, and is used to protect Media Keys 42 when they are being transmitted along the LAN 12.

Media Key

There is one Media Key 42 assigned to each physical unit of the media, whether that unit is fixed 2 or removable 4. Assignment is done when the media is initialized at the Workstation 10. This key is used to protect the data on the Media 2 or 4.

Combined Keys

Combined Keys 44 are generated in the operation of the present invention from other data elements and keys.

Media Unique Identifier (Media UID)

Each physical unit of media, whether fixed 2 or removable 4, is assigned a Media Unique Identifier 46 (Media UID). This number is generated by the Security Server 24, and stored in whatever field the Media 2 or 4 software uses to identify physical units (e.g., Volume Label). The Media UID 46 is used to find the appropriate Media Key 42 in the Personal Keying Device 30, and to locate that data pertaining to the unit of media which is stored in the Security Server 24 (e.g., Media Attributes).

User Unique Identifier (User UID)

Each individual who has potential access to encrypted media is assigned a User Unique Identifier 48 (User UID) which is stored in that user's Personal Keying Device 30, encrypted with the Enclave Key 40. The User UID 48 forms part of the key used to protect Media Keys 42 in the Personal Keying Device 30, and is used to extract that data pertaining to the user 5 which is stored in the Security Server 24 (e.g., User Attributes).

Personal Identification Number (PIN)

Each user 5 is assigned a Personal Identification Number 50 (PIN), which is used to form part of the key that protects Media Keys 42 in the Personal Keying Device 30.

Access Vector

An Access Vector 52 is associated with each Media Key 42 stored in a Personal Keying Device 30. The Access Vector 52 is used to represent those possible conditions of access to the data enciphered with that Media Key 42 that may apply to the individual assigned to that Personal Keying Device 30.

Media Attributes

Media Attributes 54 are associated with each element of Media 2 or 4 to which a Media UID 46 has been assigned. Media Attributes 54 are used to represent the sensitivity or other security related information that may pertain to the data on that element of media.

User Attributes

A set of "User Attributes" 56 are associated with each user to which a User UID 48 has been assigned. User Attributes 56 are used to represent the privileges and other security related information which pertains to that user.

Device Attributes

Device Attributes 58 are assigned to each Crypto Media Controller 26, and reflects the Security Attributes 57 of the machine in which the Crypto Media Controller 26 is installed. Device Attributes 58 are combined with Access Vectors 52 to set limits on media access (e.g., read only). Device Attributes 58 are typically defined by the physical security measures which surround the Workstation 10 in which the Crypto Media Controller 26 is installed. For example, a Workstation 10 installed in an open environment may have Device Attributes 58 set to "Authorized to Process Public Data Only", whereas one in a closed engineering facility may have Device Attributes 58 set to "Authorized to Process Proprietary Engineering Data."

Requests

Requests 60 are transmitted back and forth between the Crypto Media Controller 26 and Security Server 24 in the course of operations which require cooperation between the two devices. Requests 60 contain a variety of information depending on the nature of the operation being performed as well as optional integrity fields such as cyclic redundancy checks or check sums.

Countersigns

The purpose of the Countersign 62 logic is to prevent malicious code in the Workstations 10 from masquerading as the Security Server 24, and thereby duping users 5 into taking inappropriate actions. Each time a user 5 is identified to the Security Server 24 (e.g., each new session), the Security Server 24 generates a "fresh" Countersign 62. Countersigns 62 are words, symbols, or phrases which are easy to remember and which are generated by some process which makes it computationally infeasible to guess from one Countersign 62 what the value of the next one will be. The Countersign 62 for a session is presented by the Security Server 24 as a header to each message it sends to the user 5 when communicating over a Trusted Path.

Figure 1:
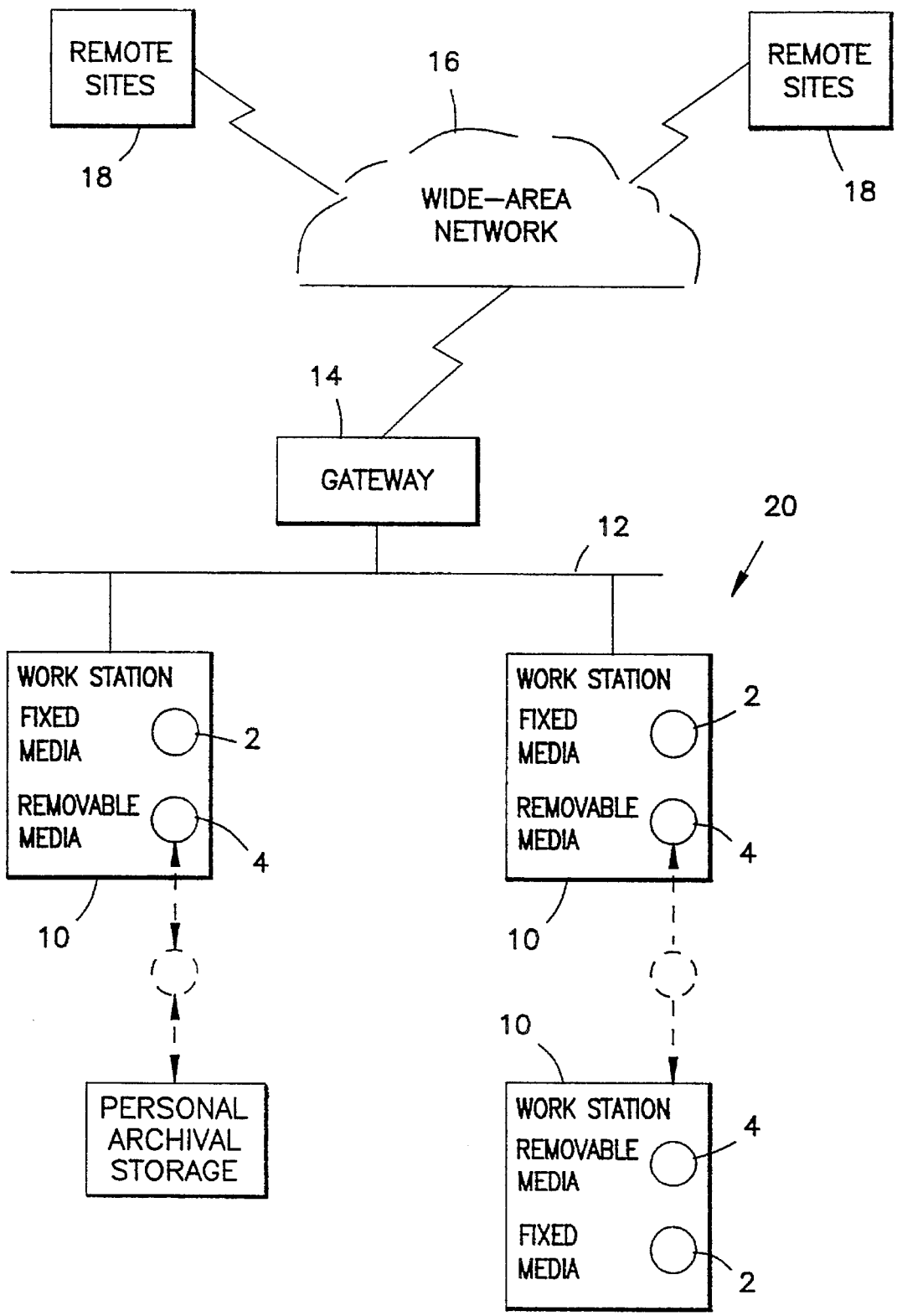
FIG. 1 is a diagram illustrating a typical departmental computing environment incorporating a local area network with a wide area network.
Figure 2:
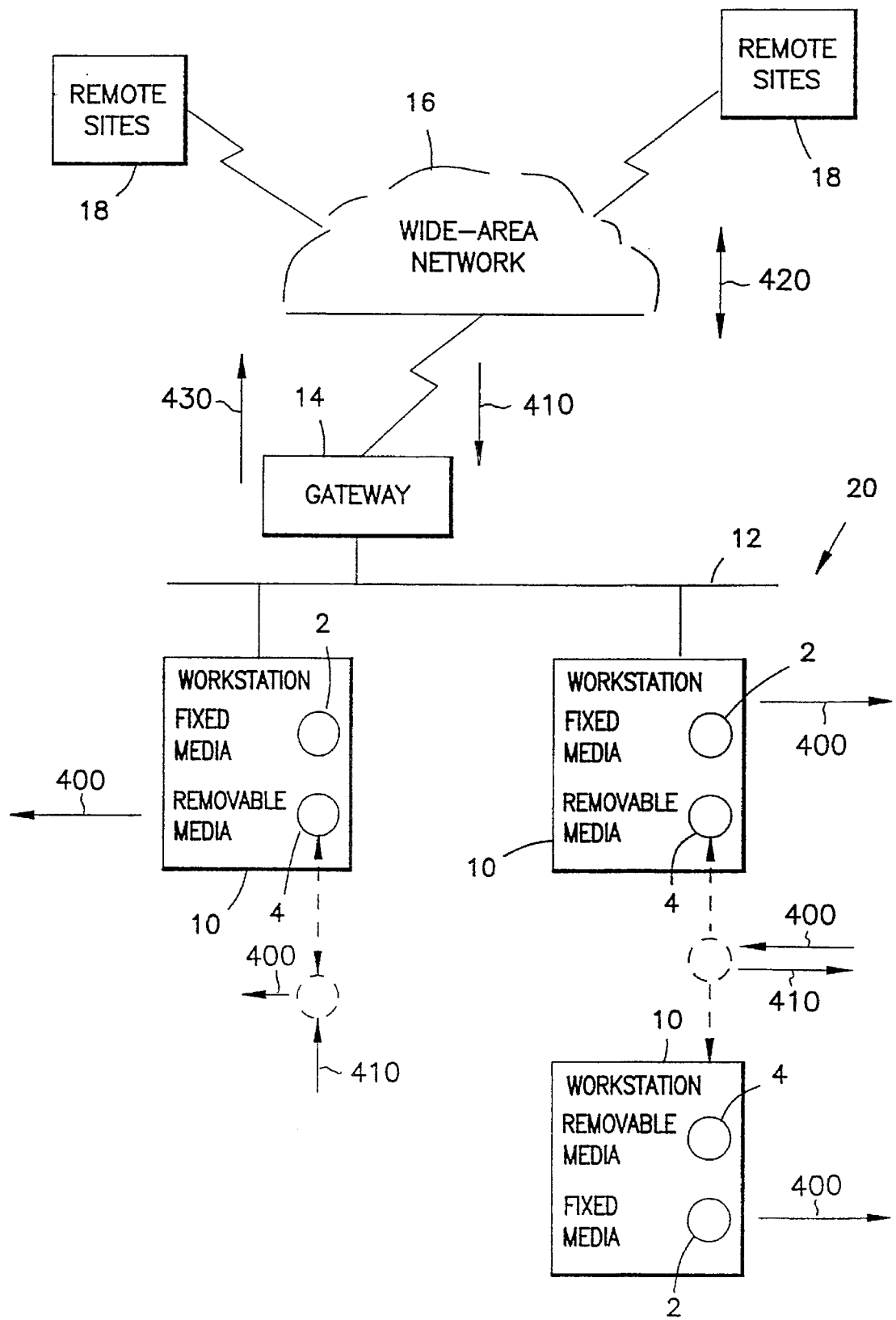
FIG. 2 is a diagram illustrating possible threats against the departmental computing environment.
Figure 3:
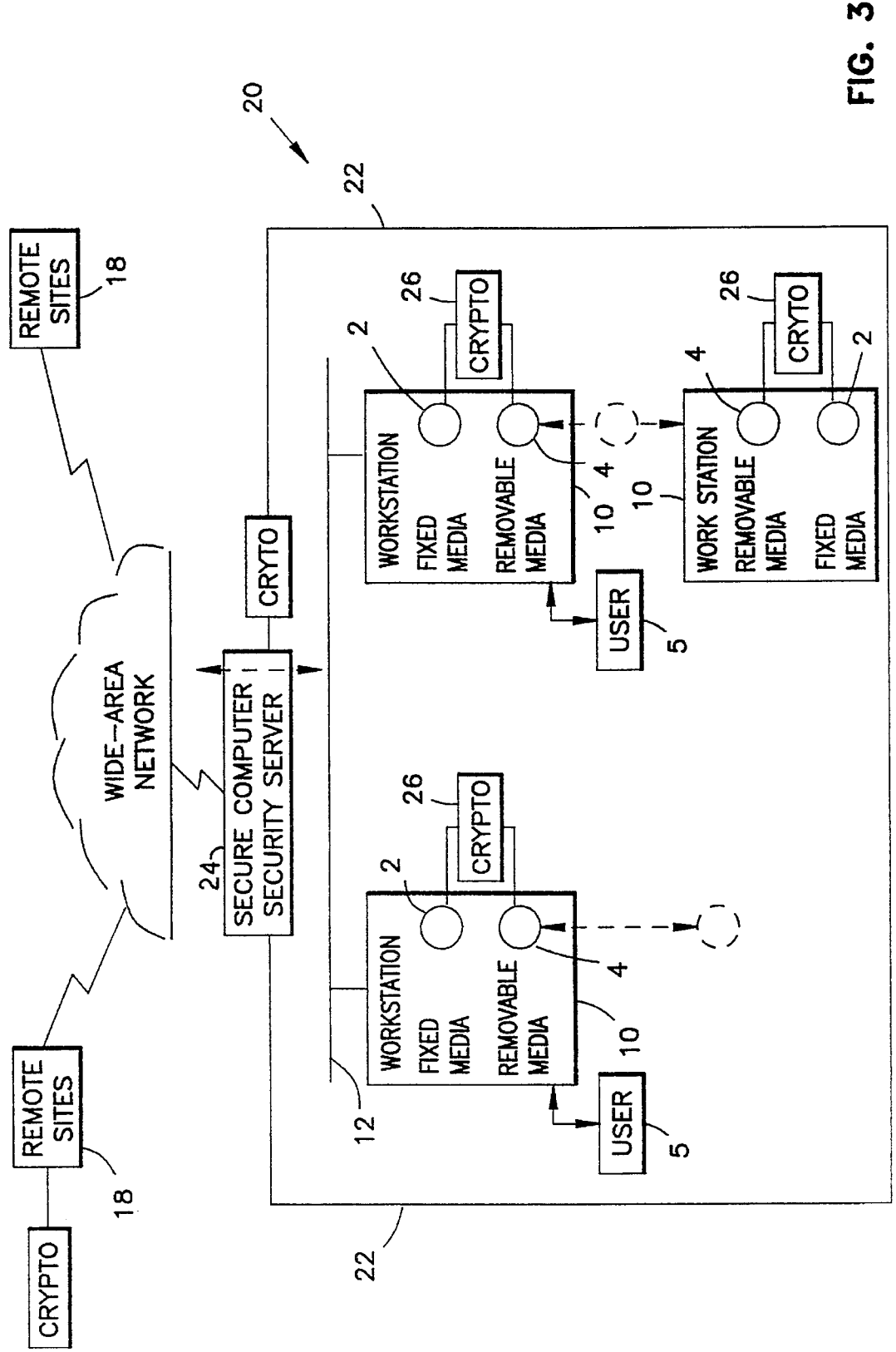
FIG. 3 is an overall simplified block diagram of a secure data processing system illustrating the Data Enclave implementation.

The present invention also provides a "Trusted Path." A Trusted Path is a logical communications path between a human user 5 and the Secure Computer 24 (FIG. 3). A Trusted Path differs from other modes of communication in that there is a high degree of assurance on the part of both parties that the communication is authentic; that is, the human user is truly seeing what the secure computer intends the human user to see, and the secure computer is making decisions on the basis of precisely what the human user has transmitted to it.

The Countersign 62 is displayed to the user 5 on the Personal Keying Device 30 when the Trusted Path is in effect, and is protected from the Workstations 10 and the communications media by cryptography and is computationally infeasible to guess. It's presence on the display of the Personal Keying Device 30 is a positive indication to a user that the communication in which the user is engaged, is taking place over a Trusted Path to the Security Server 24.

Countersigns 62 are arranged so that the logic in the Security Server 24 can, for any given Countersign 62, determine what the previous Countersign 62 in the sequence was. That is, given a Countersign 62, the Security Server 24 can compute or retrieve a correct value of the previous one, which is called the "last countersign" 62'.

OPERATION OF DATA ENCLAVE 20

The present invention makes use of cryptography to protect the data on Media 2 or 4 and uses an innovative method to distribute and protect the cryptographic keys in order to achieve security, flexibility, and ease of use. The same cryptographic services are used to prevent unauthorized access through the Wide Area Network 16, or the unauthorized use of privileged services.

As described in more detail below, protection of the data on Media 2 or 4 takes place in three broad phases. The first phase, which is done very infrequently, is media initialization and key assignment to the individual user 5 requesting the initialization. The second phase, which is also infrequently done, is the assignment of a key for already-initialized Media 2 or 4 to additional individuals. The third phase, which is done more frequently, is the keying of devices, so access to the data may be made.

Media Initialization and Key Generation

The media initialization and key generation phase generates a Media Key 42 and an Access Vector 52 for a unit of Media 2 or 4 and places them in enciphered form in the Personal Keying Device 30 assigned to the individual requesting the initialization. This data is also archived in the Security Server 24 so that it may be restored at a later time.

Key Assignment

The key assignment phase assigns a Media Key/Access Vector pair, or combination, for an already-initialized unit of media to a new individual. The Media Key 42 will be a copy of the one generated when the unit of Media 2 or 4 was initialized. The Access Vector 52, since it depends on User Attributes 56 as well as Media Attributes 54, will be newly computed.

Keying of Devices

The keying of devices phase automatically extracts the proper Media Key/Access Vector combination from the Personal Keying Device 30, decrypts them and uses them to allow controlled access to the unit of Media 2 or 4. The Media Key/Access Vector combination are enciphered with a Combined Key 44 which includes the user's PIN 50. This restricts a particular Media Key/Access Vector combination to the individual to whom it was assigned.

Media Initialization and Key Generation

The operations in the Media Initialization and Key Generation Phase occur when a blank unit of Media 2 or 4 is to be prepared for safe use in the Enclave 20. This preparation involves initializing the Media 2 or 4, assigning a Media UID 46 to it, generating a Media Key 42 which is unique to that unit of media, and assigning a Media Key/Access Vector pair to the user 5, initializing the media.

The operations in this phase are keyed to the diagrams in FIG. 7 through FIG. 13. The logic used to implement the Trusted Path facilities is omitted from these diagrams.

Figure 7:
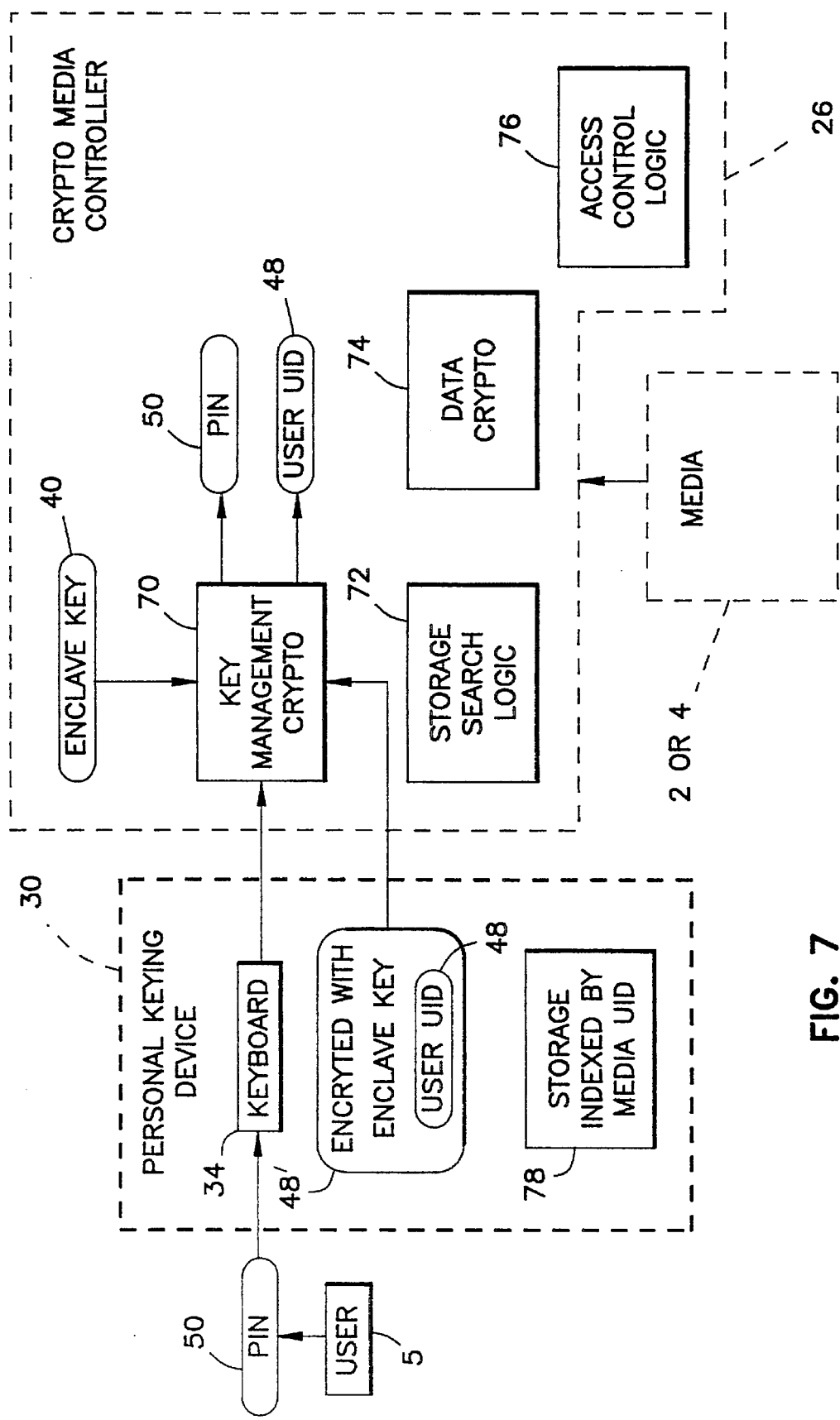
FIG. 7 is a simplified block diagram illustrating the steps for the extraction of user data at the Workstation, implemented in the Media Initialization and Key Generation phase of Data Enclave operation.

Step 1 (FIG. 7)

An individual brings together a blank unit of physical Media 2 or 4 and his or her Personal Keying Device 30 to a Workstation 10 which is equipped with a Crypto Media Controller 26 and attached to a Local Area Network 12. If the Media 4 is removable, this is done by carrying Media 4 and Personal Keying Device 30 to an appropriate Workstation 10. If Media 4 is permanently installed (Fixed Media 2), Personal Keying Device 30 is brought to the Workstation containing the fixed media controlled by Crypto Media Controller 26, and the Workstation 10 is temporarily attached to the Local Area Network 12.

Step 2 (FIG. 7)

The individual user 5 desiring access to Media 2 or 4 then enters his or her PIN 50 into Personal Keying Device 30 which transmits it to Crypto Media Controller 26, where it is stored for use in later steps.

Step 3 (FIG. 7)

Crypto Media Controller 26 then extracts the encrypted User UID 48' from their Personal Keying Device 30, decrypts the User UID 48 using the Enclave Key 40, and stores it for use in later steps.

Figure 8:
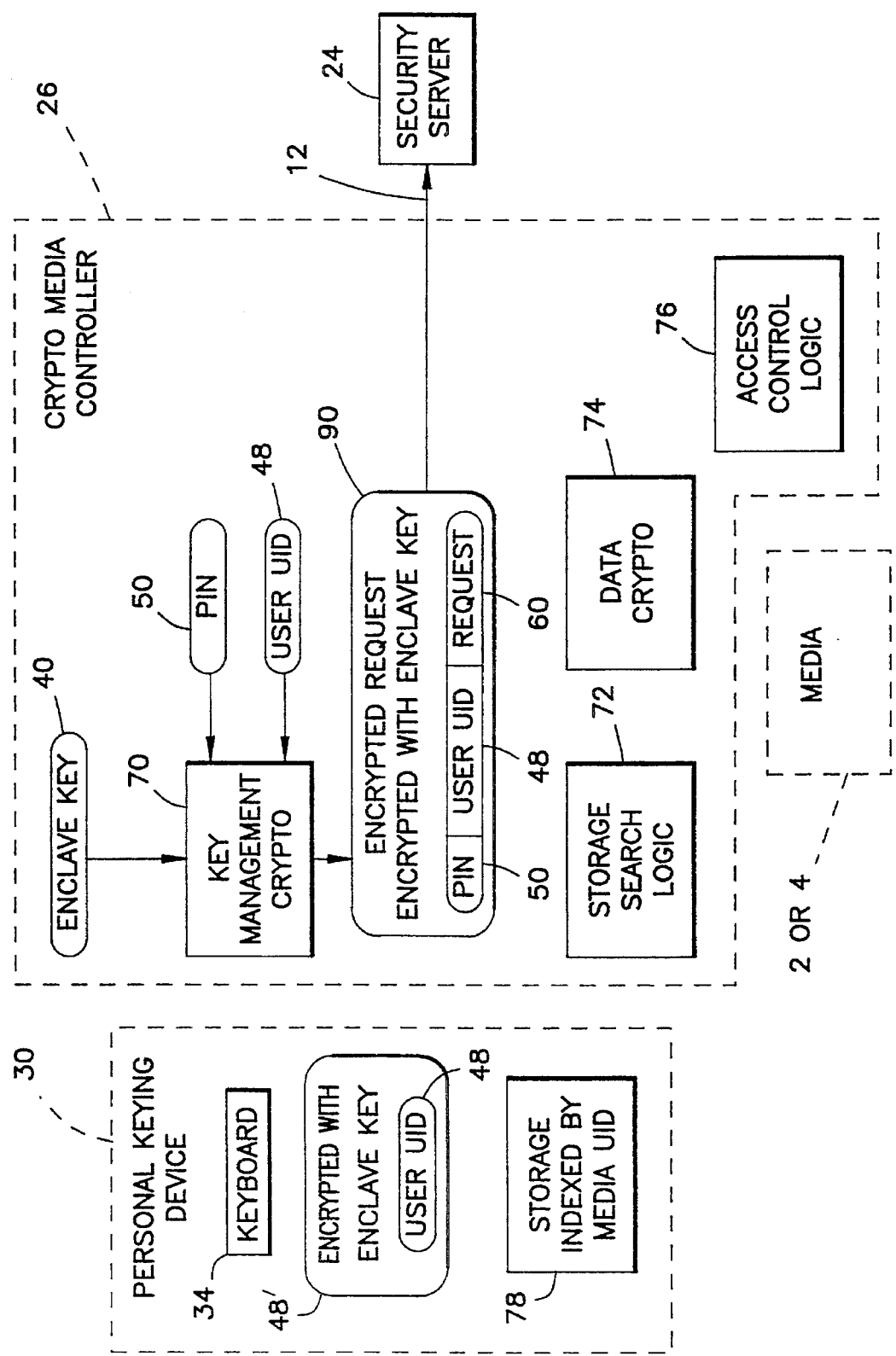
FIG. 8 is a simplified block diagram illustrating the step for preparation and sending of a "Request Packet", implemented in the Media Initialization and Key Generation phase of Data Enclave operation.

Step 4 (FIG. 8)

Crypto Media Controller 26 forms a packet consisting of the PIN 50, the User UID 48, and a Request 60 for media initialization. The request field will include the nature of the request and appropriate supporting data such as the Security Attributes 57 to be assigned to Media 2 or 4. Key Management Crypto 70 in Crypto Media Controller 26 enciphers it using the Enclave Key 40, and transmits it across the Local Area Network 12 to Security Server 24.

Figure 9:
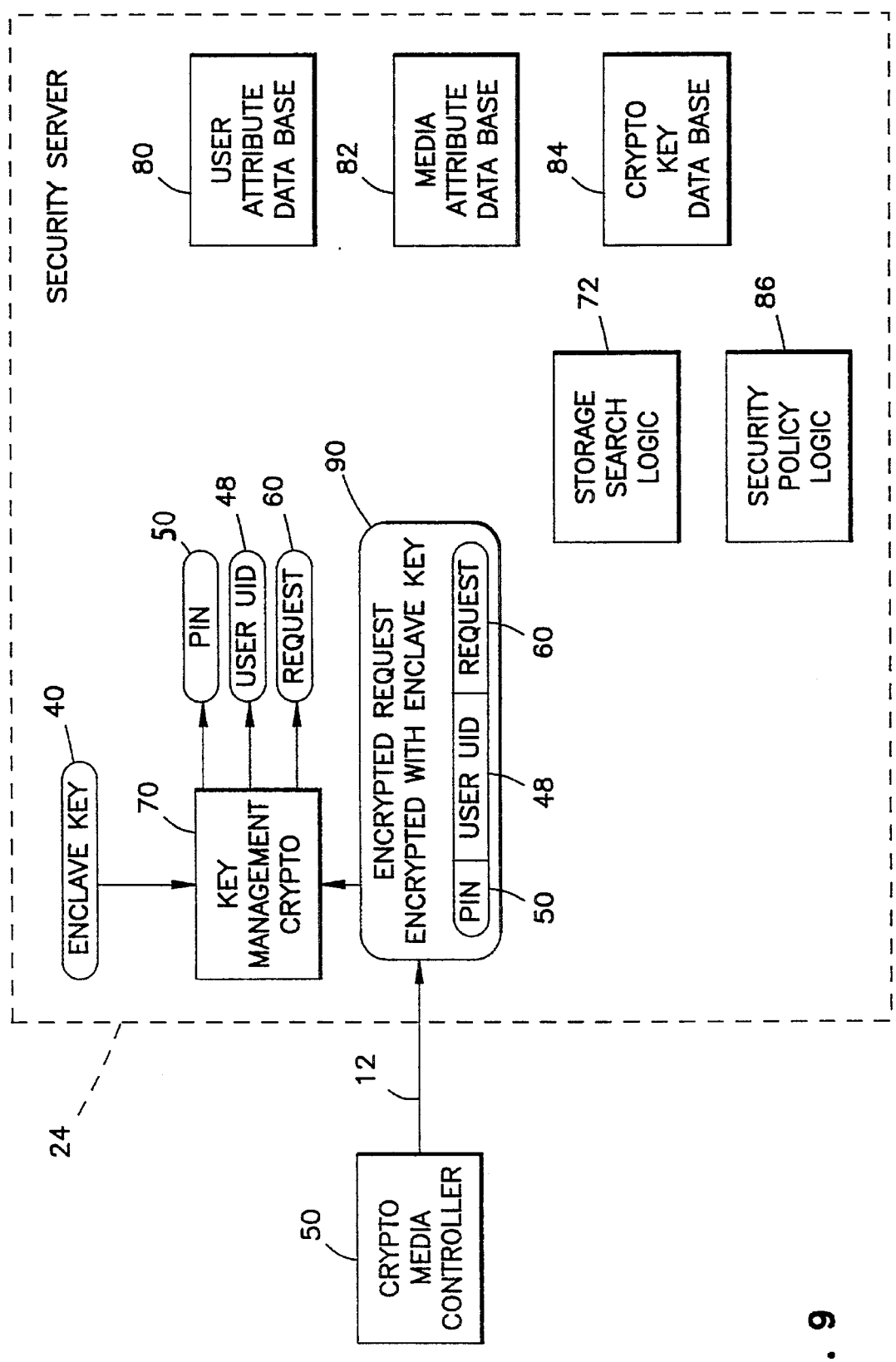
FIG. 9 is a simplified block diagram illustrating the step for receipt of a "Request Packet" at the Security Server, implemented in the Media Initialization and Key Generation phase of Data Enclave operation.

Step 5 (FIG. 9)

Security Server 24 receives the encrypted packet 90, decrypts it using its copy of the Enclave Key 40, and stores the PIN 50, User UID 40, and Request 60 for use in later steps.

Figure 10:
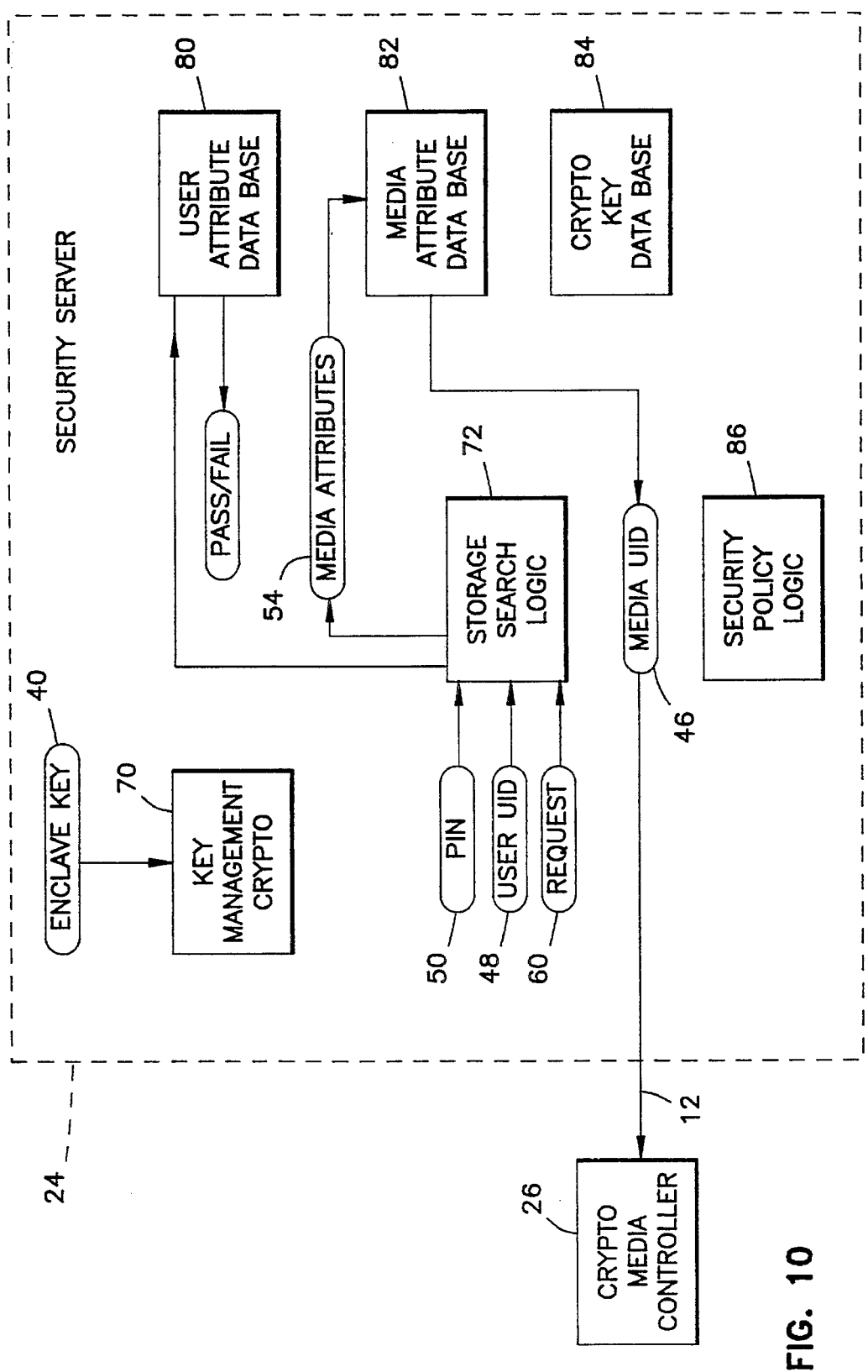
FIG. 10 is a simplified block diagram illustrating the steps for the checking of user identity and the generation of a Media UID, implemented in the Media Initialization and Key Generation phase of Data Enclave operation.

Step 6 (FIG. 10)

Storage Search Logic 72 in Security Server 24 uses the User UID 48 to index User Attribute Data Base 80, which returns a pass value if the PIN 50 entered by the user 5 in Step 1 is the same as that stored in the data base, i.e., a valid PIN 50. User Attribute Data Base 80 returns a fail value if the PIN 50 entered by the user is invalid. A fail value will cause the initialization process to abort and a notification to be sent back to Crypto Media Controller 26, which will display it to the user 5 in an appropriate fashion. The abort sequence is not diagrammed in the figures.

Step 7 (FIG. 10)

Storage Search Logic 72 extracts the Media Attributes 54 from the Request and commands Media Attribute Data Base 82 to make an entry for the new element of Media 2 or 4. Since Media Attribute Data Base 82 is indexed by the Media UID 46, this has the effect of creating a new Media UID 46 which is sent to Crypto Media Controller 26 and saved for use in later steps.

Figure 11:
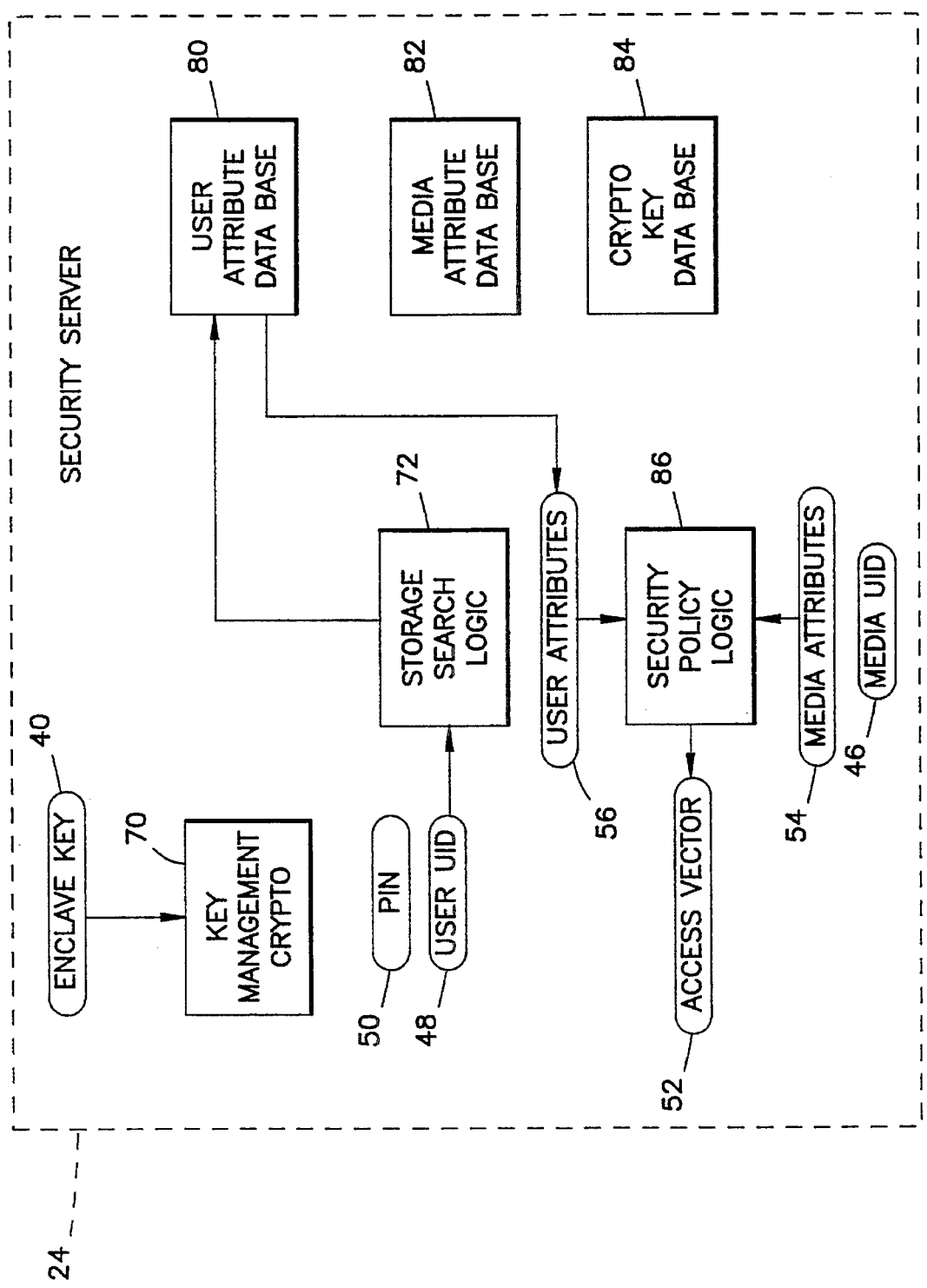
FIG. 11 is a simplified block diagram illustrating the steps for Access Vector generation, implemented in the Media Initialization and Key Generation phase of Data Enclave operation.

Step 8 (FIG. 11)

Storage Search Logic 72 uses the User UID 48 to index User Attribute Data Base 80 and extract the set of Security Attributes 57 pertaining to this user, and passes these attributes to Security Policy Logic 86.

Step 9 (FIG. 11)

Security Policy Logic 86 accepts the Media Attributes 54 and User Attributes 56, and, using a set of rules defined by the administrators of the facility, computes an Access Vector 52 which defines limits on the access this user 5 may have to this unit of Media 2 or 4. This computation may involve the intervention of administrative personnel to authorize or deny the granting of certain privileges.

Figure 12:
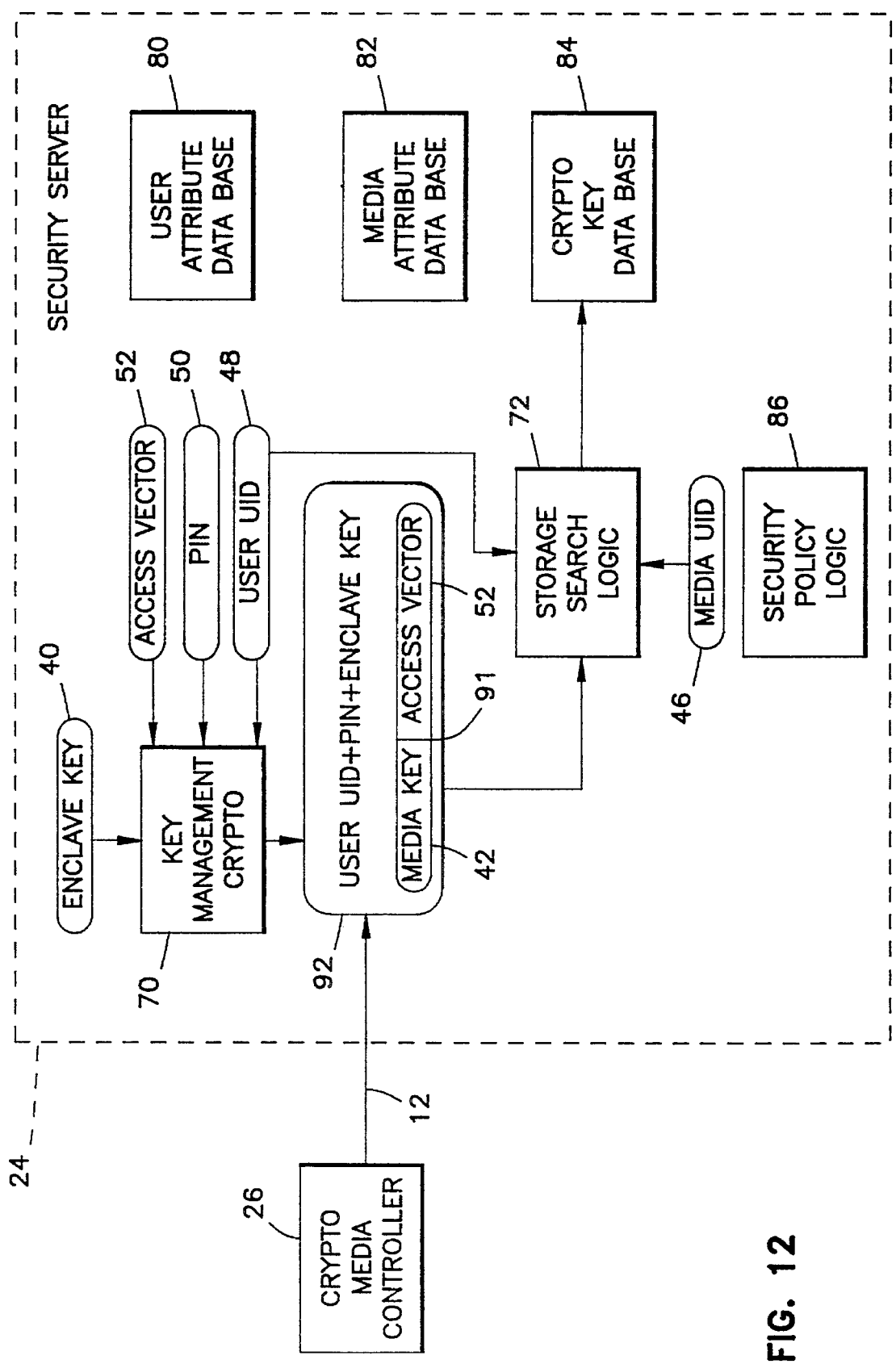
FIG. 12 is a simplified block diagram illustrating the steps for "Key Packet" generation and storage, implemented in the Media Initialization and Key Generation phase of Data Enclave operation.

Step 10 (FIG. 12)

Key Management Crypto 70, with the optional aid of authorized individuals, then generates a Media Key 42 for this unit of Media 2 or 4. The manner of generation can involve computation, access to stored tables, requests for inputs from authorized individuals, or any combination thereof. Other methods of key generation may also be used. The Media Key 42 and Access Vector 52 pair 91 are enciphered with a combined key 44 consisting of the User UID 48, the user's PIN 50 and the Enclave Key 40.

Step 11 (FIG. 12)

The enciphered packet is sent to Storage Search Logic 72 where the User UID 48 and Media UID 46 are used to store the enciphered packet 92 in Crypto Key Data Base 84. The Media UID and the enciphered packet 92 are transmitted along the LAN 12 to Crypto Media Controller 26.

Figure 13:
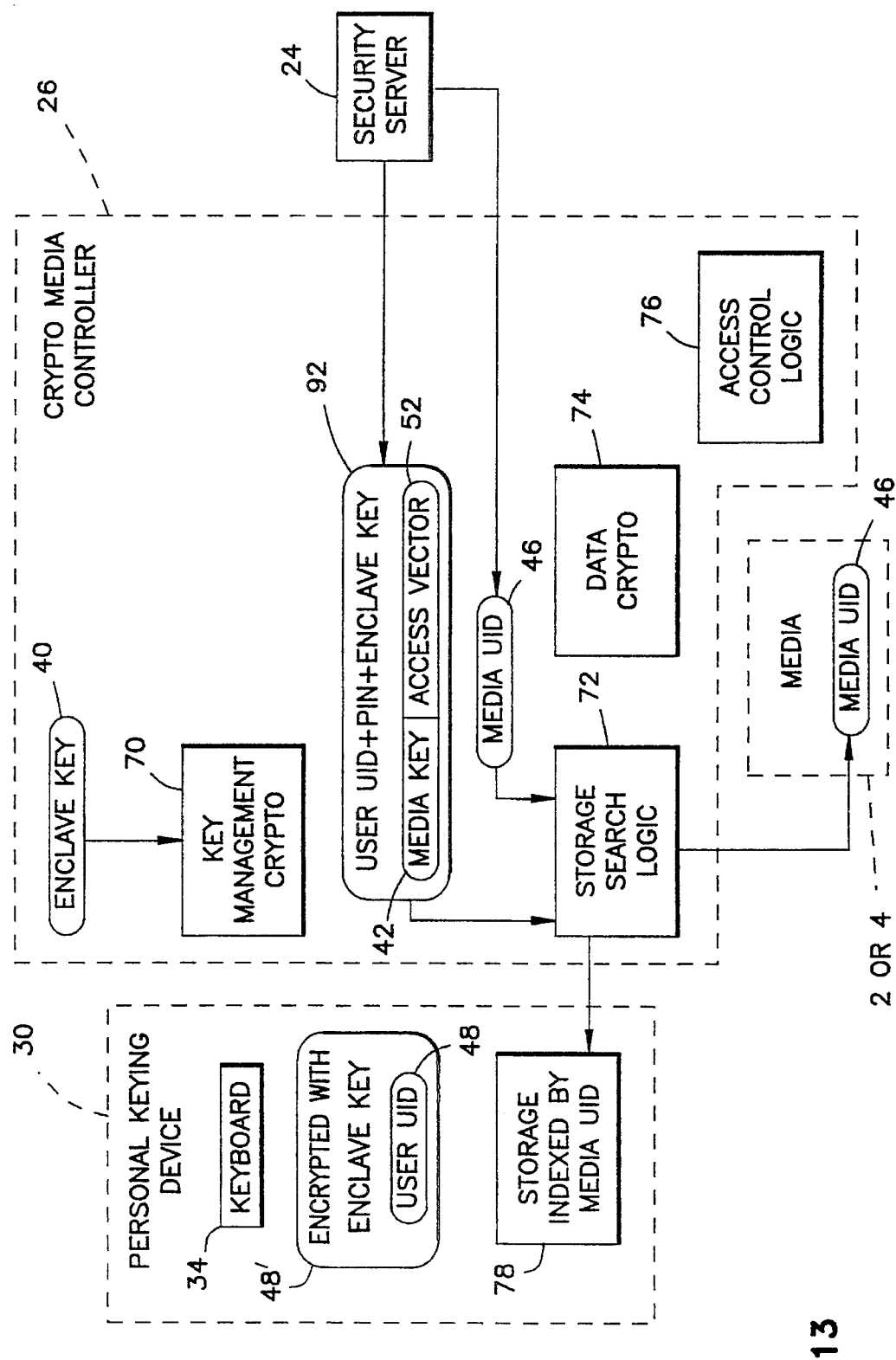
FIG. 13 is a simplified block diagram illustrating the steps for Media UID and "Key Packet" assignment, implemented in the Media Initialization and Key Generation phase of Data Enclave operation.

Step 12 (FIG. 13)

The Media UID 46 arrives at Crypto Media Controller 26 and is written to the appropriate location on Media 2 or 4 (e.g., Volume Label).

Step 13 (FIG. 13)

The enciphered Media Key/Access Vector pair packet 92 arrives at Crypto Media Controller 26 and the Media UID 46 is used as an index to store the enciphered pair packet 92 in Personal Keying Device 30.

At this point the initialization process is complete. The media can be identified and the individual Personal Keying Device 30 contains a Media Key 42 which can only be used by someone who has physical possession of that Personal Keying Device 30, knows that individual's PIN 50, and has the Media 2 or 4 controlled by a Crypto Media Controller 26 containing the Enclave Key 40. The individual's Personal Keying Device 30 also contains an Access Vector 52 which defines further restrictions on access in a manner that is specific to the individual who has physical possession of that Personal Keying Device 30 and knows that individual's PIN 50.

Key Assignment

The operations in the Key Assignment Phase of the invention occur when an already-initialized unit of Media 2 or 4 is to be shared with a user 5 other than the one who initialized it. In this case, the unit of Media 2 or 4 has a Media Key 42 generated for it, and a Media Key/Access Vector pair 91 has been assigned to the initial user of the unit Media 2 or 4. The necessary steps are to copy the Media Key/Access Vector pair 91 to the new user 5.

The operations in this description are keyed to the diagrams in FIG. 14 through FIG. 18. The logic used to implement the Trusted Path facilities is omitted from these diagrams.

Figure 14:
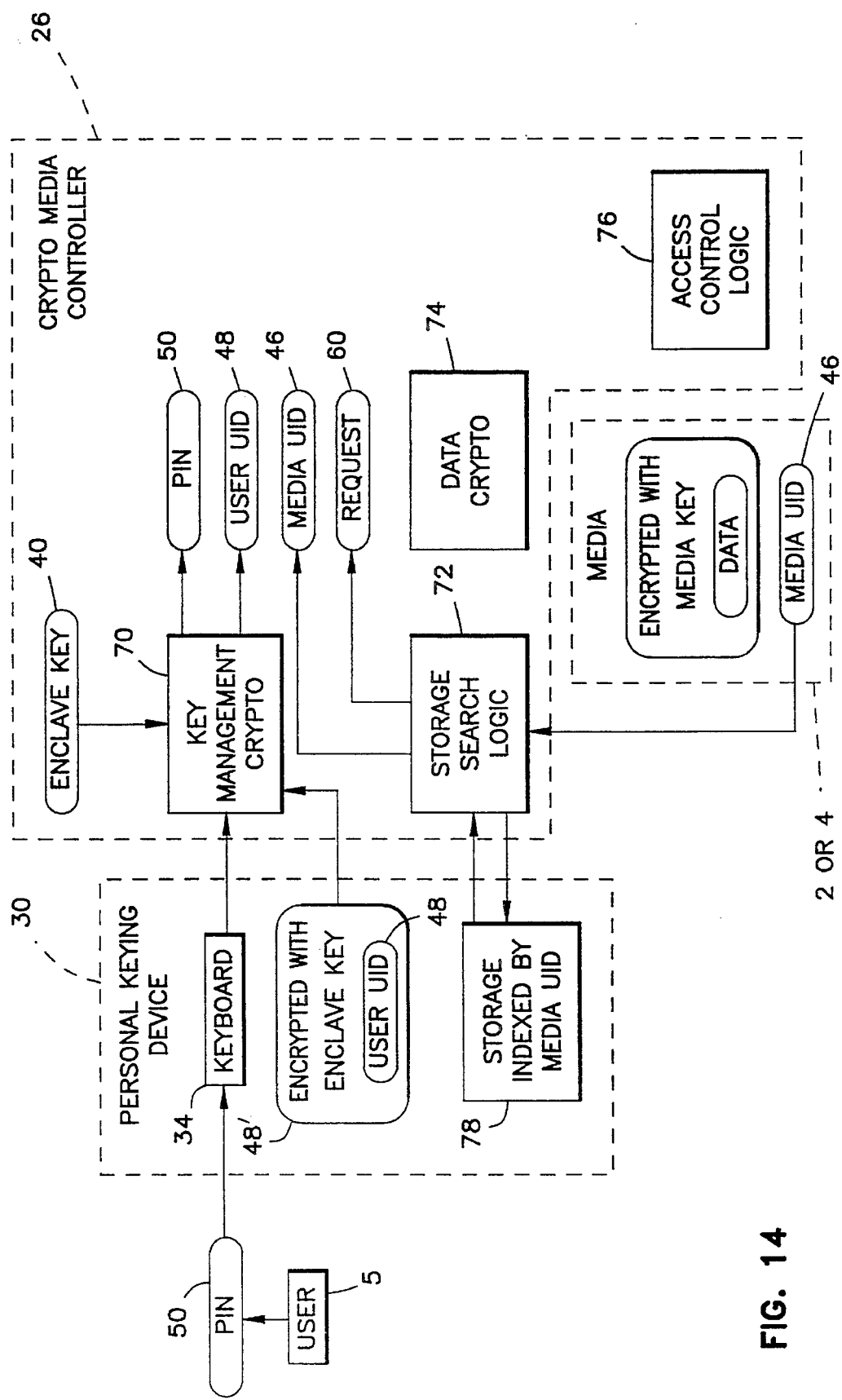
FIG. 14 is a simplified block diagram illustrating the steps for extracting identification data and forming a Request, implemented in the Key Assignment phase of Data Enclave operation.

Step 1 (FIG. 14)

An individual brings together a unit of physical Media 2 or 4 and his or her Personal Keying Device 30 to a Workstation 10 which is equipped with Crypto Media Controller 26, and which is attached to the Local Area Network 12. If Media 2 or 4 is removable, this is done by carrying Media 4 and their Personal Keying Device 30 to an appropriate Workstation 10. If Media 2 or 4 is permanently installed (fixed media), Personal Keying Device 30 is brought to the computer containing the fixed Media 2 controlled by Crypto Media Controller 26.

Step 2 (FIG. 14)

The individual desiring access to Media 2 or 4 then enters his or her PIN 50 into Personal Keying Device 30 which transmits it to Crypto Media Controller 26, where it is stored for use in later steps.

Step 3 (FIG. 14)

Crypto Media Controller 26 then extracts the encrypted User UID 48 from Personal Keying Device 30, decrypts the User UID 48 using the Enclave Key 40 and stores it for use in later steps.

Step 4 (FIG. 14)

Storage Search Logic 72 in Crypto Media Controller 26 then reads the Media UID 46 off Media 2 or 4 and searches Personal Keying Device 30 for a Media Key/Access Vector pair 91 for this unit of Media 2 or 4 for this user 5. Finding none, it generates a Request 60 for key assignment.

Figure 15:
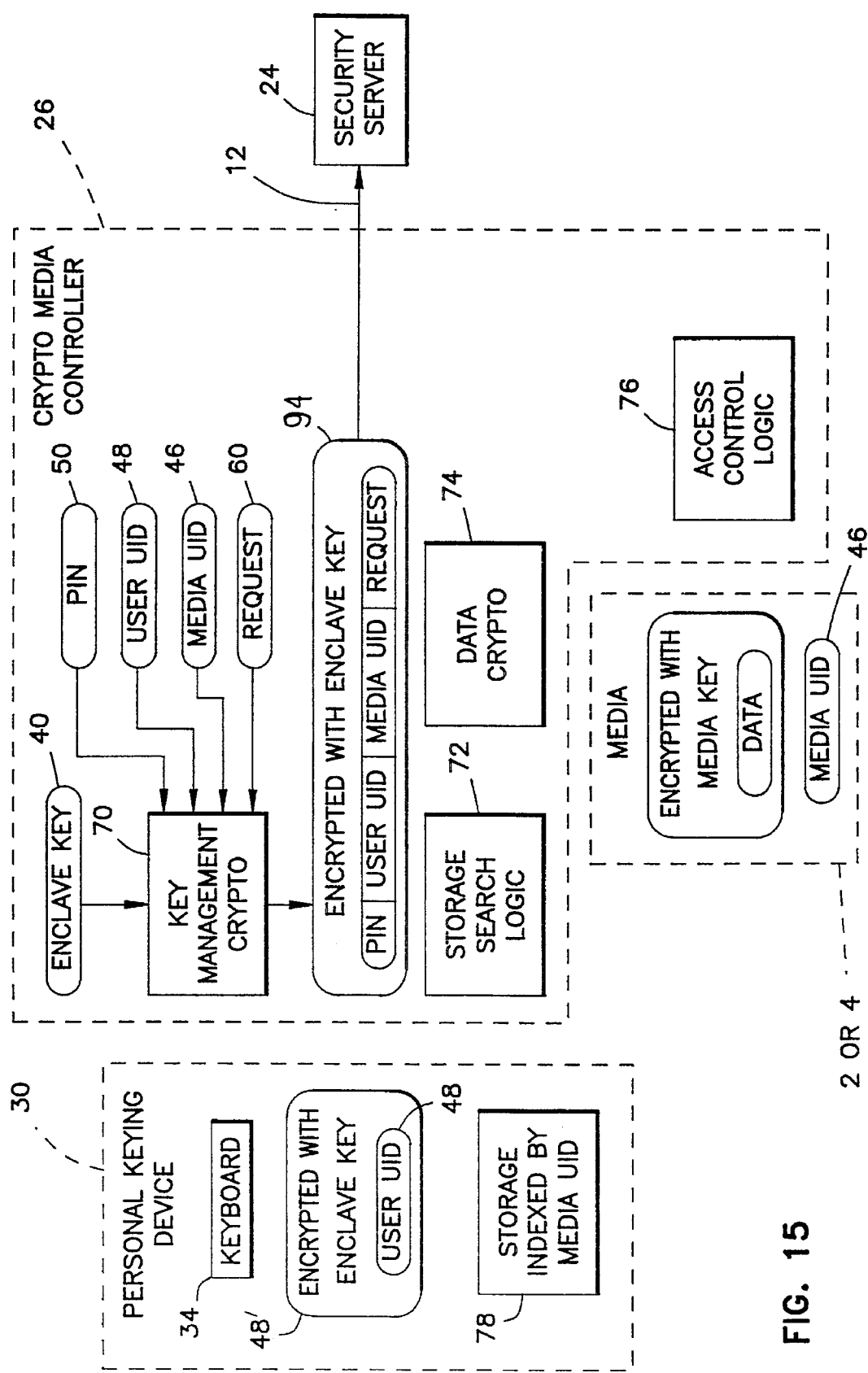
FIG. 15 is a simplified block diagram illustrating the step for the encryption and transmission of a "Request Packet", implemented in the Key Assignment phase of Data Enclave operation.

Step 5 (FIG. 15)

Key Management Crypto 70 forms a request packet 94 consisting of the PIN 50, User UID 48, Media UID 46 and Request 60, encrypts it with the Enclave Key 40, and transmits it over the Local Area Network 12 to Security Server 24.

Figure 16:
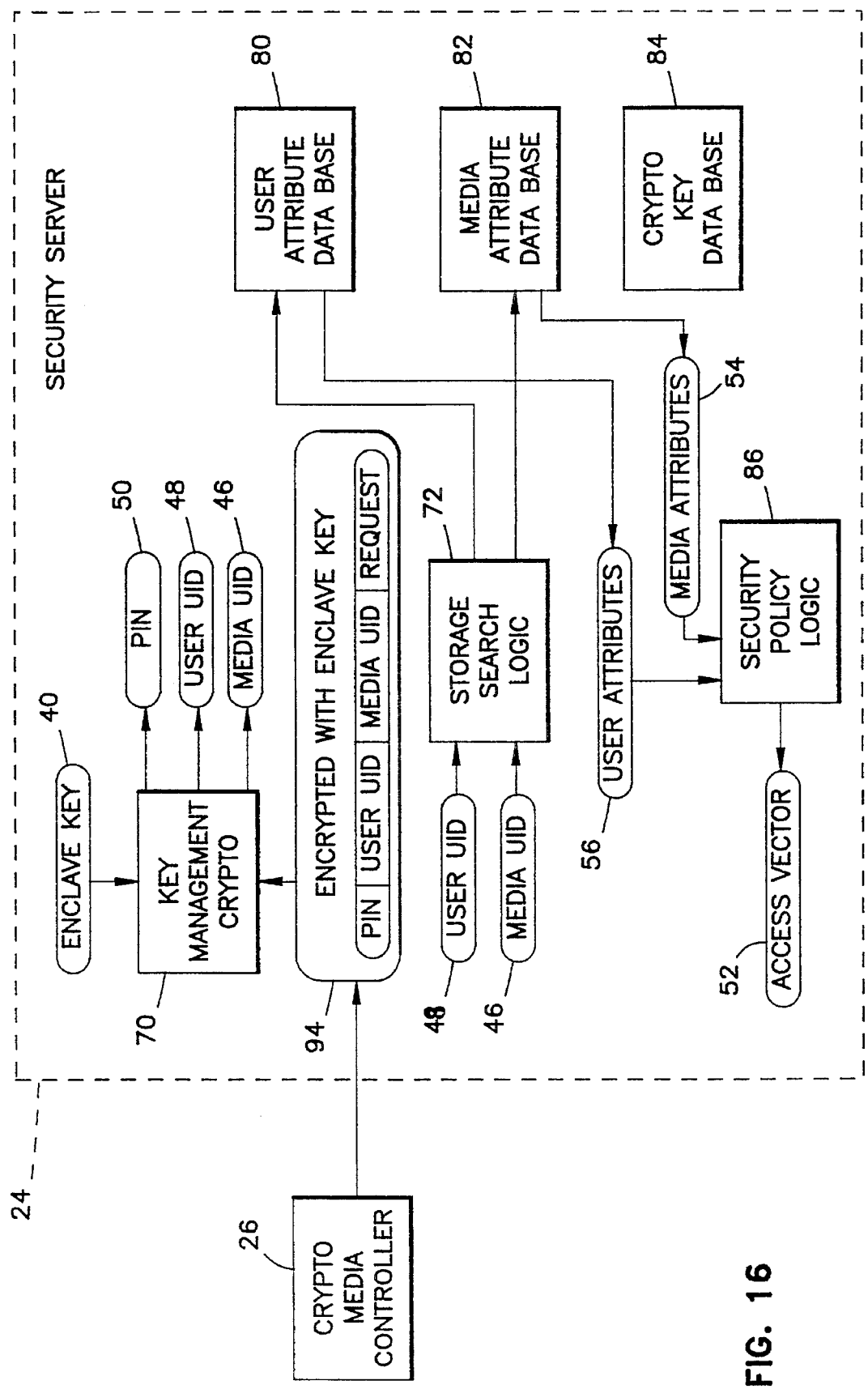
FIG. 16 is a simplified block diagram illustrating the steps for the computation of an Access Vector, implemented in the Key Assignment phase of Data Enclave operation.

Step 6 (FIG. 16)

Security Server 24 receives the encrypted packet 94, decrypts it using its copy of the Enclave Key 40, and stores the PIN 50, User UID 48, Media UID 46 and Request 60 for use in later steps.

Step 7 (FIG. 16)

Storage Search Logic 72 in Security Server 24 uses the User UID 48 to index User Attribute Data Base 80. User Attribute Data Base 80 returns a pass value if the PIN 50 entered by the user 5 was the same as that stored in the data base (i.e. valid). User Attribute Data Base 80 returns a fail value if the PIN 50 entered by the user is invalid. A fail value will cause the assignment process to abort and a notification to be sent back to Crypto Media Controller 26, which will display it to the user in an appropriate fashion. The abort sequence is not diagrammed in the figures.

Step 8 (FIG. 16)

The User UID 48 is used as an index into User Attribute Data Base 80 by Storage Search Logic 72, and the Security Attributes 57 of the user 5 requesting key assignment are extracted and passed to Security Policy Logic 86.

Step 9 (FIG. 16)

The Media UID 46 is used as an index into Media Attribute Data Base 82 by Storage Search Logic 72, and the Security Attributes 57 of the denoted item of Media 2 or 4 are extracted and passed to the Security Policy Logic 86.

Step 10 (FIG. 16)

Security Policy Logic 86 accepts these Attributes 57, and, using a set of rules defined by the administrators of the facility, computes an Access Vector 52 which defines limits on the access this user 5 may have to this unit of Media 2 or 4. This computation may involve the intervention of administrative personnel to authorize the granting or denying of certain privileges. This Access Vector 52 is saved for use in later steps.

Figure 17:
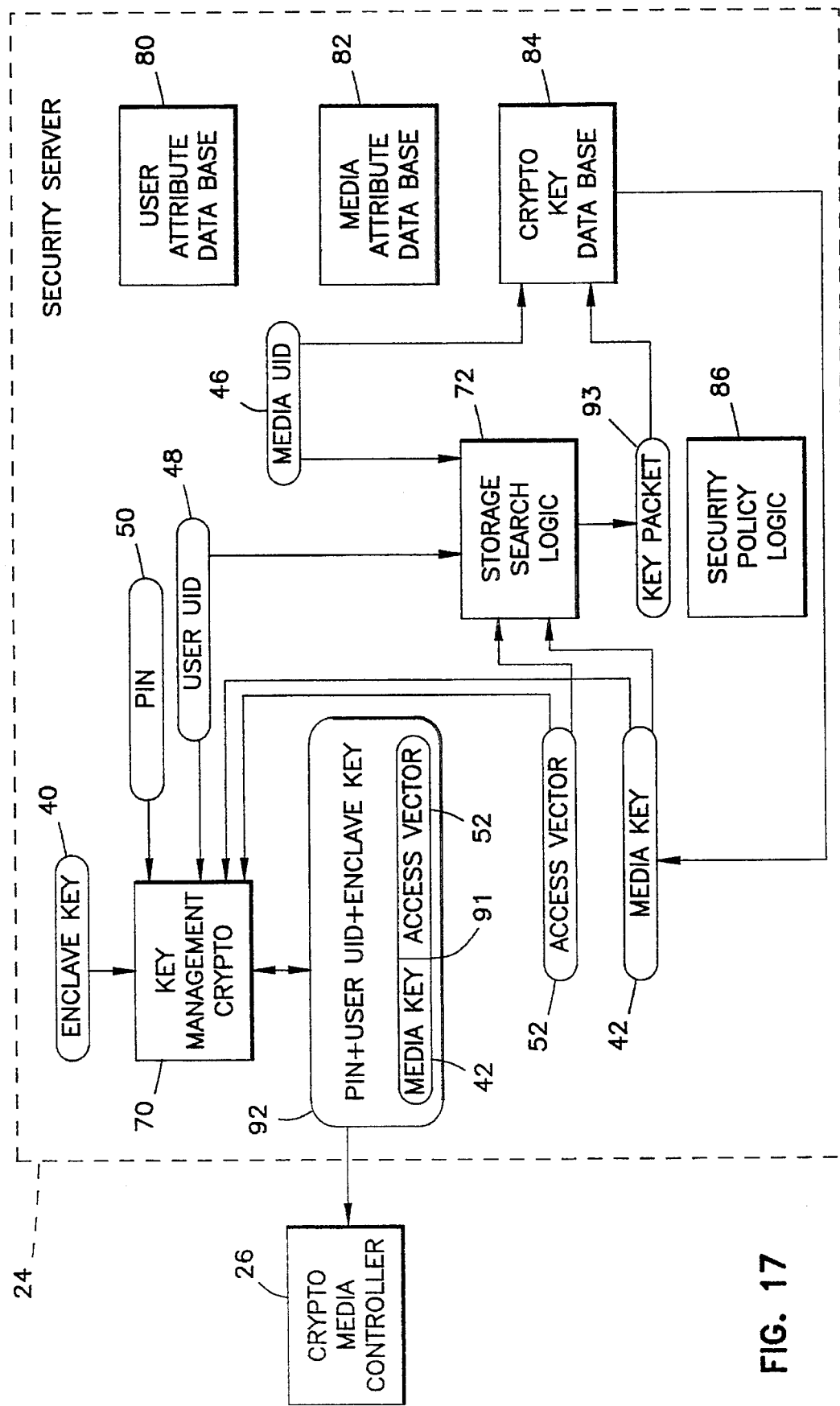
FIG. 17 is a simplified block diagram illustrating the steps for key generation, storage, and transmission, implemented in the Key Assignment phase of Data Enclave operation.

Step 11 (FIG. 17)

The Media UID 46 is used by Storage Search Logic 72 to find an enciphered key packet in Crypto Key Data Base 84 which has been previously stored and which contains a Media Key 42 for this unit of media. Since the Media 2 or 4 has been initialized and assigned a Media UID 46, then at least one such packet must exist. Any such packet will suffice, since all packets pertaining to a given unit of Media 2 or 4 will contain the same Media Key 42. When such a packet is found, the Media Key 42 is extracted from it for use in later steps.

Step 12 (FIG. 17)

A new Key Packet 93 is formed consisting of the Media Key 42, Access Vector 52, User UID 48, and Media UID 46 and placed in Crypto Key Data Base 84 for archival storage and retrieval.

Step 13 (FIG. 17)

The Media Key and Access Vector pair 91 are enciphered with a Combined Key 44 consisting of the User UID 48, the user's PIN 50, and the Enclave Key 40, and the enciphered packet 92 is transmitted along the LAN 12 to Crypto Media Controller 26.

Figure 18:
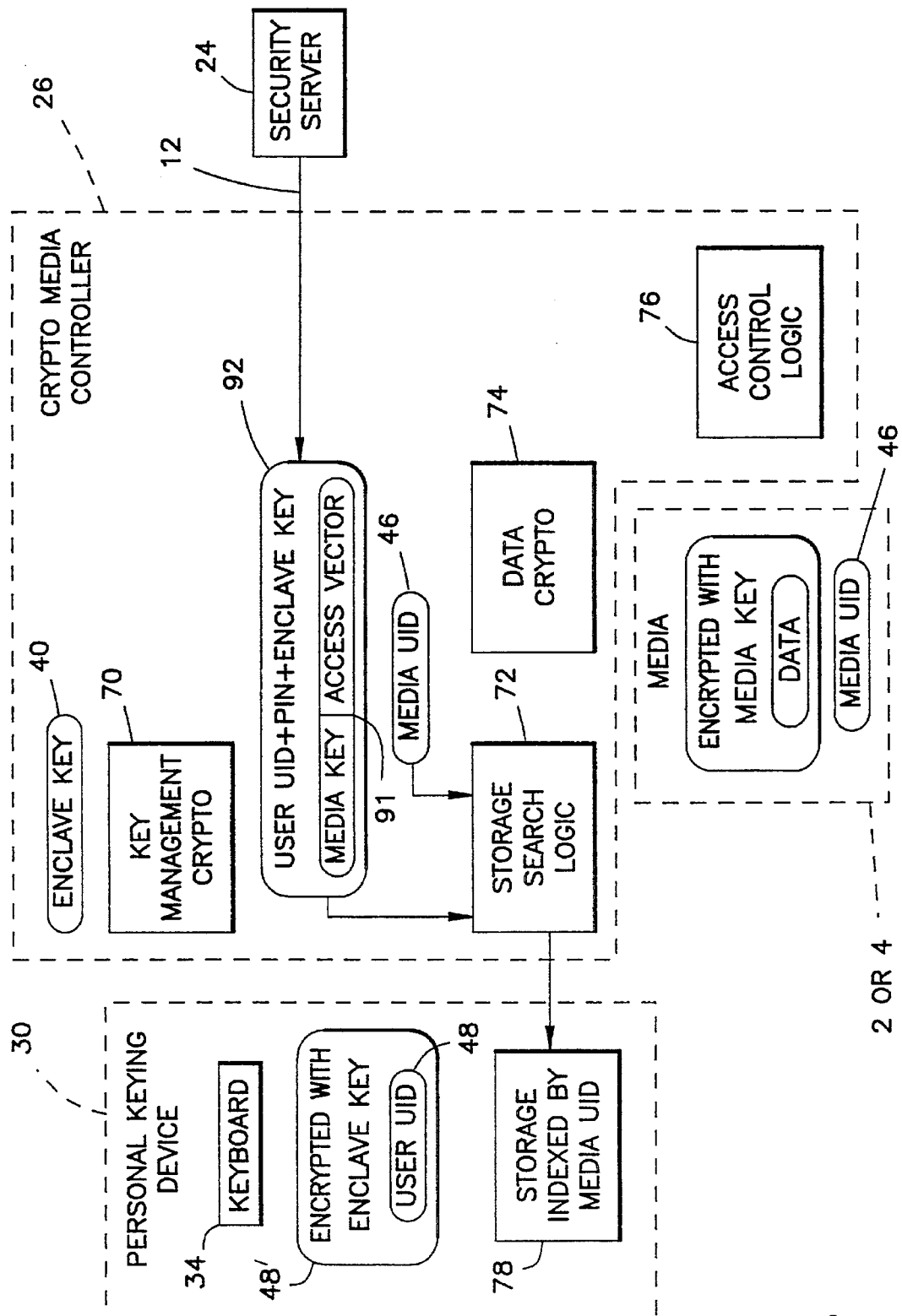
FIG. 18 is a simplified block diagram illustrating the step for the transfer of the key to the personal keying device, implemented in the Key Assignment phase of Data Enclave operation.

Step 14 (FIG. 18)

The Media UID 46 is used as an index to store the enciphered Media Key/Access Vector pair 91 in Personal Keying Device 30.

At this point the new individual's Personal Keying Device 80 contains a Media Key 42 which can only be used by someone who has physical possession of that Personal Keying Device 30, knows that individual's PIN 50, and has the Media 2 or 4 controlled by a Crypto Media Controller 26 containing the Enclave Key 40. The individual's Personal Keying Device 30 also contains an Access Vector 52, which defines further restrictions on access in a manner that is specific to the individual who has physical possession of that Personal Keying Device 30 and knows that individual's PIN 50.

Keying of Devices

The operations in the Keying of Devices Phase occur when a Media Key/Access Vector pair 91 for a unit of Media 2 or 4 has been assigned to a user 5, and that user 5 wants to exercise the assigned accesses. The steps in this description are keyed to the diagrams in FIGS. 19 and 20. The logic used to implement the Trusted Path facilities is omitted from these diagrams.

Figure 19:
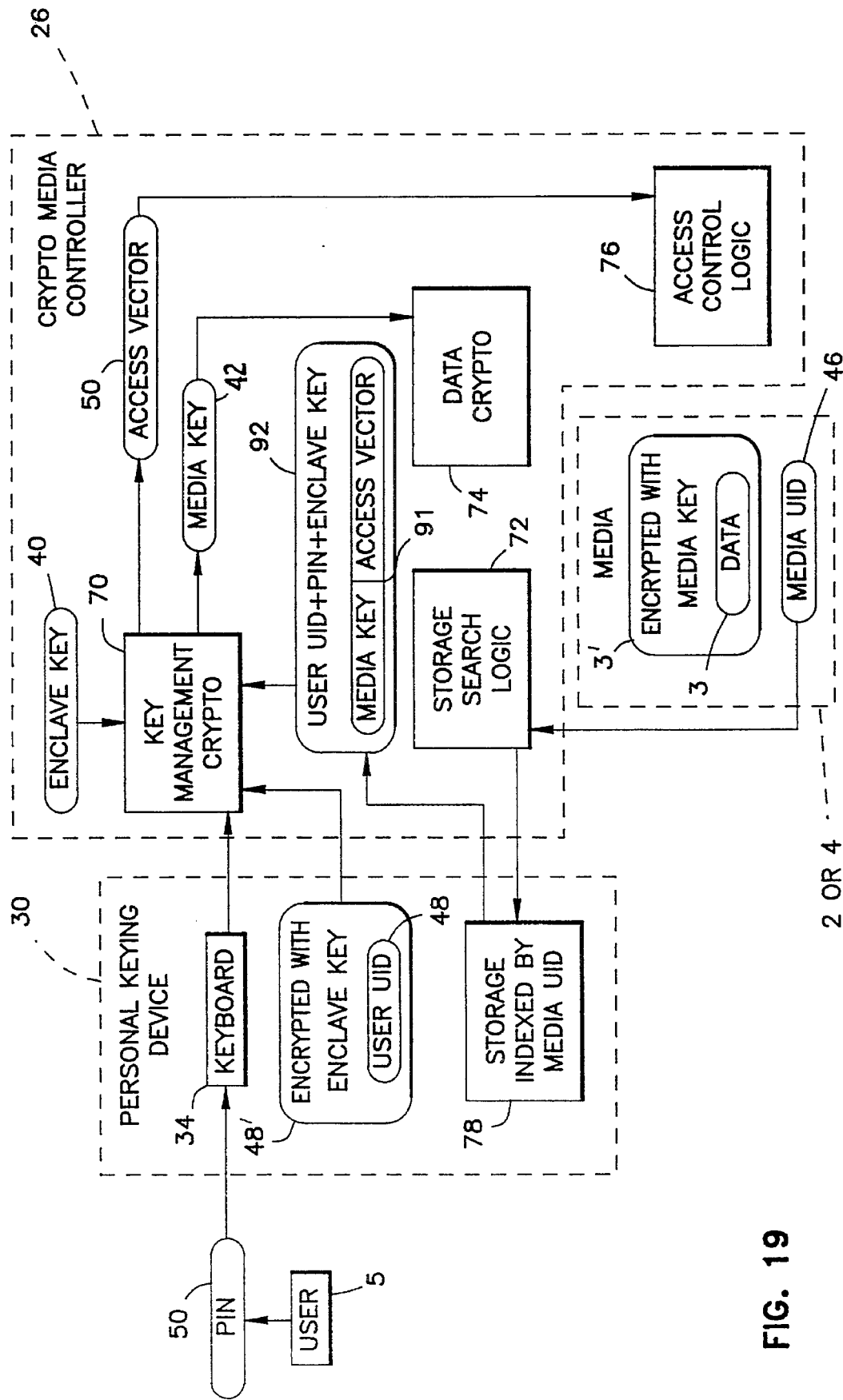
FIG. 19 is a simplified block diagram illustrating the steps for Media Key and Access Vector extraction, implemented in the Keying of Devices phase of Data Enclave operation.

Step 1 (FIG. 19)

An individual user 5 establishes a data transfer interface between his or her Personal Keying Device 30 and any Crypto Media Controller 26 containing the Enclave Key 40, and between that Crypto Media Controller 26 and Media 2 or 4 the individual user 5 desires to access. In the latter case, this will involve placing the unit of Media 4 into the appropriate device (e.g., diskette drive).

Step 2 (FIG. 19)

The individual user 5 desiring access to Media 2 or 4 then enters his or her PIN 50 into Personal Keying Device 30 which transmits it to Crypto Media Controller 26, where it is stored for use in later steps.

Step 3 (FIG. 19)

Storage Search Logic 72 in Crypto Media Controller 26 reads the Media 2 or 4 and extracts the Media UID 46.

Step 4 (FIG. 19)

Using the Media UID 46, Storage Search Logic 72 searches Storage 78 in Personal Keying Device 30 and extracts the enciphered Media Key/Access Vector pair packet 92 and passes it to Key Management Crypto 70.

Step 5 (FIG. 19)

The enciphered User UID 48' is fetched from Personal Keying Device 30 and deciphered using the Enclave Key 40.

Step 6 (FIG. 19)

The User UID 48, PIN 50, and Enclave Key 40 are then combined to form the Combined Key 44 to decrypt the Media Key/Access Vector packet 92. The Media Key 42 is passed to Data Crypto 74, and the Access Vector 52 is passed to Access Control Logic 76.

Figure 20:
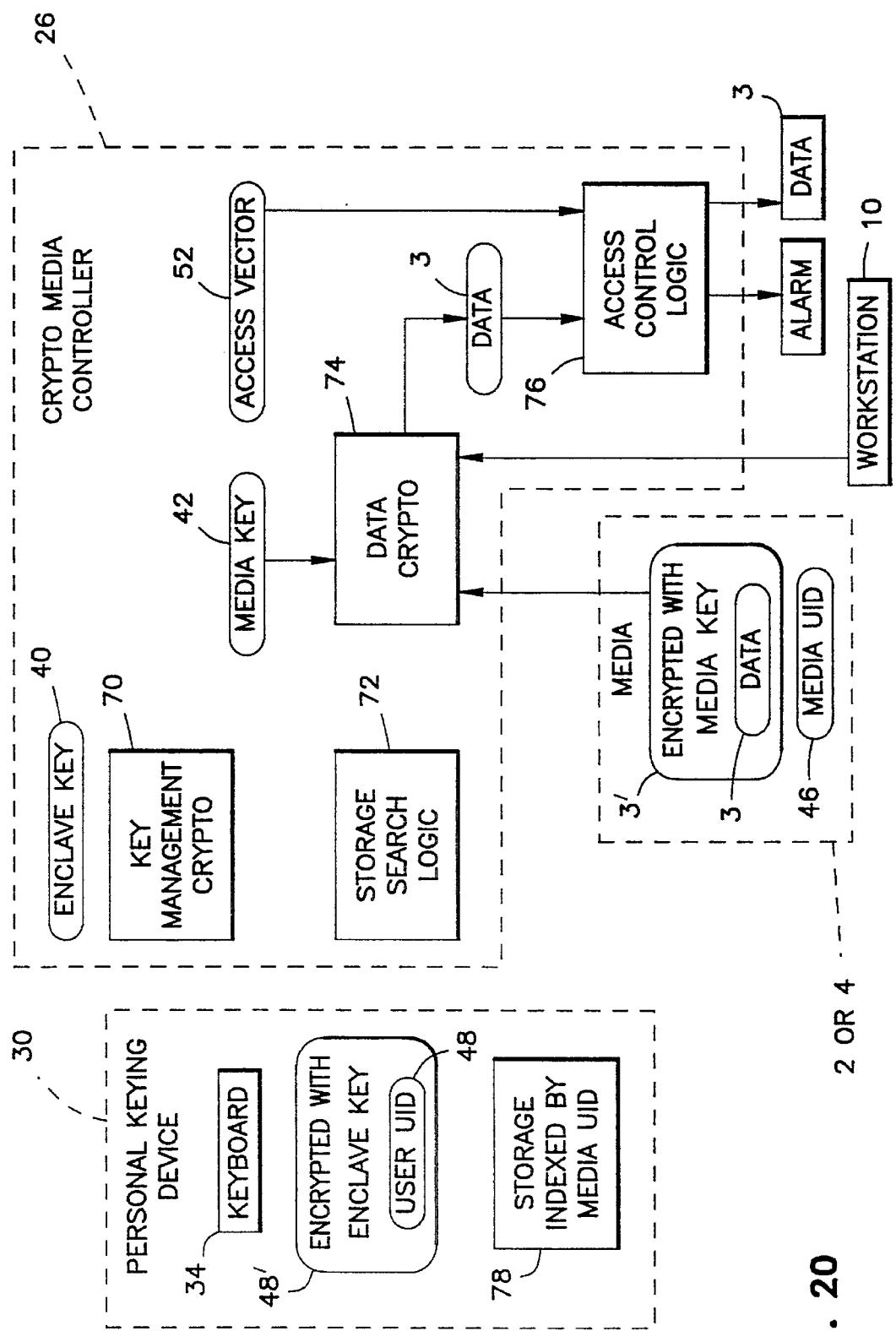
FIG. 20 is a simplified block diagram illustrating the steps for Media Key and Access Vector use, implemented in the Keying of Devices phase of Data Enclave operation.

Step 7 (FIG. 20)

Workstation's 10 internal logic makes a request for data. That logic need not be aware the data is protected by cryptography. The request illustrated in the figure is a "read" request, but the handling of "write" requests are symmetric.

Step 8 (FIG. 20)

Enciphered data 3' is then fetched from Media 2 or 4.

Step 9 (FIG. 20)

Data Crypto 74 deciphers the data using the Media Key 42 and passes data 3 to the Access Control Logic 76.

Step 10 (FIG. 20)

Access Control Logic 76 consults the Access Vector 52 and the Device Attributes 58 contained within itself and decides whether the desired mode of access ("read," "write," etc.) shall be permitted. If not, the data transfer is aborted and an error indication is sent to the Workstation 10.

At this point the data has been transferred to the Workstation 10 for processing. Removal of the Media 2 or 4 or the Personal Keying Device 30 from the Crypto Media Controller 26 will cause the complete reset of the Crypto Media Controller 26 and require the keying process be started from the beginning.

Trusted Path

Identification and Authorization

This phase of the operation involves the steps whereby a user 5 presents his or her identity to the Security Server 24 and has that identity authenticated and a set of privileges associated with the user 5 at the Security Server 24.

This operation is protected against forged identities and authentications, and so-called "replay" attacks in which malicious software in other Workstations 10 masquerades as the authentications mechanism, accepts identification and authorization data (such as passwords) from an unwitting user 5, and then passes that data to an unauthorized individual.

The operation is also protected against compromise of the authentication data in the Personal Keying Device 30. The invention uses the Countersign logic to effect this protection. It will be recalled that Countersigns 62 come in a sequence which is generated by the Security Server 24, but which is computationally infeasible for an outsider to guess. Thus, for each Countersign 62, the Security Server 24 (but no one else) can determine the value of Last Countersign 62'.

The Last Countersign 62' for a given is stored in a distinguished location in that user's Personal Keying Device 30. At each identification and authentication interaction the Last Countersign 62' is extracted from the Personal Keying Device 30 and compared with the Last Countersign 62' independently generated or retrieved by the Security Server 24. If the two values are unequal then it is known that the identification and authentication process has been compromised and suitable alarms are raised.

The manner in which this mechanism operates can be made clear from example. Assume that the sequence of Countersigns 62 is "A," "B," "C," etc. Further assume that a given user's Personal Keying Device 30 contains the Last Countersign 62' value "A". Since it is computationally infeasible for an attacker to guess this value, the attacker's recourse is to either steal the Personal Keying Device 30 or copy the data from it.

If the attacker steals the Personal Keying Device 30, then its absence will be noted and alarms will be raised. If the attacker copies the Last Countersign 62' and by some subterfuge succeeds in being authenticated as the legitimate user 5, then the identification and authentication process will update the Last Countersign 62' value in the spurious Personal Keying Device 30 to "B." When the legitimate user 5 attempts identification and authentication, the Last Counterside 62' in his or her Personal Keying Device 30 will still be at "A"; the difference will be noted by the Security Server 24 and alarms raised.

Thus, the copying and successful use of data from a Personal Keying Device 30 will enable a false identity to be presented to the Security Server 24 only until the time at which the legitimate user 5 attempts identification and authentication.

The steps involved in this phase of the operation are keyed to the diagrams given in FIG. 21 through FIG. 24. The logic used in data protection is omitted from these diagrams.

Figure 21:
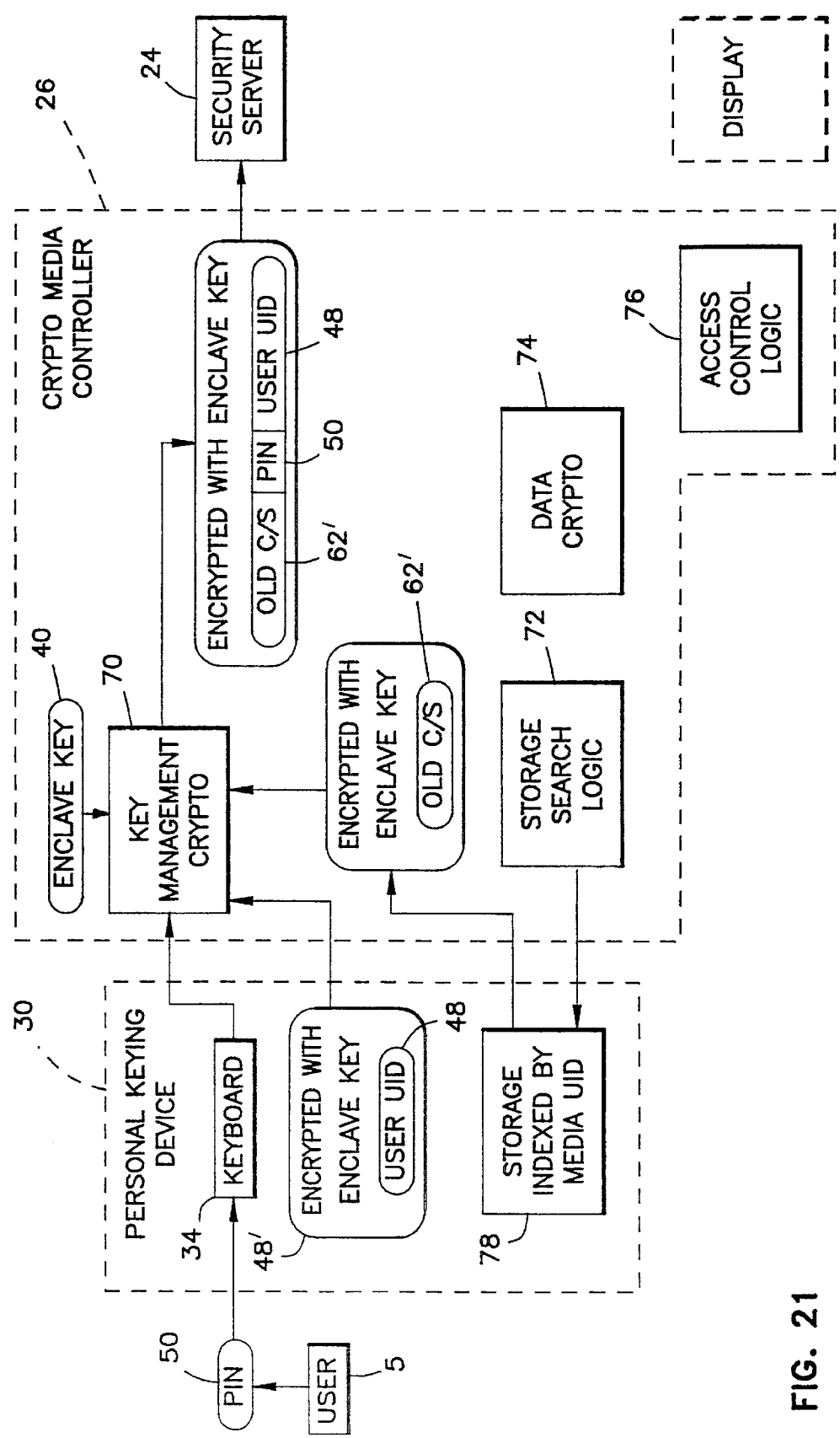
FIG. 21 is a simplified block diagram illustrating the steps for the initialization of the authentication process, implemented in the Identification and Authentication phase of Trusted Path operation.

Step 1 (FIG. 21)

The User UID 48, encrypted with the Enclave Key (48') is extracted from the user's Personal Keying Device 30.

Step 2 (FIG. 21)

The Last Countersign 62' (denoted "Old C/S" in FIG. 21), encrypted with the Enclave Key 40, is extracted from the user's Personal Keying Device 30.

Step 3 (FIG. 21)

The user 5 desiring access to operations on the Security Server 24 then enters his or her PIN 50 through the keyboard on the Personal Keying Device 30.

Step 4 (FIG. 21)

The User UID 48' and Last Countersign 62' are decrypted, combined with the PIN 50, and re-encrypted with the Enclave Key 40 for transmission to the Security Server 24.

Figure 22:
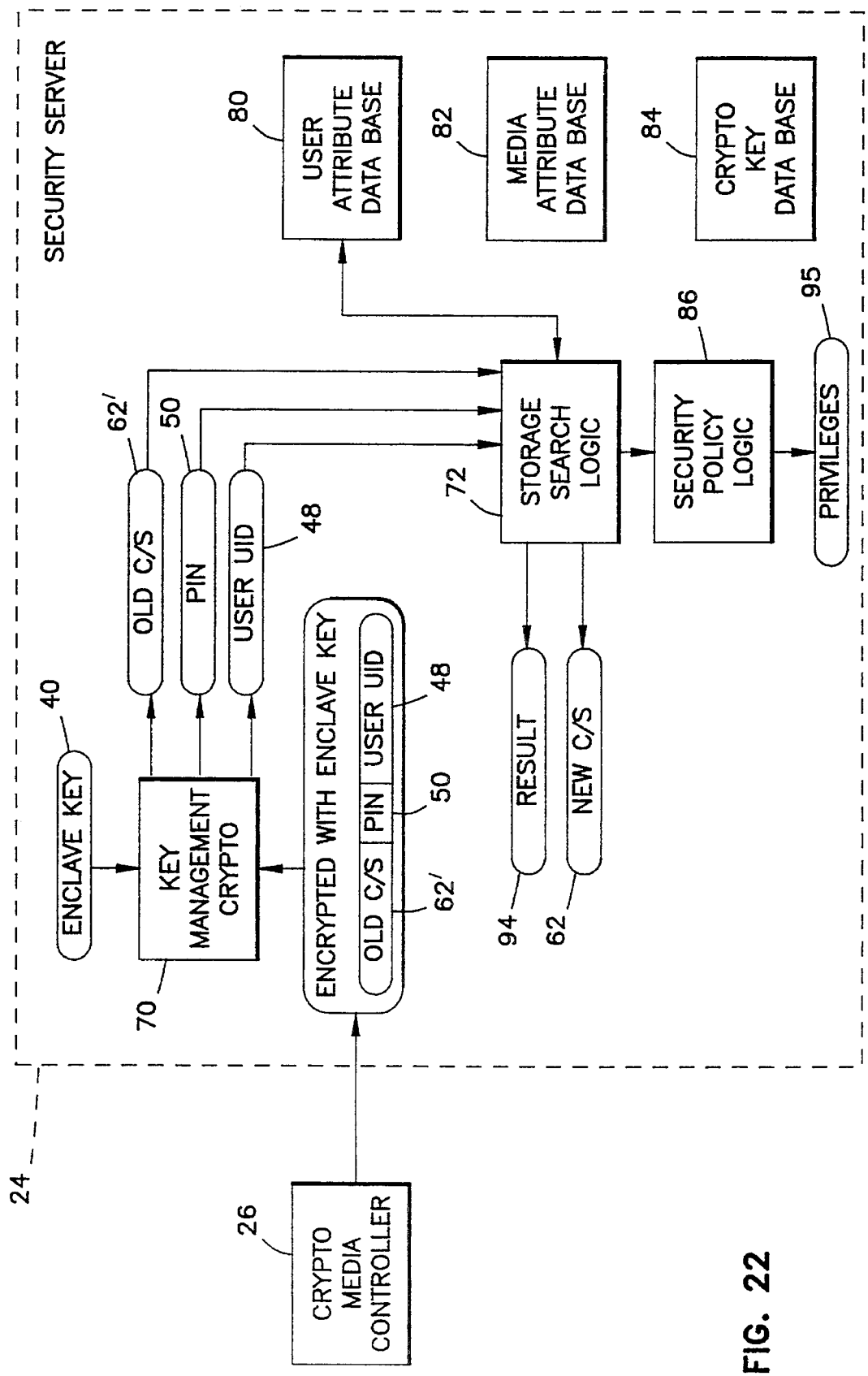
FIG. 22 is a simplified block diagram illustrating the step for the authentication of identity and the establishment of privileges, implemented in the Identification and Authentication phase of Trusted Path operation.

Step 5 (FIG. 22)

The combined Last Countersign 62', PIN 50, and User UID 48 are decrypted using the Enclave Key 40 and passed to the storage search logic 72. That logic searches the User Attributes Data Base 80 for the authentication record belonging to this user 5, compares the User UID/PIN combination 92 that was entered against the stored value, and checks the Last Countersign 62' from the Personal Keying Device 30 against the stored value from the previous identification and authentication interaction. Based on these checks the logic computes a Result 94 (e.g., "Login Successful," "Login Failed") and in the case of successful identification, a set of privileges which that user may exercise in future interactions with the Security Server 24. Also in the case of successful identification, the next Countersign 62 in the sequence is generated, stored in the User Attribute Data Base 80 as the new Last Countersign 62' and saved for use in the next step. This value is denoted "New C/S" in the figures.

Figure 23:
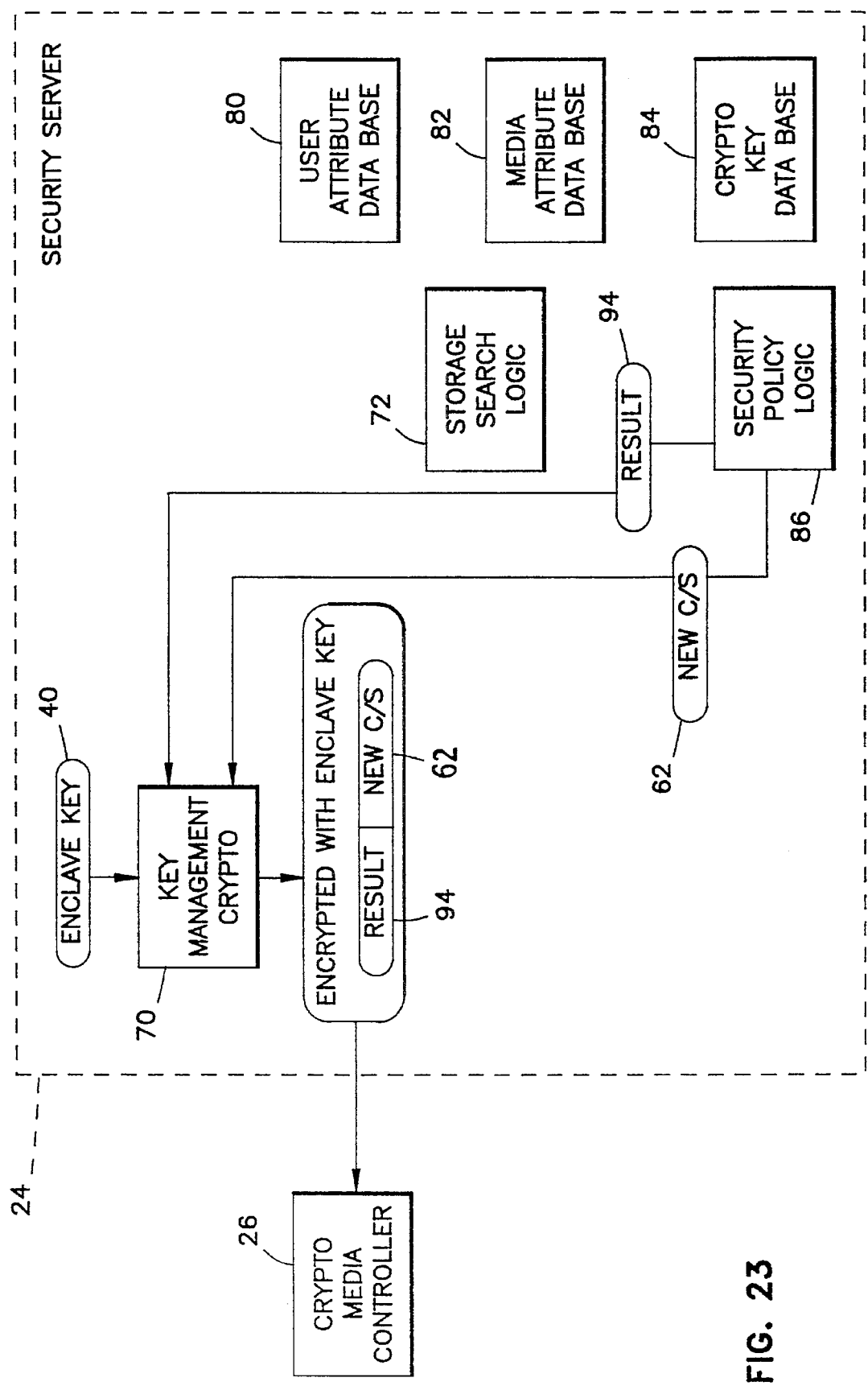
FIG. 23 is a simplified block diagram illustrating the step for the preparation and transmission of the "Response Packet", implemented in the Identification and Authentication phase of Trusted Path operation.

Step 6 (FIG. 23)

The Result 94 and the updated Countersign 62 value is encrypted with the Enclave Key 40 and transmitted to the Crypto Media Controller 26.

Figure 24:
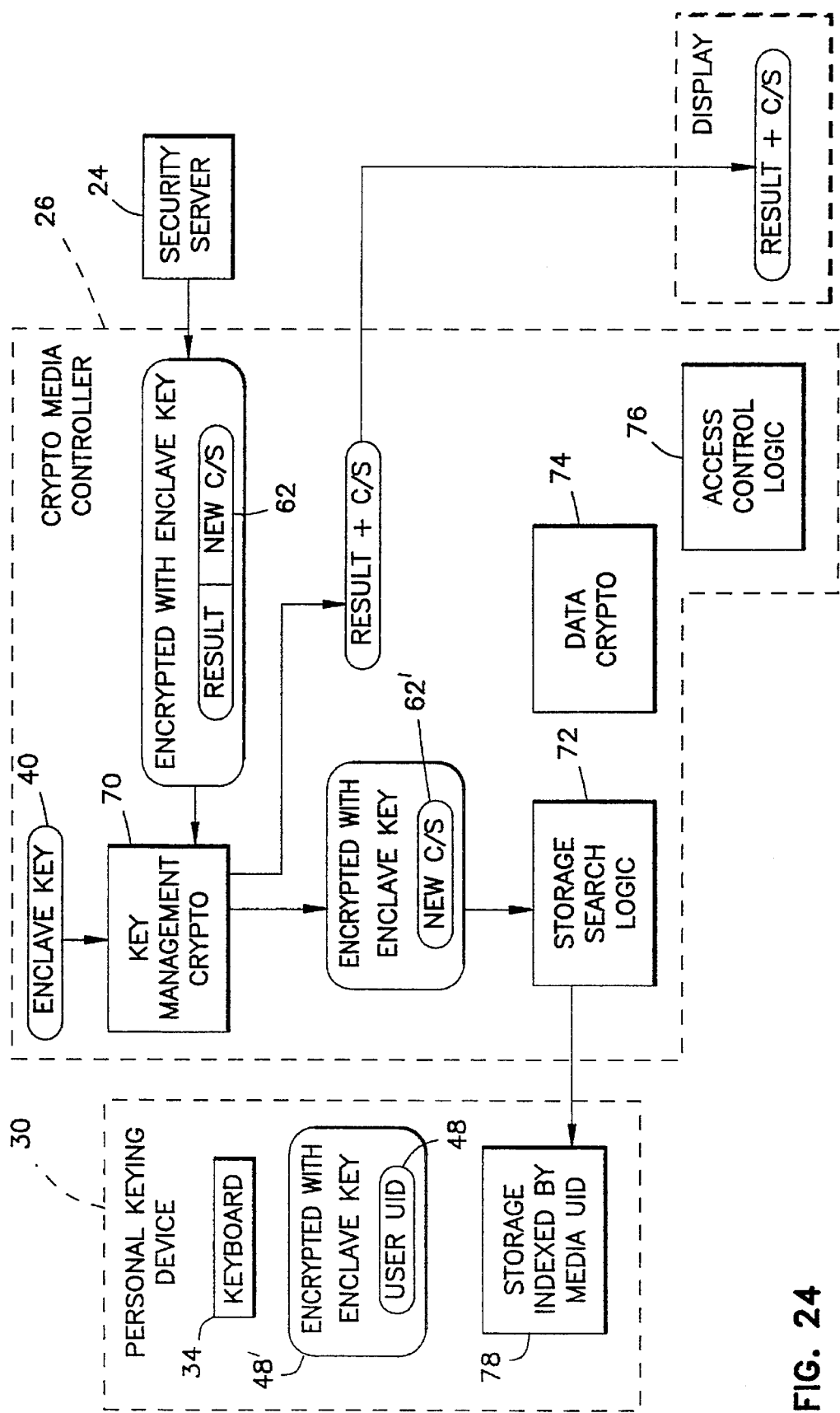
FIG. 24 is a simplified block diagram illustrating the step for the completion of the authentication sequence, implemented in the Identification and Authentication phase of Trusted Path operation.

Step 7 (FIG. 24)

The combined Result and updated Countersign 62 is decrypted. The updated Countersign 62 is encrypted with the Enclave Key 40 and stored in the user's Personal Keying Device 30 as the new value of Last Countersign 62'. The Countersign and result are displayed on the display portion of the Personal Keying Device 30.

At this point, the user has been authenticated to the Security Server 24 and assigned a set of Privileges 95, which may be invoked at a later time. The Security Server 24 has also displayed to the user 5 the Countersign 62 that it will use in the session to authenticate itself to the user.

Privileged Services

This phase of the operation involves a user 5, whose identity has already been presented to and authenticated by the Security Server 24, invoking a privileged operation by that Server 24. The user is identified to the Security Server 24 by the User UID 48. The Security Server 24 is authenticated to the user by the Countersign 62.

The steps involved in this phase of the operation are keyed to the diagrams given in FIG. 25 to FIG. 28. The logic used in data protection is omitted from these diagrams.

Figure 25:
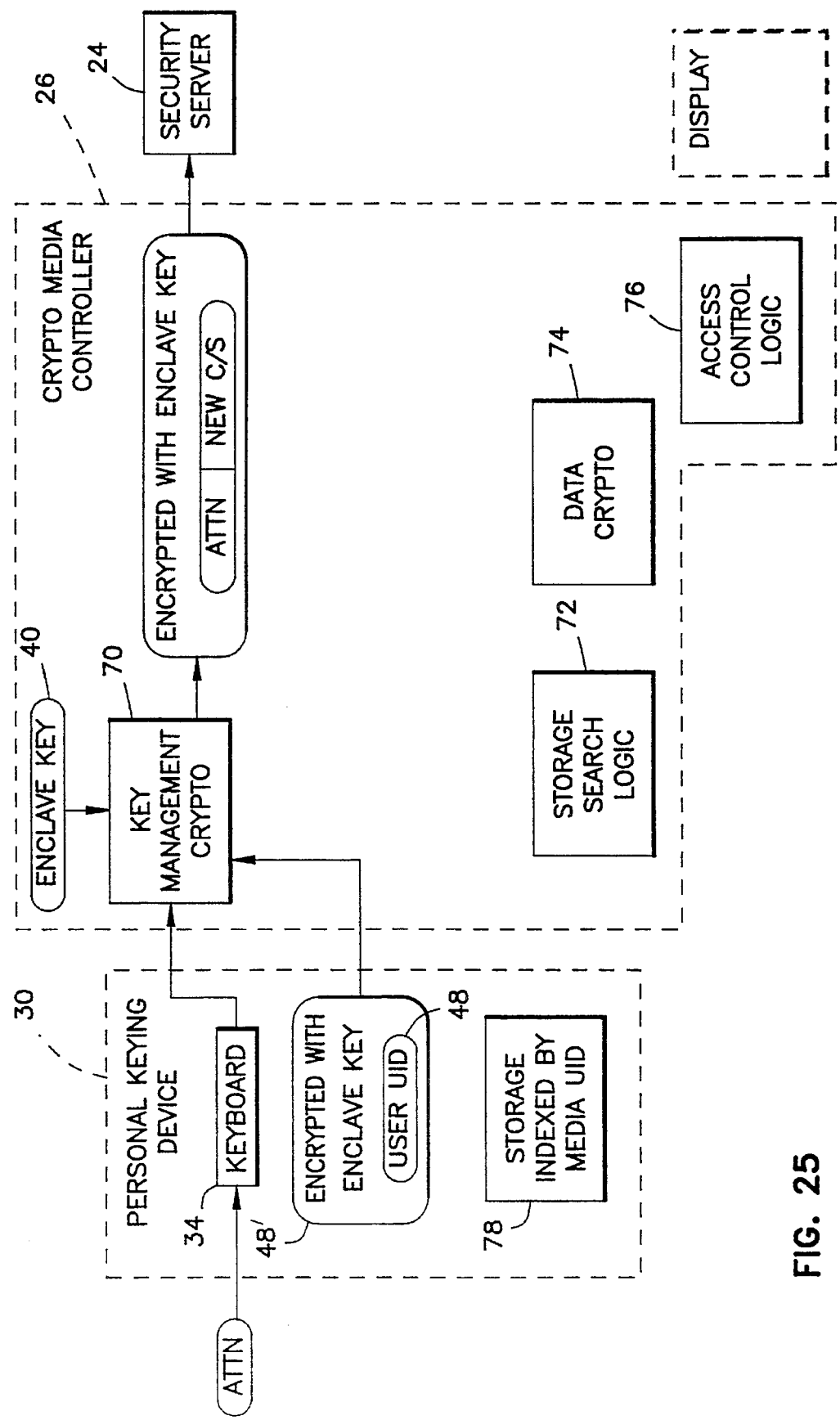
FIG. 25 is a simplified block diagram illustrating the steps for the initiation of a privileged operation, implemented in the Privileged Services phase of Trusted Path operation.

Step 1 (FIG. 25)

The user 5 signals his or her desire to invoke a privileged operation by an appropriate entry in the keyboard 34 of the Personal Keying Device 30. This entry is shown as "ATTN" in the Figures. The User UID 48 is then extracted from the Personal Keying Device 30.

Step 2 (FIG. 25)

The combination of the "ATTN" signal and the User UID 48 is encrypted with the Enclave Key 40 and transmitted to the Security Server 24.

Figure 26:
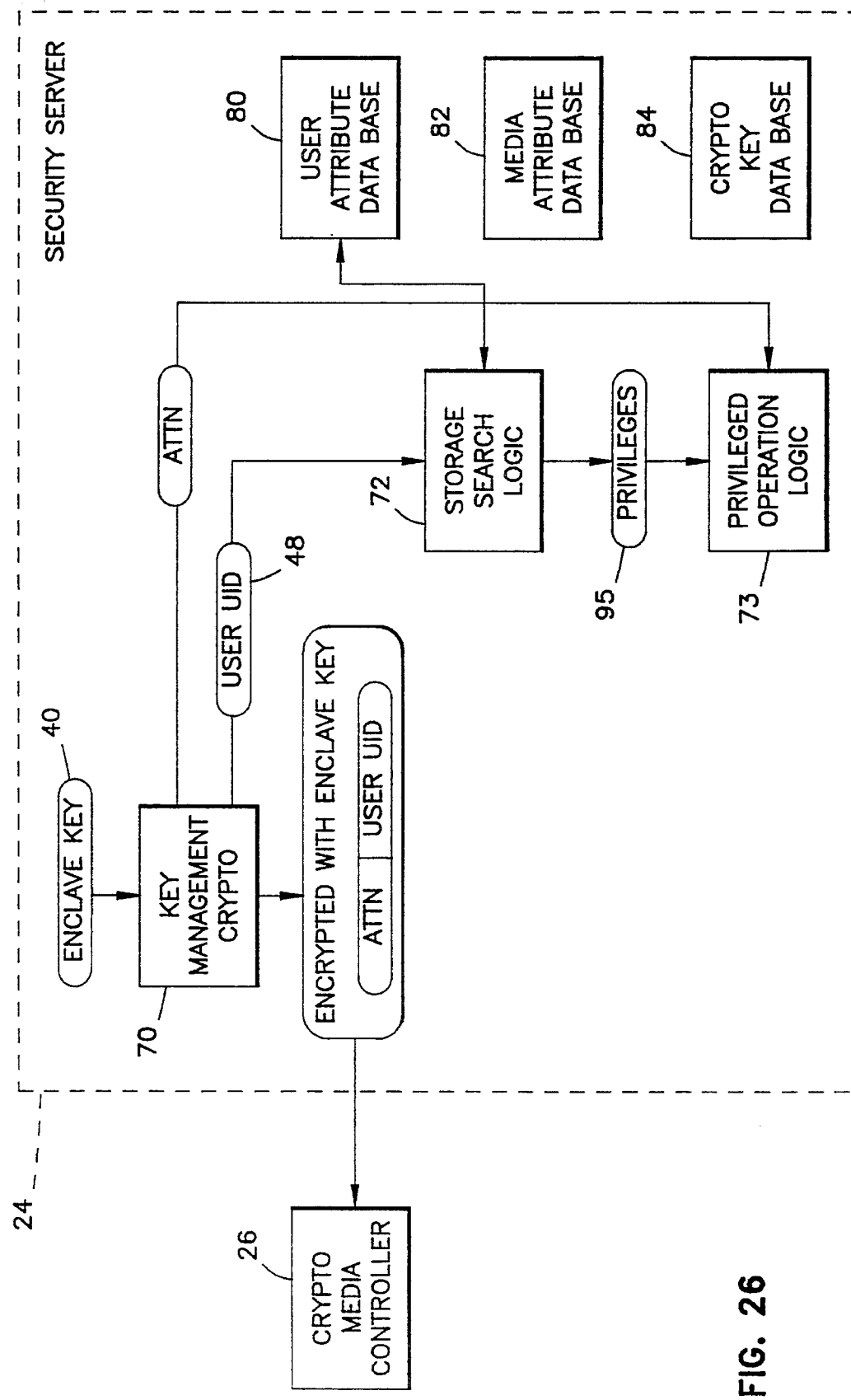
FIG. 26 is a simplified block diagram illustrating the steps for the determination of privileges, implemented in the Privileged Services phase of Trusted Path operation.

Step 3 (FIG. 26)

The combination of the "ATTN" signal and the User UID 48 is decrypted using the Enclave Key 40.

Step 4 (FIG. 26)

The User UID 48 is transferred to the Storage Search Logic 72 and the "ATTN" signal is transferred to the Privileged Operation Logic 73.

Step 5 (FIG. 26)

The Storage Search Logic 72 then extracts the user's Privileges 95 from the User Attribute Data Base 80 and passes them to the Privileged Operation Logic 73.

Figure 27:
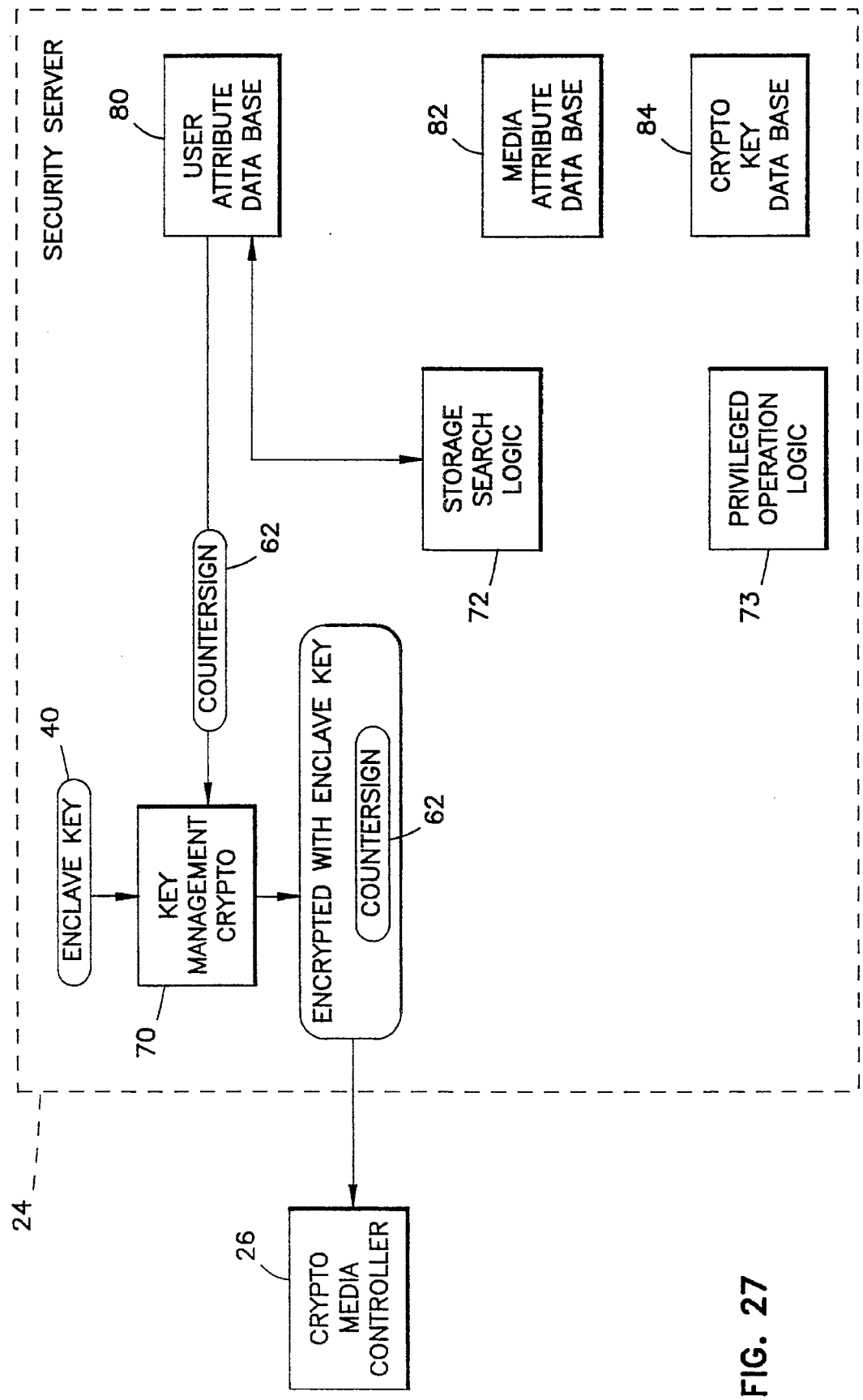
FIG. 27 is a simplified block diagram illustrating the step for the acknowledgment of privileges, implemented in the Privileged Services phase of Trusted Path operation.

Step 6 (FIG. 27)

The Storage Search Logic 72 extracts the Countersign 62 from the User Attribute Data Base 80 and passes it to the Key Management Crypto 70, which encrypts it with the Enclave Key 40 and transmits it to the Crypto Media Controller 26, which initiated the request.

Figure 28:
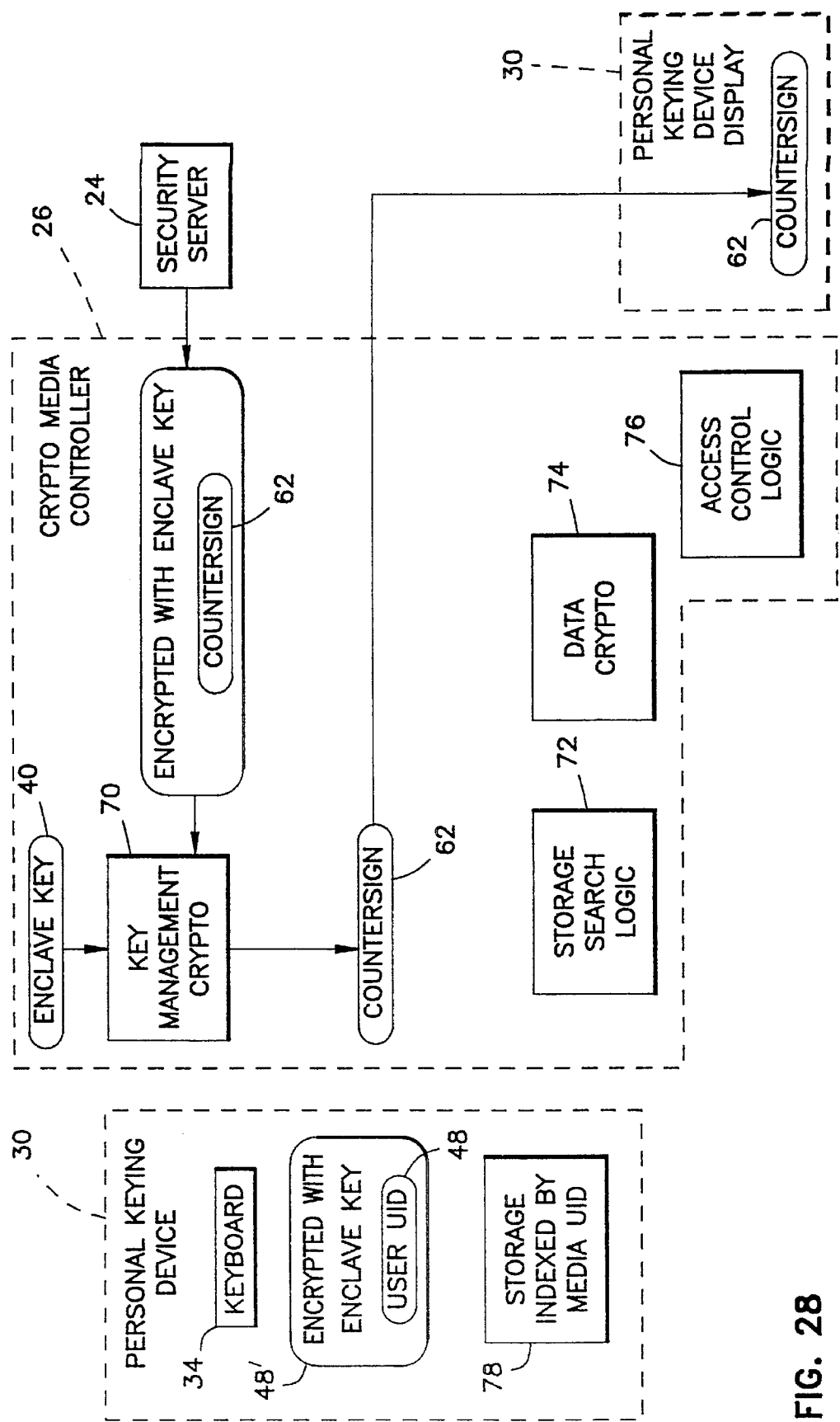
FIG. 28 is a simplified block diagram illustrating the step for the display of the acknowledgment, implemented in the Privileged Services phase of Trusted Path operation.

Step 7 (FIG. 28)

The Crypto Media Controller 26 decrypts the Countersign 62 and causes it to be displayed on the Personal Keying Device 30.

At this point, both the user and the Security Server 24 are aware, in authenticated fashion, that a privileged operation is to be invoked. The invocation of the operation, which may involve multiple interactions, can then proceed. The operation is terminated by a series of steps which is symmetric to those presented above.

An alternate, preferred embodiment of the Trusted Path is described further below, with reference to FIGS. 29–34. The Trusted Path phase of the Data Enclave process is preferably implemented using the relevant aspects of this alternate embodiment. These aspects include Identification and Authentication, Trusted Command Initiation (Privileged Services) and Key Management.

ADVANTAGES OVER PRIOR ART

The Data Enclave System of the present invention provides a number of advantages over the prior art, as outlined below.

Security

The data enclave invention offers comprehensive security to the data within the Enclave 20; there are no "sneak paths" or "holes" that exist in approaches where the data is protected on media but the Wide Area Network 16 connections are open, or vice versa.

The invention minimizes the damage that can be done by privileged individuals who become subverted. Cryptographic keys are transmitted and stored entirely in enciphered form. Well-known techniques (so-called "antitamper" technology) can be used to protect the Enclave Key when it is stored in the Crypto Media Controllers 26 and the Security Server 24. Theft of elements of the invention such as the Personal Keying Device 30 and the Crypto Media Controllers 26 does not compromise any part of the operation of the invention.

Low Cost

The invention uses a small number of special elements in a wide variety of ways. Maximum use is made of the cryptographic devices, which are typically the most expensive parts of a data security device. The same devices are used for media protection and authenticated interactions with the Security Server.

Ease of Use

Individuals desiring access to media have to deal with the Security Server only when media is initialized. "Unlocking" a unit of media requires an operation no more complicated than using a TV remote control. Overhead and delay is concentrated at the time a media is "unlocked" and no delays or incompatibilities are introduced during operations using the media.

Identification and authentication of users to the Security Server 24 is both simpler and more robust than prior art such as passwords. The same basic steps are used for security operations dealing with media and dealing with the Security Server 24.

Exceptional or emergency situations can be accommodated. A trusted command initiation can override a security policy enforced by the Security Server 24 and release data to persons who would normally be unauthorized to access it.

Flexible Control of Media

In the data protection area, the system associates Media 2 or 4 primarily with users and secondarily with machines. This is a more natural structure than one where Media 2 or 4 is only useable on a single machine.

The access control logic, which computes allowed access at the last possible moment using the combination of an individual's Access Vector 52 and the Device Attributes 58 assigned to a particular Workstation, can be used to enforce a variety of security policies. For example, an individual's access to data may be restricted not only on the basis of the individual's attributes, but also to protected physical locations. Thus, an individual's Access Vector 52 may grant "read" access to a unit of media which contains proprietary engineering data, but the comparison against the Device Attributes 58 of the Crypto Media Controller 26 making the access may restrict display of the contents of the unit of media to those machines inside a particular facility or office. Physical security measures can then be used to restrict who may be in the vicinity when the data is displayed. Prior art in this area permits only an "all or nothing" approach to access.

Sharing and Backup of Media

An individual's access to an initialized media can be restored, or a second individual granted access, by bringing together the media, the requisite Personal Keying Device 30, and a Workstation 10 equipped with a Crypto Media Controller 26 that is keyed with the appropriate Enclave Key.

Positive Control of Privileged Operations

Remotely invoked privileged operations at the Security Server 24 are under the positive control of the user 5. That control is cryptographically protected and mutually authenticated.

TRUSTED PATH ALTERNATE PREFERRED EMBODIMENT

As also stated in the "Background of the Invention," the Trusted Path can be used independently of the Data Enclave. Described below is a preferred embodiment of a Trusted Path that is preferably used to implement the Trusted Path operations of the Data Enclave, but which has utility independent of the Data Enclave invention. The Trusted Path of this embodiment can be used for security-relevant interactions between a human user and secure computer, which fall into four broad classes:

1. Identification and Authentication
2. Trusted Command Initiation (privileged services)
3. Trusted Review
4. Key Management

GENERAL ARRANGEMENT

A general arrangement of the Trusted Path is shown in FIG. 29. This arrangement consists of four subsystems: Personal Unit 101, Workstation Unit 102, Untrusted Communications System 103, and part of Secure Computer 104. Personal Unit 101 communicates directly with Workstation Unit 102. Workstation Unit 102 communicates with Secure Computer 104 over Untrusted Communications System 103. It is the elements of Untrusted Communications Systems 103 which are the source of the various threats to secure operation.

Personal Unit 101, Workstation Unit 102, Communications Subsystem 103 and Secure Computer 104 correspond in arrangement and at least general function to the Personal Keying Device 30, Workstation 10, Networks 12 (and 16), and Security Server 24 of the Data Enclave 20, respectively.

DETAILED ARRANGEMENT

Workstation Without Encryption

The Trusted Path comes in two forms, Workstations 102 without encryption and Workstations 102 with encryption. The first form of the Trusted Path is for use with Workstations 102 that do not have a cryptographic unit, such as a Crypto Media Controller installed. In such Workstations 102 the key management function is not necessary. This form of the Trusted Path is illustrated in FIG. 30.

Personal Unit

Personal Unit 101 serves three purposes:

(1) It serves to identify a human user and the Workstation used by that human user to Secure Computer 104.

(2) It is used by the human user to verify that precisely those commands given by the human user to Secure Computer 104 are being executed by it, without tampering or modification by Untrusted Communications System 103.

(3) It is used by the human user to verify that critical and sensitive data in Secure Computer 104 is being displayed to the human user by Untrusted Communications System 103 without tampering or modification.

The human user 5 interacts with Personal Unit 101 by means of Display 113 and Keyboard 114. Interactions are controlled by Logic and Control Unit 111. Personal Unit 101 uses Communication Unit 118 to transmit and receive data to and from Communication Unit 128 in Workstation Unit 102. Communications can be by means of wire, radio, fiber optics, infrared, or any other medium capable of handling digital values. There are three areas of data storage in Personal Unit 101:

(1) User Identifier 115 is a number which is uniquely assigned to each human user. The number can be stored in its entirety in User Identifier 15, or split between that storage and a value which is entered by the human user upon demand, i.e., a so-called Personal Identification Number or PIN.

(2) Cryptographic Key Storage 116 is used to hold the keys used by Cryptographic Unit 112 to generate keystream. These keys are selected and loaded into Cryptographic Key Storage 116, when an instance of Personal Unit 101 is assigned to a human user.

(3) Authentication Token Storage 117 is used in the Authentication Token Exchange Protocol, which is a unique feature of the Trusted Path. The working of this protocol is described later.

Cryptographic Unit 112 must be logically compatible with Cryptographic Unit 142 in Secure Computer 104; that is, given proper keying, it must be possible for one to decipher data which has been enciphered on the other.

Personal Unit 101 is envisioned as being implemented by means which enable trust to be placed in it, and packaged in a manner which resists tampering or undetected modification. It is also envisioned to be implemented in a manner which enables it to be readily carried upon the person when not in use.

Workstation Unit

Workstation Unit 102 serves two purposes:

1. To identify a specific Workstation to Secure Computer 104.

2. To logically connect Personal Unit 101 with Untrusted Communications System 103.

Logic and Control Unit 121 controls Communications Unit 128 and accesses Workstation Identifier 125 when required. Workstation Identifier 125 is either a fixed value or is set by some mechanical means from the outside of Workstation Unit 102. It is envisioned that Workstation Unit 102, in this form, is implemented in a manner which enables it to be readily attached to external data ports of existing Workstations (e.g., RS232 data port or so-called "games ports"). Workstation Unit 102 is envisioned as being implemented by means which enable trust to be placed in it, and packaged in a manner which resists tampering or undetected modification. It is also envisioned as being packaged in a manner which permits rapid and reliable determination that it is properly attached to a designated Workstation.

Untrusted Communications System

Untrusted Communications System 103 consists of two logical parts: Workstation 131 and Network 132. Workstation 131 is a conventional workstation, personal computer, desk-top, lap-top, or palm-top computer with an external data port to which Workstation Unit 102 can be attached, and software which enables data to be passed between Workstation Unit 102 and Network 132.

Network 132 is any combination of local and/or wide area networks operating in conjunction with zero or more direct connections to form a data path between Workstation Unit 102 and Secure Computer 104.

Secure Computer

Security Kernel 143 controls access to Critical and Sensitive Data 144 according to a predefined security policy (e.g., based on clearances and classifications or notions of intellectual property or privacy). Logic and Control Unit 141 is a distinguished subsystem of Secure Computer 104 which controls the interaction between Security Kernel 143 and Communication Unit 148. Such subsystems are sometimes called "terminal drivers", "device controllers", or "front-end processors".

Logic and Control Unit 141 is enhanced with Cryptographic Unit 142 and the Authentication Token Exchange Protocol which is described later. Cryptographic Key Storage 146 is used to hold the cryptographic keys required for the operation of Cryptographic Unit 142. Cryptographic Unit 142 must be logically compatible with Cryptographic Unit 112 in Personal Unit 101; that is, given proper keying, it must be possible to decipher data which has been enciphered on the other.

Security Kernel 143 is enhanced to perform the functions of Identification and Authentication, Trusted Command Initiation, and Trusted Review.

Workstations with Encryption

Figure 31:
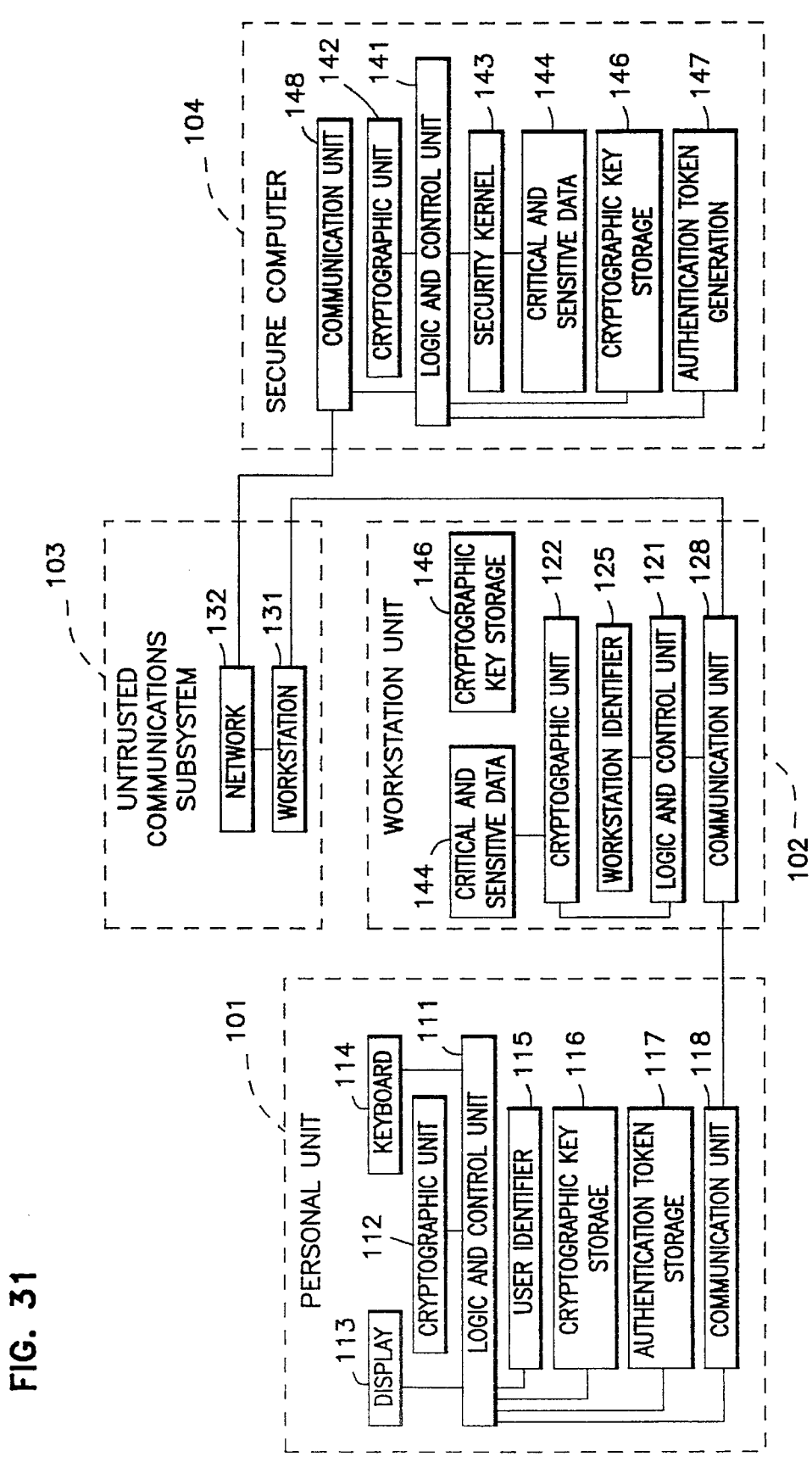
FIG. 31 is a simplified block diagram showing the elements of the Trusted Path when Workstation Unit 102 is used for protection of critical and sensitive data at Workstation 131 as well as authenticated communications between Workstation 131 and Secure Computer 104.

The second form of the Trusted Path is for use in Workstations 102, which have a cryptographic unit installed, and where the Trusted Path facilities are used to authenticate the movement of cryptographic keys from the Secure Computer 104 to the Workstation Unit 102. All operations supported in the previously described form are supported as well. This form of the Trusted Path is illustrated in FIG. 31.

The only difference in Personal Unit 101 in this form of the Trusted Path, is that Cryptographic Key Storage 116 is expanded to hold cryptographic keys which are destined for Cryptographic Unit 122 in Workstation Unit 112.

All of the previous functions of Workstation Unit 102 are supported. In addition, Cryptographic Unit 122 is provided to protect Critical and Sensitive Data 144 resident on fixed and removable media from theft, tampering, or unauthorized access. Cryptographic Unit 122 may or may not be physically or logically identical with Cryptographic Units 112 and 142. The basic functions and operation of Workstation 102 are as described earlier.

Untrusted Communications System 103 is unchanged from the previous form.

All previous functions of Secure Computer 104 are retained and Security Kernel 143 is enhanced to perform the additional functions of Workstation Key Management as described earlier.

General Operation of Trusted Path

Following is a description of the operation of the Trusted Path. A general, overview description of the protocols is given first, followed by a detailed description of the Trusted Path operation and the significance of the protocols.

Any physical communications protocols which are appropriate for the media connecting Communications Units 118 and 128, Communications Unit 128 and Workstation 131, and Network 132 and Communications Unit 148 can be used in the operation of the invention.

Authentication Token Exchange Protocol

The Authentication Token Exchange Protocol is an end-to-end authentication protocol which is used to assure Logic and Control Unit 111 is interacting with an Authentic Logic and Control Unit 141 and vice versa. The protocol operates by "chaining" transactions together in such a fashion that a forged transaction that is entered into the interaction, will be detected the very next time a legitimate transaction is received by Logic and Control Unit 141. The Authentication Token Exchange Protocol is described in detail later.

Cryptographic Checksum Protocol

The Cryptographic Checksum Protocol is an additional protocol which is used to assure transactions between Logic and Control Units have not been tampered with. The Cryptographic Checksum Protocol differs from the Authentication Token Exchange Protocol in that it authenticates single transactions rather than sequences of transactions. Any cryptographic checksum or digital signature algorithm which meets reasonable standards of cryptographic strength can be used in the present invention.

Identification and Authentication Protocol

The Identification and Authentication Protocol is invoked when a user wishes to interact with Secure Computer 104 for some period of time, using the keyboard and display of Workstation 131 and the communications facilities of Network 132. The period of interaction is commonly called a session, the act of initiating a session is commonly called logon, and that of terminating one is commonly called logout. In addition, the Identification and Authentication Protocol may be restarted by Secure Computer 104 when the user requests some critical operation be performed.

The general operation of the Identification and Authentication Protocol, given with general reference to FIGS. 30–33, is as follows:

Step 1
The user establishes a physical communications link between Personal Unit 101 and Workstation Unit 102. If the communications media is wired, this will involve connecting the two units. If it is wireless, it will involve placing the units in proper physical proximity.

Step 2
The user presses an attention key on Personal Unit 101 and optionally enters a Personal Identification Number. Personal Unit 101 obtains Workstation Identifier 125 from Workstation Unit 102, constructs an Identification and Authentication Transaction, and causes it to be transmitted to Secure Computer 104.

Step 3
Secure Computer 104 verifies that this is an authentic Identification and Authentication Transaction and begins a new session or other interaction with the user.

Step 4
Secure Computer 104 constructs an Acknowledgment Transaction and causes it to be sent to Personal Unit 101.

Step 5
Personal Unit 101 verifies that this is an authentic Acknowledgment Transaction and displays this fact to the user.

Individual transactions in the Identification and Authentication Protocol are authenticated by the Cryptographic Checksum Protocol. The fact that a given Identification and Authentication transaction is occurring in the proper context is authenticated by the Authentication Token Exchange Protocol. The Identification and Authentication Protocol is described in detail later.

Trusted Command Protocol

The Trusted Command Protocol is invoked when a user wishes to exercise some privilege or cause Secure Computer 104 to perform some security-relevant operation. The general operation of the Trusted Command Protocol, given with general reference to FIGS. 30–33, is as follows:

Step 1
The user, operating in conjunction with software in Workstation 131, selects the desired command from a menu of possible commands. Selection can be by means of a keyboard, mouse, or other input device that is part of the normal operation of Workstation 131.

Step 2
The software in Workstation 131 transmits the selected command to Personal Unit 101.

Step 3
Personal Unit 101 displays the selected command to the user.

Step 4
The user verifies that the displayed command is that which he or she selected and so signifies on the keyboard of Personal Unit 101.

Step 5
Personal Unit 101 constructs a Trusted Command Transaction and causes it to be transmitted to Secure Computer 104.

Step 6
Secure Computer 104 verifies that this is an authentic Trusted Command Transaction, executes the appropriate command, constructs an Acknowledgment Transaction and displays this fact to the user.

Step 7
Personal Unit 101 verifies that this is an authentic Acknowledgment Transaction and displays this fact to the user.

Individual transactions in the Trusted Command Protocol are authenticated by the Cryptographic Checksum Protocol.

The fact that a given Trusted Command Transaction is occurring in the proper context is authenticated by the Authentication Token Exchange Protocol. The Trusted Command Protocol is described in detail later.

Trusted Review Protocol

The Trusted Review Protocol is used when a user wishes to be assured that an element of critical and sensitive data displayed on Workstation 131 is an accurate and proper representation of the critical and sensitive data as stored in Secure Computer 104. The general operation of the Trusted Review Protocol, given with general reference to FIGS. 30–33, is as follows:

Step 1

The user causes the relevant element of critical and sensitive data to be transmitted from Secure Computer 104 and displayed on Workstation 131.

Step 2

By means of software in Workstation 131, the user selects the portion of critical and sensitive data whose representation is to be verified.

Step 3

Software in Workstation 131 transmits the boundaries of the selected portion to Secure Computer 104.

Step 4

Secure Computer 104 extracts the critical and sensitive data which resides within the selected boundaries, places it in one or more Trusted Review Transactions, and causes it to be transmitted to Personal Unit 101.

Step 5

Personal Unit 101 verifies the authenticity of the Trusted Review Transactions and displays the selected portion of critical and sensitive data on its own display.

Step 6

The user verifies that the values displayed on Personal Unit 101 are identical to those displayed on Workstation 131 and acknowledges this fact using the keyboard of Personal Unit 101.

Step 7

Personal Unit 101 sends an Acknowledgment Transaction to Secure Computer 104.

Individual transactions in the Trusted Review Protocol are authenticated by the Cryptographic Checksum Protocol. The fact that a given Trusted Review Transaction is occurring in the proper context is authenticated by the Authentication Token Exchange Protocol. The Trusted Review Protocol is described in detail later.

Workstation Key Management Protocol

The Workstation Key Management Protocol is a form of the Trusted Command Protocol and is used in the form of the present invention where the critical and sensitive data stored on the individual Workstations is to be protected by cryptography, as for example, in the Data Enclave System 20 described above. The Workstation Key Management Protocol is used to provide authenticated distribution of cryptographic keys from Secure Computer 104 to individual Workstation Units 102. The general operation of the protocol, given with general reference to FIGS. 30–33, is as follows:

Step 1

The user approaches the selected Workstation and initiates the Identification and Authentication Protocol.

Step 2

Workstation Unit 102 identifies the unit of media for which a cryptographic key is required and transmits this identification to Personal Unit 101. The identification is based on the "volume identifier" or other unique designator which is carried on the media. If the media has not been initialized, this information is transmitted to Personal Unit 101.

Step 3

Personal Unit 101 constructs a Key Request Transaction and causes it to be transmitted through Workstation Unit 102 and Subsystem 103 to Secure Computer 104.

Step 4

Secure Computer 104 verifies that this is an authentic Key Request Transaction, selects the appropriate key from a database kept as critical and sensitive data, or creates a new key in the case of uninitialized media, and causes the key to be transmitted to Personal Unit 101.

Step 5

Personal Unit 101 verifies that this is an authentic key, transmits it to the proper Workstation Unit 102, and displays the successful completion of the keying process to the user.

Cryptographic keys are protected during transmission by being enciphered in a Key Encryption Key, for example (Enclave Key 40), which is loaded into each Workstation Unit 102 when they are installed. Individual transactions in the Workstation Key Management Protocol are authenticated by the Cryptographic Checksum Protocol. The fact that a given Key management Transaction is occurring in the proper context is authenticated by the Authentication Token Exchange Protocol.

Thus, the Key Generation and Assignment protocols described with respect to Data Enclave 20 operate substantially the same as the Key Management Protocol with the exception that, in the Key Management Protocol, all interactions between the secure computer and the Workstation are validated by the Authentication Token Exchange Protocol and users are identified using the Identification and Authentication Protocol.

DETAILED OPERATION OF TRUSTED PATH

Those operations which are individually unique to the present invention are described in detail. These are the Authentication Token Exchange Protocol, the Identification and Authentication Protocol, the Trusted Command Protocol, the Trusted Review Protocol, and the Workstation Key Management Protocol.

Authentication Token Exchange Protocol

The Authentication Token Exchange Protocol makes use of two pseudo-random sequences of numbers: a Synchronized Keystream and an Authentication Token Sequence.

Synchronized Keystreams

Figure 32:
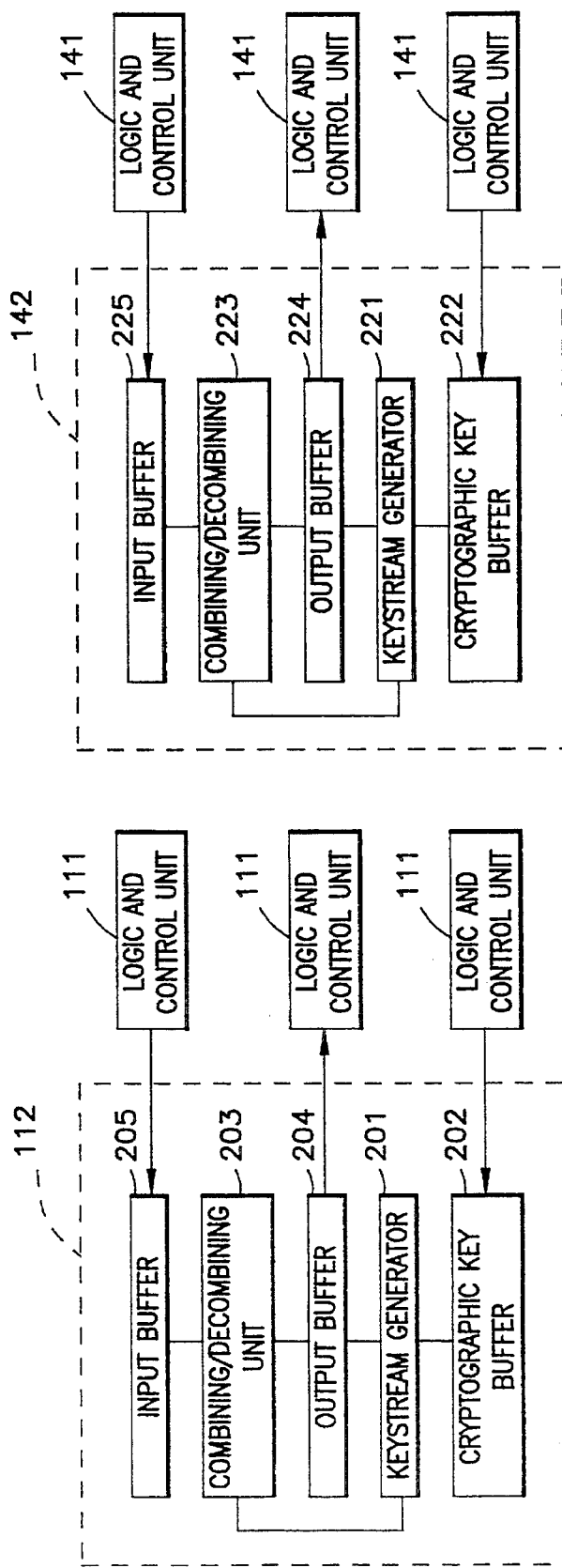
FIG. 32 is a simplified block diagram illustrating the internal logic of Cryptographic Units 112 and 142.

Synchronized Keystreams are produced by Cryptographic Units 112 and 142. The logic of these units is shown in FIG. 32. The actual keystreams are produced by algorithms in Keystream Generators 201 and 221. The sequence of numbers (called "Keystream Elements") in the keystream is a function of the cryptographic key kept in Cryptographic Key Buffers 202 and 222. The manner in which the keystream is generated may differ between the two units, but the resulting keystreams must be identical for the protocol to operate. In particular, a large, precomputed keystream sequence may be stored in Cryptographic Key Buffer 202 or 222 and simply copied by the respective Keystream Generator 201 or 221. (This technique is sometimes called a "one-time pad.") Alternatively, a much shorter cryptographic key may be used to "seed" the mechanism in Keystream Generator 201 or 221, and the keystream produced in small quantities as required.

A low-level synchronization protocol is required to handle cases when transmission errors or other difficulties cause the keystreams to lose synchronization. Such protocols make use of well-known techniques and are not described here.

Encryption is effected by combining the keystream with the data in Combining/Decombining Units 203 and 223. These units may use methods such as "exclusive OR," module addition, or other well-known techniques. Decryption is effected by performing the inverse operation using identical keystream values. It is required for operation of the present invention that not only are the keystreams in Cryptographic Units 112 and 142 identical and synchronized, but that the techniques used for combining keystream with data be identical.

Authentication Token Sequence

The Authentication Token Sequence is produced inside Secure Computer 104 by Authentication Token Generator 147 (FIGS. 30 and 31). The Authentication Tokens are generated in some fashion that makes it computationally infeasible to predict. What the value of the next token in the sequence should be is based on the value of the given token. The nature of the Authentication Token Exchange Protocol is such that no synchronization of the sequence with any other unit is required. Authentication Token Generator 147 also maintains a history file of Authentication Tokens for some preset interval. This history is used to differentiate masquerade attempts from alarms caused by faulty transmission or equipment failures. There is one Authentication Token Sequence for each user or other distinguished operating entity.

Authentication Token Exchange Protocol

Figure 33:
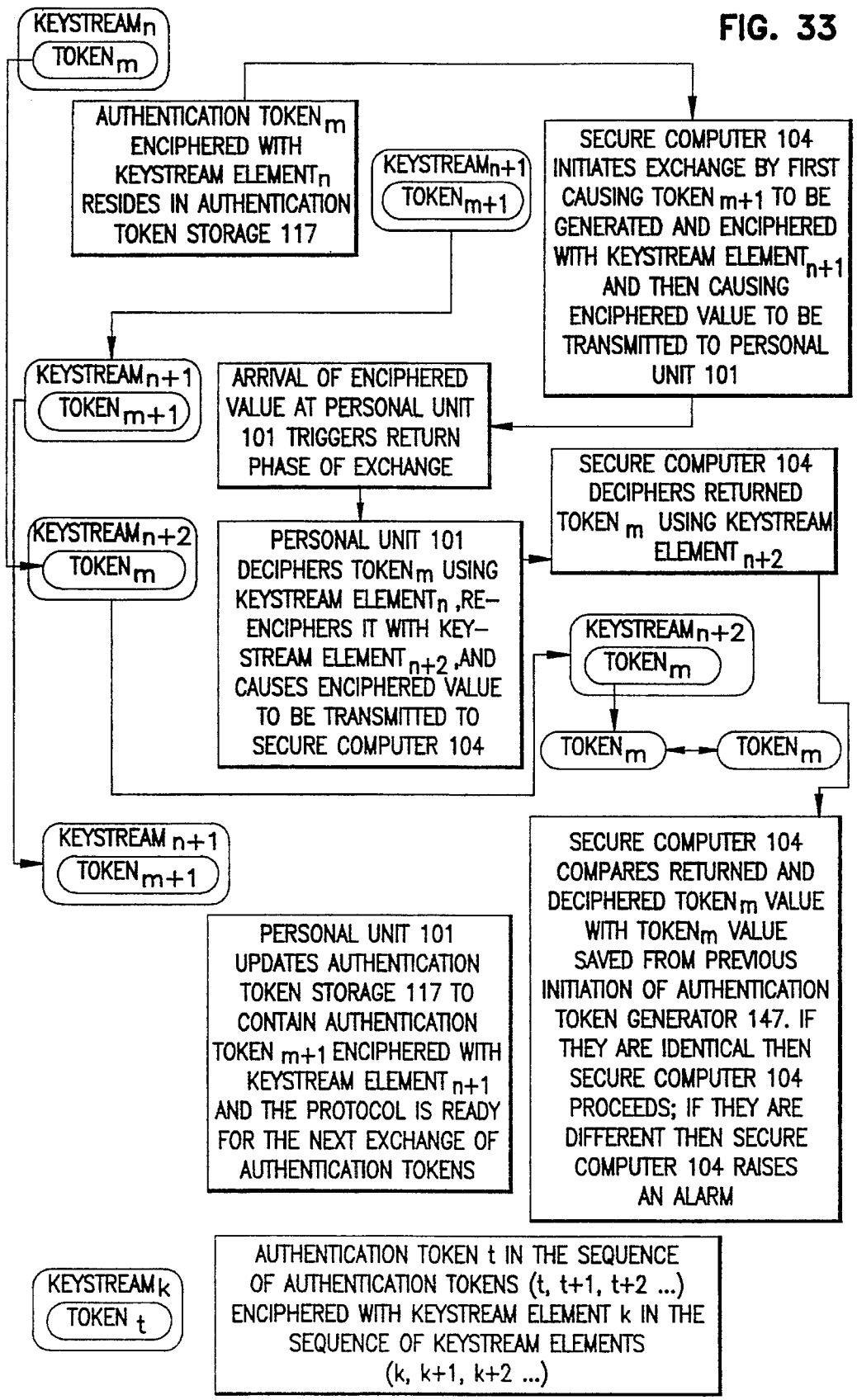
FIG. 33 is a flow diagram detailing the steps used by the Authentication Token Exchange Protocol to "chain" together transactions of other protocols in Trusted Path operation.

The steps used by the Authentication Token Exchange Protocol to "chain" together transactions of other protocols are shown in FIG. 33. The steps described below are keyed to that figure. Note that this protocol is for the generation and validation of tokens which appear as data fields in the transactions of other protocols. The description of each step that follows is also referenced to FIGS. 30–32.

Step 1

The initial state of a protocol cycle is one in which Personal Unit 101 contains a value from some previous transaction and Secure Computer 104 is preparing to initiate a new transaction. The Authentication Token Sequence has just generated Token Number m, and the Synchronized Keystream Sequences have just produced Keystream Element n. In such a case, the Authentication Token Storage 117 will contain a value which is the result of enciphering Token m with Keystream Element n. Keystream Generators 201 and 221 will be ready to generate Keystream Element n+1, and Authentication Token Generator 147 will be ready to generate Token m+1.

Step 2

A single cycle of the Authentication Token Exchange Protocol is initiated when some transaction is to be sent from Secure Computer 104 to Personal Unit 101. In this case, Logic and Control Unit 141 commands Authentication Token Generator 147 to generate a token (in this case m+1) and commands Cryptographic Unit 142 to encipher it (in this case, with Keystream Element n+1). The enciphered token is then transmitted to Personal Unit 101 as a data field in a transaction record. Arrival of the transaction causes Personal Unit 101 to perform the next step in the cycle.

Step 3

Logic and Control Unit 111 causes the value stored in Authentication Token Storage 117 to be deciphered by Cryptographic Unit 112 using Keystream Element n; this yields the true value of Token m. Logic and Control Unit 111 then immediately commands Cryptographic Unit 112 to re-encipher Token m using Keystream Element n+2. The enciphered value is then returned to Secure Computer 104 in whatever transaction is used to "echo" or acknowledge the transaction sent from Secure Computer 104 to Personal Unit 101 in Step 2.

Step 4

Logic and Control Unit 141 then causes the incoming enciphered value to be deciphered by Cryptographic Unit 142 using Keystream Element n+2. This yields the value of the putative Token m which has cycled from Secure Computer 104 to Personal Unit 101 and back again.

Step 5

The putative Token m value is then compared by Logic and Control Unit 141 with the value that has been retained by Authentication Token Generator 147. If the values are the same, the Logic and Control Unit 141 is assured that the incoming transaction was properly "chained" to an outgoing one and is not erroneous or forged. If the values are not the same, Logic and Control Unit 141 invokes the low-level synchronization protocol to cause retransmit of the records. If some preset number of transmissions fails to yield an authenticated "chaining" then the Logic and Control Unit 141 raises an alarm.

Step 6

Simultaneously with Step 5, Logic and Control Unit 111 in Personal Unit 101 updates Authentication Token Storage 117 with the new value, which is Token m+1 enciphered with Keystream Element n+1. At this point the protocol cycle has completed and the protocol is back in its initial state awaiting the start of a new cycle.

The low-level synchronization protocol may require that Authentication Token Storage Unit 147 keep a "window" of old values, so that a period of time exists in which a previous value can be retransmitted to Secure Computer 104 in cases where the comparison described in Step 5 fails.

Identification and Authentication Protocol

The Identification and Authentication Protocol operation is identical for both forms of the present invention. The description that follows is referenced to FIGS. 30 and 31.

Initiation of Protocol

The protocol is initiated when a user first establishes a communications link between Personal Unit 101 and Workstation Unit 102, when a user initiates an "attention" signal by pressing a key on Keyboard 114, or when a demand for user authentication is made by Secure Computer 104.

If the protocol was initiated from Personal Unit 101, an Initiation Transaction is constructed by Logic and Control Unit 111 consisting of the following elements:

(1) A distinguished value identifying this as an Initiation Transaction.

(2) A value which will enable Logic and Control Unit 141 to reply to the transaction (e.g., a network address).

(3) User Identifier 115, enciphered with a keystream which is reserved for this purpose.

(4) A value provided by the Cryptographic Checksum Protocol which serves to validate the value and association of the above elements.

Authentication Demand Transaction

Upon receipt of the Initiation Transaction, or upon demand by Security Kernel 143 for user authentication, Logic and Control Unit 141 constructs an Authentication Demand Transaction and transmits it to Logic and Control Unit 111. This transaction consists of the following elements:

(1) A distinguished value identifying this as an Authentication Demand Transaction.

(2) An enciphered Authentication Token as described in Step 2 of the Authentication Token Exchange Protocol. If this transaction is in response to an Initiation Transaction, the User Identifier 115 in that transaction will be deciphered and used to select the proper sequence of Authentication Tokens. If this transaction is in response to a demand from Security Kernel 143, the user identifier (and therefore the denotation of the proper Token Sequence) will be included in the demand.

3. A value from the Cryptographic Checksum Protocol which serves to authenticate the value and association of the above elements.

Authentication Response Transaction

Upon receipt of this transaction, Logic and Control Unit 111 notifies the user by means of Display 113. If required, user enters a Personal Identification Number or other value or measurement which serves to identify the user. Logic and Control Unit 111 communicates with Logic and Control Unit 121 and obtains from it Workstation Identifier 125. Logic and Control Unit 111 then constructs and sends to Logic and Control Unit 141 an Authentication Response Transaction which consists of the following elements:

(1) A distinguished value identifying this as an Authentication Response Transaction.

(2) The Workstation Identifier 125, enciphered with a keystream reserved for this purpose.

(3) The User Identifier 115, optionally supplemented with Personal Identification Number or other personal data, and enciphered with a keystream reserved for this purpose.

(4) An enciphered return Authentication Token as described in Step 3 of Authentication Token Exchange Protocol.

(5) A value from the Cryptographic Checksum Protocol which serves to authenticate the value and association of the above elements.

Upon receipt of this transaction, Logic and Control Unit 141 deciphers Workstation Identifier 125 and User Identifier 115, performs the operations described in Steps 4 and 5 of the Authentication Token Exchange Protocol, and if validated, notifies Security Kernel 143 that the denoted user interacting from the denoted Workstation has been authenticated. If not validated, Logic and Control Unit 141 notifies Security Kernel 143 that an invalid logon attempt has occurred and appropriate response should be made.

Acknowledgment Transaction

If the validation succeeds, Logic and Control Unit 141 constructs and sends to Logic and Control Unit 111 an Acknowledgment Transaction which consists of the following elements:

(1) A distinguished value identifying this as an Acknowledgment Transaction.

(2) The Workstation Identifier 125 and User Identifier 115, enciphered with the next element of the keystream reserved for this purpose.

(3) A value from the Cryptographic Checksum Protocol which serves to authenticate the value and association of the above elements.

Validation of Response

Upon receipt of this transaction, Logic and Control Unit 111 performs Step 6 of the Authentication Token Exchange Protocol, notifies the user by means of Display 113 that the identification and authentication process is complete, and sends a transaction to Workstation 131 through Communications Units 118 and 128 that causes communications between Workstation 131 and Secure Computer 104 to be initiated in the case of logon, or to be continued in the case of an identification demand from Secure Computer 104 in the middle of a session.

Trusted Command Protocol

The Trusted Command Protocol operation is identical for both forms of the present invention. The description that follows is referenced to FIGS. 30 and 31.

The protocol is initiated when a user selects a privileged command when interacting with Workstation 131. The privileged nature of the command is recognized by Security Kernel 143 and it notifies Logic and Control Unit 141 to start the protocol for the selected privileged command.

User Confirmation Demand Transaction

Logic and Control Unit 141 constructs and sends to Logic and Control Unit 111 a User Confirmation Demand Transaction which consists of the following elements:

(1) A distinguished value identifying this as a User Confirmation Demand Transaction.

(2) An enciphered Authentication Token as described in Step 2 of the Authentication Token Exchange Protocol.

(3) A description or denotation of the privileged command and the relevant parameters formatted, so it may be displayed on Display 113 of Personal Unit 101.

(4) A value from the Cryptographic Checksum Protocol which serves to authenticate the value and association of the above elements.

User Response Transaction

Upon receipt of this transaction, Logic and Control Unit 111 displays the description or denotation of the privileged command on Display 113. The user visually checks that the description as displayed is of the command whose selection initiated the protocol, and notifies Logic and Control Unit 111 through Keyboard 114, whether the selection of the command is confirmed or denied. Upon receipt of this notification, Logic and Control Unit 111 constructs a User Response Transaction which consists of the following elements:

(1) A distinguished value identifying this as a User Response Transaction.

(2) An indication of whether the command selection is confirmed or denied, enciphered using a keystream reserved for this purpose.

(3) An enciphered return Authentication Token as described in Step 3 of Authentication Token Exchange Protocol.

(4) A value from the Cryptographic Checksum Protocol which serves to authenticate the value and association of the above elements.

Immediately subsequent to the sending of this transaction, Logic and Control Unit 111 performs Step 6 of the Authentication Token Exchange Protocol.

Upon receipt of the User Response Transaction, Logic and Control Unit 141 deciphers the confirm/deny indicator and performs Steps 4 and 5 of the Authentication Token Exchange protocol. Logic and Control Unit 141 passes the confirm/deny indicator to Security Kernel 143. If confirm, the command is executed and Logic and Control Unit is so notified. If deny, Security Kernel 143 takes appropriate action such as retry or alarm.

Acknowledgment Transaction

If the command is invoked, Logic and Control Unit 141 constructs and sends to Logic and Control Unit 111 an Acknowledgment Transaction which consists of the following elements:

(1) A distinguished value identifying this as an Acknowledgment Transaction.

(2) An enciphered Authentication Token as described in Step 2 of the Authentication Token Exchange Protocol.

(3) A value from the Cryptographic Checksum Protocol which serves to authenticate the value and association of the above element.

Notification Complete Transaction

Upon receipt of this transaction, Logic and Control Unit 111 displays the acknowledgment on Display 113. Logic and Control Unit 111 then constructs and sends to Logic and Control Unit 141, a Notification Complete Transaction which consist of the following elements:

(1) A distinguished value identifying this as a Notification Complete Transaction.

(2) An enciphered return Authentication Token as described in Step 3 of Authentication Token Exchange Protocol.

(3) A value from the Cryptographic Checksum Protocol which serves to authenticate the value and association of the above elements.

Immediately subsequent to the sending of this transaction, Logic and Control Unit 111 performs Step 6 of the Authentication Token Exchange Protocol.

Upon receipt of this transaction, Logic and Control Unit 141 performs Steps 4 and 5 of the Authentication Token Exchange Protocol and communicates to Security Kernel 143 that the user has been notified.

Trusted Review Protocol

The Trusted Review Protocol operation is identical for both forms of the present invention. The description that follows is referenced to FIGS. 30 and 31.

The protocol is initiated when a user invokes a Trusted Review Command from Workstation 131. Security Kernel 143 recognizes this command and displays, subject to the restrictions of security policy, a window of information on its screen using the conventions of graphical or other user interfaces. Within this window, Security Kernel 143 also displays a review subwindow whose dimensions are such that all the data displayed on it can be identically displayed on Display 113 of Personal Unit 101. The position of the review subwindow can be moved within the main window using the keyboard, mouse, or other input device of Workstation 131. This arrangement is shown in FIG. 34.

User Review Demand Transaction

When the user is satisfied that the review subwindow 134' is positioned over the portion of critical and sensitive data to be reviewed, he or she notifies Security Kernel 143 by means of the keyboard or other input device on Workstation 131. Security Kernel 143 copies the portion of critical and sensitive data to be reviewed from Critical and Sensitive Data 144 and sends it to Logic and Control Unit 141. Logic and Control Unit 141 then constructs and sends to Logic and Control Unit 111 a User Review Demand Transaction which consists of the following elements:

(1) A distinguished value identifying this as a User Review Demand Transaction.

(2) An enciphered Authentication Token as described in Step 2 of the Authentication Token Exchange Protocol.

(3) The portion of critical and sensitive data formatted, so it may be displayed on Display 113 of Personal Unit 101.

(4) A value from the Cryptographic Checksum Protocol which serves to authenticate the value and association of the above elements.

User Response Transaction

Upon receipt of this transaction, Logic and Control Unit 111 displays the portion of critical and sensitive data on Display 113. The user visually checks that the portion as displayed, is identical to that shown on the review subwindow, and notifies Logic and Control Unit 111 through Keyboard 114 whether the review is confirmed or denied. Upon receipt of this notification, Logic and Control Unit 111 constructs a User Response Transaction which consists of the following elements:

(1) A distinguished value identifying this as a User Response Transaction.

(2) An indication of whether the review is confirmed or denied, enciphered using a keystream reserved for this purpose.

(3) An enciphered return Authentication Token as described in Step 3 of Authentication Token Exchange Protocol.

(4) A value from the Cryptographic Checksum Protocol which serves to authenticate the value and association of the above elements.

Immediately subsequent to the sending of this transaction, Logic and Control Unit 111 performs Step 6 of the Authentication Token Exchange Protocol.

Upon receipt of the User Response Transaction, Logic and Control Unit 141 deciphers the confirm/deny indicator and performs Steps 4 and 5 of the Authentication Token Exchange Protocol. Logic and Control Unit 141 passes the confirm/deny indicator to Security Kernel 143. If confirm, processing proceeds and Logic and Control Unit 141 is so notified. If deny, Security Kernel 143 takes appropriate action such as retry or alarm.

Acknowledgment Transaction

If the command is invoked, Logic and Control Unit 141 constructs and sends to Logic and Control Unit 111 an Acknowledgment Transaction which consists of the following elements:

(1) A distinguished value identifying this as an Acknowledgment Transaction.

(2) An enciphered Authentication Token as described in Step 2 of the Authentication Token Exchange Protocol.

(3) A value from the Cryptographic Checksum Protocol which serves to authenticate the value and association of the above elements.

Notification Complete Transaction

Upon receipt of this transaction, Logic and Control Unit 111 displays the acknowledgment on Display 113. Logic and Control Unit 111 then constructs a Notification Complete Transaction which consists of the following elements:

(1) A distinguished value identifying this as a Notification Complete Transaction.

(2) An enciphered return Authentication Token as described in Step 3 of Authentication Token Exchange Protocol.

(3) A value from the Cryptographic Checksum Protocol which serves to authenticate the value and association of the above elements.

Immediately subsequent to the sending of this transaction, Logic and Control Unit 111 performs Step 6 of the Authentication Token Exchange Protocol.

Upon receipt of this transaction, Logic and Control Unit 141 performs Steps 4 and 5 of the Authentication Token Exchange Protocol and communicates to Security Kernel 143 that the user has been notified.

Advantages of Trusted Path

Centralized Detection of Security Alarms

The protocols of the invention are arranged so that all security alarms are raised at Secure Computer 104 and there is no user responsibility for responding to an alarm. This feature is an improvement over traditional cryptographic Checksum and other means which display alarms to users and require them to notify the proper authorities, in that it permits the invention to provide security for users who may be in physical locations where such notification is not possible.

Robustness

If an attacker obtains an actual Personal Unit 101 or its logical equivalent, and obtains through analysis or subversion of personnel the keystream used in the Authentication Token Exchange Protocol, the protocol allows him a "window of opportunity" for masquerade which is terminated the very next time the legitimate user and Personal Unit 101 interacts with Secure Computer 104. This is because each interaction moves the sequence of Authentication Tokens inside Secure Computer 104, and this movement cannot be influenced from the outside. (If Secure Computer 104 is compromised, then all data is lost, anyway). The operation performed by the masquerading attacker will cause a mismatch in the return Token when the legitimate user attempts an interaction, and this mismatch will be detected at Secure Computer 104.

This robustness enables the user of weaker cryptographic algorithms or keys in environments where it is not safe or desirable to transport or use high-grade cryptography.

Positive Detection of Attack

The Authentication Token Exchange Protocol is superior to traditional methods which rely on cryptographic checksums, in that it can positively differentiate between alarms raised by communications failures and those raised by deliberate attempts to compromise security. This capability is granted by the Authentication Token sequence. If a mismatch in Tokens is detected in Step 5 of the Authentication Token Exchange Protocol, then the Token sequence can be searched backward to see if the returned Token matches exactly some earlier value. If it does, then Secure Computer 104 is assured, to the strength of the algorithm that randomizes the Tokens, that the alarm was raised by an attack. In addition, Secure Computer 104 knows that the keystream used in the Authentication Token Exchange Protocol has been compromised, and can identify the exact interaction where the compromise occurred.

Positive Determination of Security Boundaries

The elements of the invention provide physical and verifiable indications of where the security boundaries of Secure Computer 104 are located.

Operational Advantages

Independence of Communications Means

The protocols in this invention operate at Layer 5, 6, and 7 of the ISO standard for communications protocols. This means that they are independent of the nature of topology of the network which connects Workstation 131 to Secure Computer 104. All prior means for achieving Trusted Path have depended, on a greater or lesser degree, on the nature or topology of this network.

Minimal Intrusiveness

The elements of the invention are either free-standing units, parts of an already distinguished secure computer, or devices which attach to existing interfaces to commercial workstations. The only modification required to a commercial workstation is a software modification so that data can pass from Workstation Unit 2 across the network to Secure Computer 104. No security reliance is placed on this modification, so that it can be rapidly and economically made to the software of a wide variety of commercial units.

Low Cost

The elements of the invention are such that they can be constructed of readily available commercial technology.

ALTERNATE EMBODIMENT OF DATA ENCLAVE SYSTEM

Figure 35:
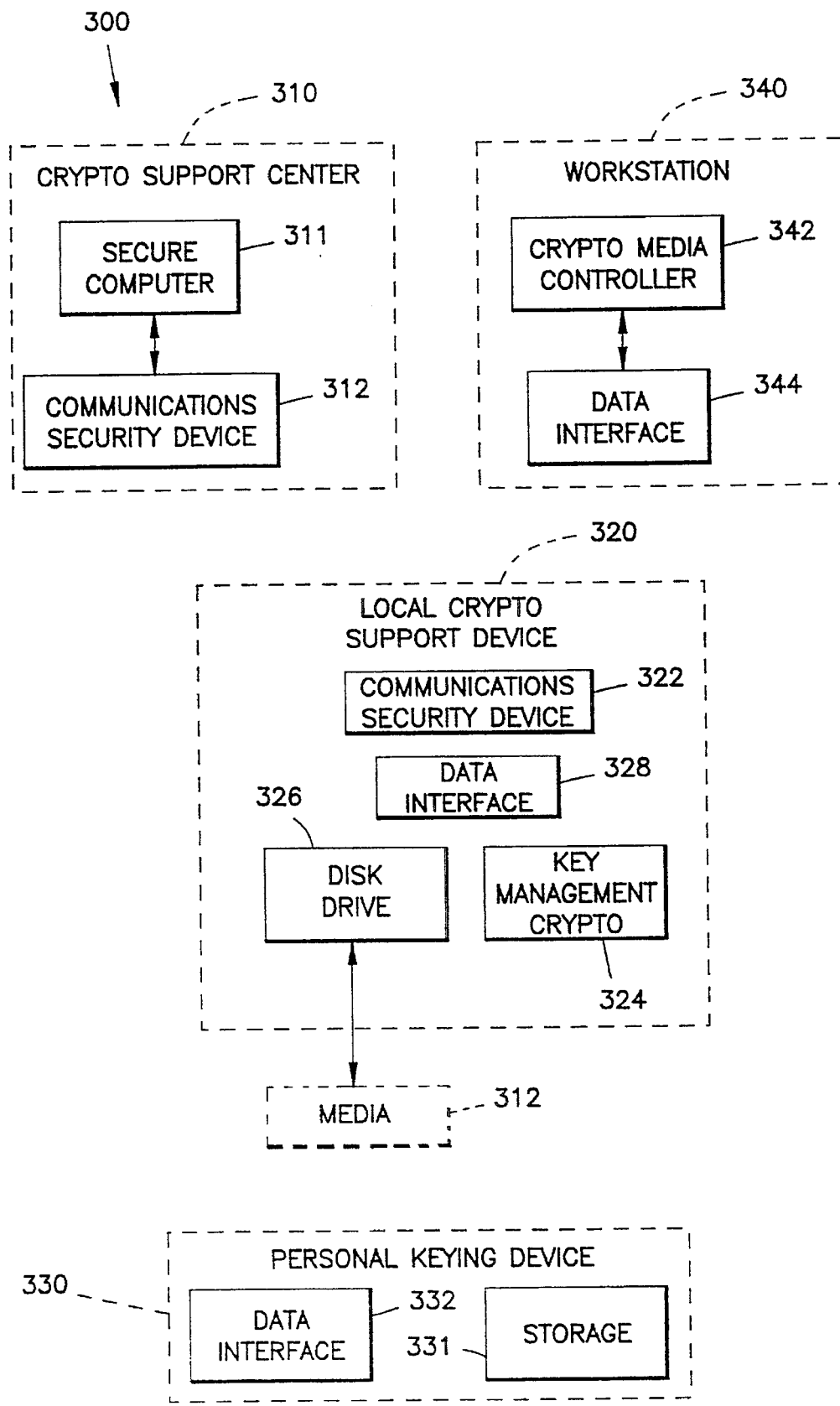
FIG. 35 shows an alternate embodiment of the Data Enclave system.
Figure 36:
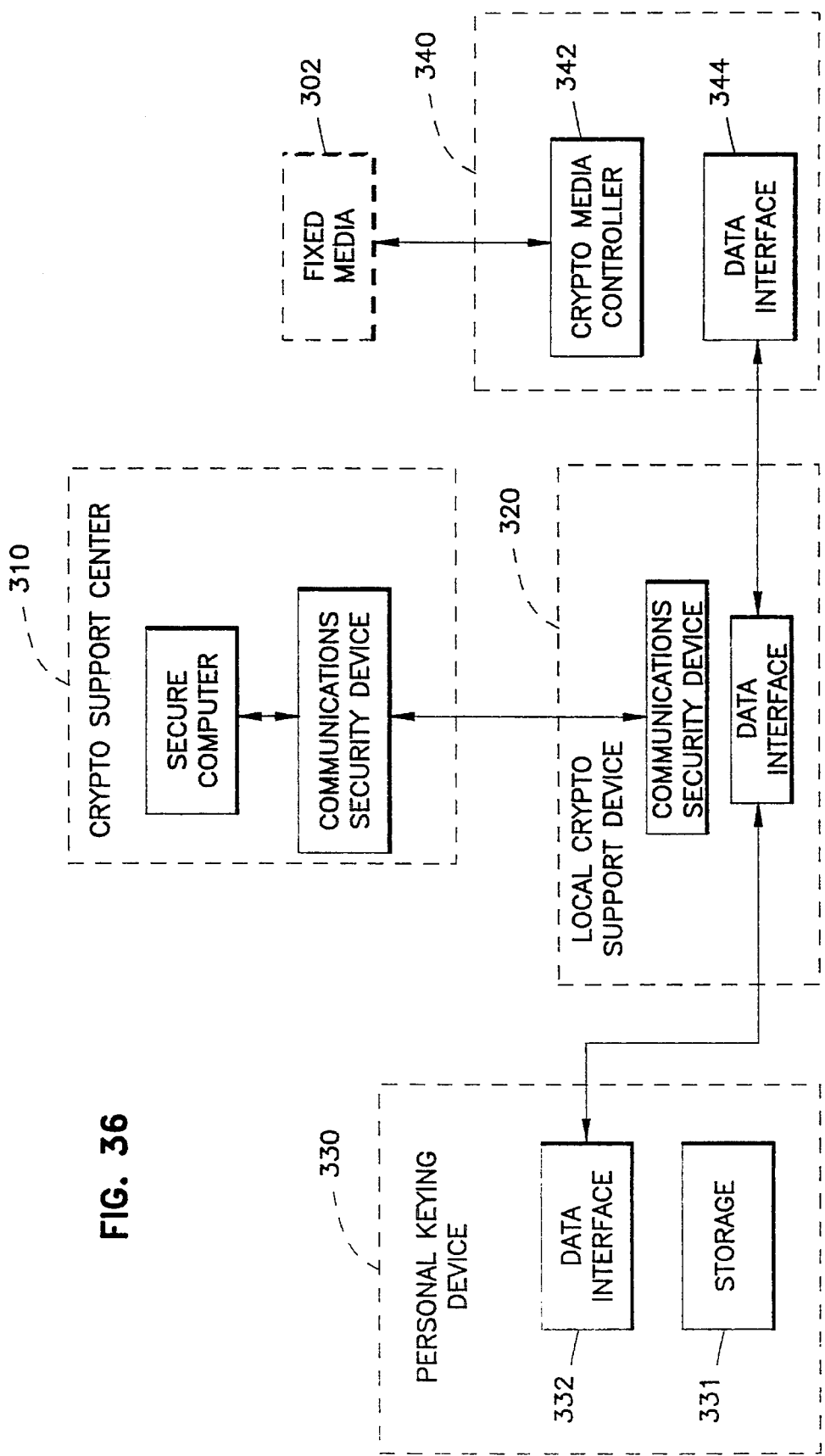
FIG. 36 shows the configuration for initializing fixed media according to the alternate embodiment of FIG. 35.
Figure 37:
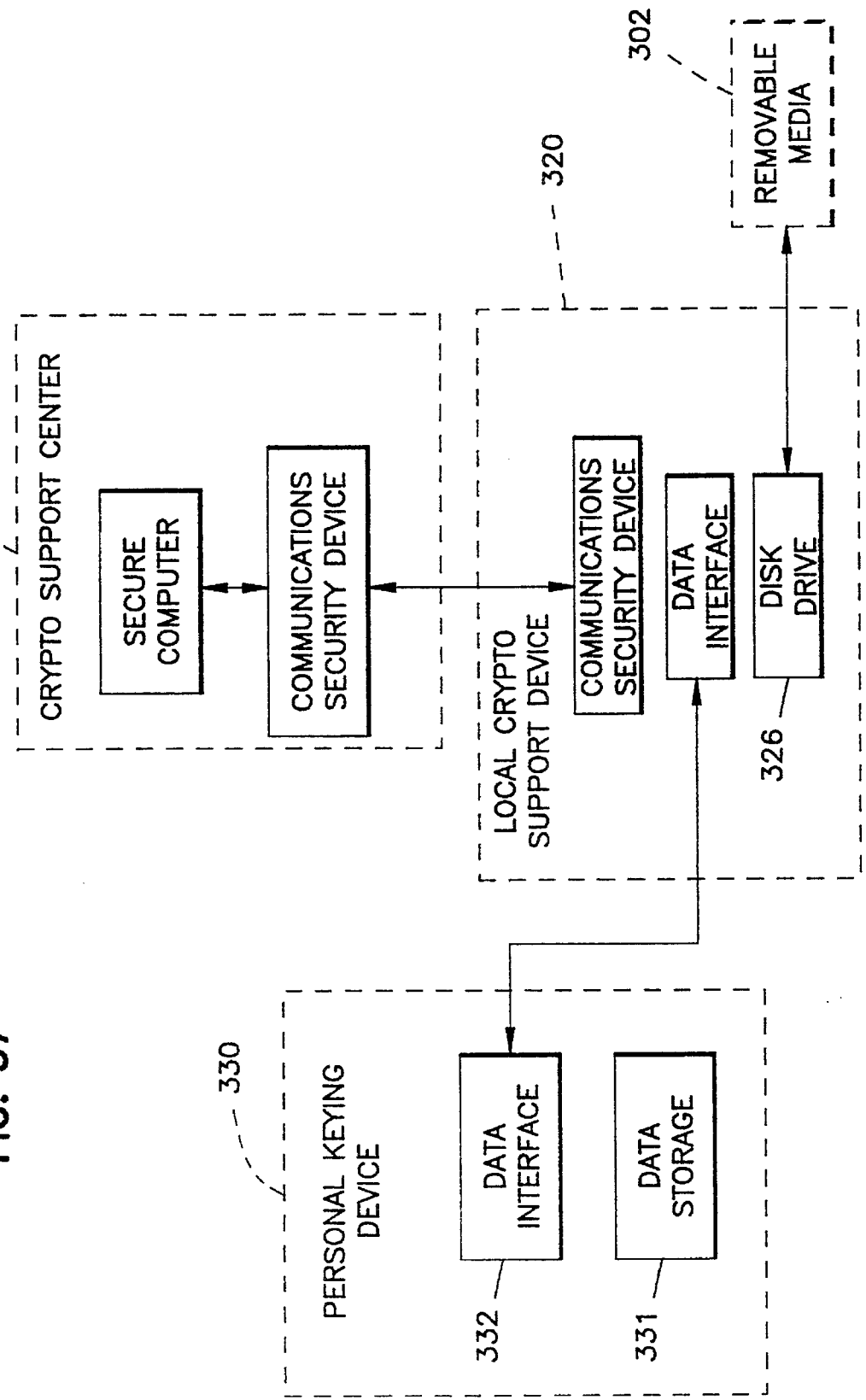
FIG. 37 shows the configuration for initializing removable media according to the alternate embodiment of FIG. 35.

An alternate embodiment of the Data Enclave System 20 is shown in FIGS. 35, 36 and 37. Alternate embodiment 300 provides for operation of the Data Enclave System in a non-networked environment.

Data Elements

The data elements of the alternate embodiment 300 correspond to those described with reference to embodiment 20.

Processing Elements

Crypto Support Center

A Crypto Support Center 310 is provided for each organization or set of organizations. The Crypto Support Center 310 is used for archival storage and distribution of cryptographic keys. Crypto Support Center 310 is permanently installed in a secure area, and includes a Secure Computer 311 and a Communications Security Device 312. Secure Computer 311 may be of generally the same design as Security Server 24 as described and illustrated with reference to embodiment 20. However, there is no requirement that the Secure Computer 311 be networked to the work stations 340 within the organization.

Local Crypto Support Device

There is at least one local Cryrpto Support Device 320 for each organization. Each local Crypto Support Device 320 is portable, for example, lap-top computer size. Preferably, local Crypto Support Devices 320 are equipped with theft detection circuitry, such as that used to deter shoplifting. Local Crypto Support Devices 320 are used in key distribution and are equipped with a Communications Security Device 322 that is compatible with the Communication Device 312 in Crypto Support Center 310. Local Crypto Support Device 320 includes a Key Management Crypto 324 which functions substantially the same as the Key Management Crypto 70 described with reference to the embodiment 20 of the data enclave system, insofar as media initialization, key generation and key assignment are concerned. Crypto Support Devices 320 further include a disk drive 326, which may be used to read and write removable media 302, and a data interface 328, which may be coupled to a Crypto Media Controller in a Workstation 340. The interface can either be wired or wireless (for example, radio infra-red).

Personal Keying Device

Each user is issued a Personal Keying Device 330 of the same design as Personal Keying Device 30 described above with reference to embodiment 20 of the Data Enclave System. Personal Keying Device 330 is used for key insertion and individual authentication. Personal Keying Device 330 includes electronic storage 331, a key pad, a display and a Data Transfer Interface 332, which is compatible with the Data Transfer Interface in the local Crypto support device 320. Personal Keying Devices 330 may also be equipped with theft detection circuitry.

Crypto Media Controller

Each work station 340 operating within the enclave 300 includes a Crypto Media Controller 342 of the same design as Crypto Media Controller 26, with the exception that Crypto Media Controller 342 does not include logic and functions for media initialization and key generation, or key assignment for already initialized media. Crypto Media Controller 342 further includes a Data Interface 344 compatible with Data Interface 328 in the Local Crypto Support Device 320.

OPERATION OF ALTERNATE EMBODIMENT 300

Alternate embodiment 300 is similar in many respects to embodiment 20, except that Local Crypto Support Device 320 and Crypto Support Center 310 perform certain functions performed by Crypto Media Controller 26 and Security Server 24, respectively, embodiment 20. Namely, those functions described in Steps 1–13 of the Media Initialization and Key Generation and the Key Assignment process (for initialized media) Steps 1–14 of embodiment 20. In addition, the Local Area Network 12 link used in embodiment 20 is replaced with the secure connection established between Communications Security Devices 312 and 322 in the Local Crypto Support Device 320 and Crypto Support Center 310.

Media Initialization and Key Assignment

The following description of the media initialization and key assignment operation refers to FIGS. 36 and 37.

An individual brings together a blank unit of physical media 302, his or her Personal Keying Device 330, and the appropriate Local Crypto Support Device 320. If the media is fixed, Personal Keying Device 330 and local Crypto support device 320 are brought to the Workstation 340 containing the fixed media 302. As shown in FIG. 36, data interfaces are then established between Personal Keying Device 330 and Local Crypto Support Device 320 on the one hand and in between Local Crypto Support Device 320 and the Crypto Media Controller 342 for the fixed media on the other. Once these interfaces are established, a secure link is made between Local Crypto Support Device 320 and Crypto Support Center 310 using the Communication Security Devices 312 and 322. The Trusted Path Protocol of the present invention may be used to establish a secure link.

If the media 302 is removable, the media 302 is brought to the Local Crypto Support Device 320, where it can be read and written using Disk Drive 326. This configuration is shown in FIG. 37.

The individual desiring access to Media 302 then enters his or her PIN 58 into Personal Keying Device 330 which transmits it to Local Crypto Support Device 320. Local Crypto Support Device 320 extracts the encrypted User UID 56 from Personal Keying Device 330 and decrypts it using the Enclave Key 50.

Local Crypto Support Device 320 then initiates a secure connection to the Crypto Support Center 310 and transmits the User UID 56 to it.

Local Crypto Support Device 320 and the Crypto Support Center 310, with the optional aid of authorized individuals, generate a Media UID 54, Media Key 52, and Access Vector 60 for use of the media 302. At the end of this process, the Media UID 54, Media Key 52, User UID 56, and Access Vector 60 are archived together at the Crypto Support Center 310 and stored temporarily in Local Crypto Support Device 320.

Local Crypto Support Device 320 then writes the Media UID 54 to an appropriate location on Media 302 (e.g., Volume Label). It combines the User UID 56, Enclave Key 50, and PIN 58 to form a key with which it enciphers the Media Key/Access Vector pair 62. It uses the Media UID 54 to index storage 332 of Personal Keying Device 330 and stores the enciphered pair 62 in the appropriate location.

At this point, the initialization is complete. Media 302 can be identified and the individual's Personal Keying Device 330 contains a Media Key 52 which can only be used by an individual who has physical possession of that Personal Keying Device 330, knows that individual's PIN 50, and has Media 302 controlled by a Crypto Media Controller 342, containing the Enclave Key.

Keying of Devices

An individual establishes a data transfer interface between his or her Personal Keying Device 330 and any Crypto Media Controller 342 containing the Enclave Key, and between that Crypto Media Controller 342 and the Media 302 the individual desires to access. If the media 302 is removable, this will involve placing the unit of media 302 into the appropriate device (e.g. diskette drive) or the Workstation 340. From this point on, the alternate embodiment 300 operates in the same manner as the first described Data Enclave embodiment 20, as set forth in Steps 1–10 under the heading "Keying of Devices."

Key Assignment for Already Initialized Media

Key assignment is performed in substantially the same fashion as Media Initialization and Key Generation, insofar as the configuration and interaction of the Personal Keying Device 330, Workstation 340, Local Crypto Support Device 330 and Support Center 310 interact to generate a Media Key/Access Vector pair 91 for the already initialized media 302 by reference to the archived Media Key 42 for the media.

The present invention is to be limited only in accordance with the scope of the appended claims, since others skilled in the art may devise other embodiments still within the limits of the claims. The above-described detailed architectures are not meant to be limiting, and other equivalent forms may be substituted if desired.

What is claimed is:

1. A data enclave for securing data carried on physical units of fixed and removable media in a network including a server and one or more workstations, one or more of the workstations including the physical units of fixed media, comprising:

protected storage in the server and in each of the workstations;

a crypto media controller in each Workstation that can be used to read the fixed media and the removable media;

a personal keying device assigned to each user in the enclave;

an enclave key, a copy held in the protected storage in the server and in each of the workstations and used to protect other keys stored or transmitted on the network;

a personal identification number (PIN) for each user in the enclave;

an access vector associated with each media key to form media key/access vector pairs, the pairs stored in the personal keying devices, and used to represent the possible conditions of access to the data encrypted on the media for the user assigned to the personal keying device holding the media key/access vector pair or pairs;

the media key/access vector pairs stored in the personal keying devices enciphered with a combined key including the user's PIN and the enclave key;

device attributes assigned to each Workstation, and used to represent the security attributes of the workstations; and each crypto media controller including logic for (i) reading a unit of media using the media key received from the personal keying device of the user seeking access to the data, (ii) decrypting a media key/access vector pair received from a personal keying device using the enclave key stored in the controller and the user PIN entered by a user in the personal keying device used by the user seeking access to the data, (iii) decrypting the data on the media using the media key, and (iv) restricting access to the decrypted data based on the access vector and the device attributes for the Workstation from which access is attempted.

2. A data enclave method for securing data carried on physical units of fixed and removable media in a network including a server and one or more workstations, one or more of the workstations including the physical units of fixed media, comprising the steps of:

(a) providing protected storage in the server and in each of the workstations;

(b) providing a crypto media controller in each Workstation that can be used to read the fixed media and the removable media;

(c) providing a personal keying device assigned to each user in the enclave;

(d) providing an enclave key and storing a copy in the protected storage in the server and in each of the workstations and using it to protect other keys stored or transmitted on the network;

(e) providing each user in the enclave a personal identification number (PIN);

(f) providing an access vector associated with each media key to form media key/access vector pairs, storing the pairs in the personal keying devices, and using them to represent the possible conditions of access to the data encrypted on the media for the user assigned to the personal keying device holding the media key/access vector pair or pairs;

storing the media key/access vector pairs in the personal keying devices enciphered with a combined key including the user's PIN and the enclave key;

providing device attributes assigned for each Workstation to represent the security attributes of the workstations; and using the crypto media controller for (i) reading a unit of media using the media key received from the personal keying device of the user seeking access to the data, (ii) decrypting a media key/access vector pair received from a personal keying device using the enclave key stored in the controller and the user PIN entered by a user in the personal keying device used by the user seeking access to the data, (iii) decrypting the data on the media using the media key, and (iv) restricting access to the decrypted data based on the access vector and the device attributes for the Workstation from which access is attempted.

3. A data enclave for securing data carried on physical units of fixed and removable media in a network including a server and one or more workstations, one or more of the workstations including the physical units of fixed media, comprising:

protected storage in the server and in each of the workstations;

a crypto media controller in each Workstation that can be used to read the fixed media and the removable media;

a personal keying device assigned to each user in the enclave;

an enclave key, a copy held in the protected storage in the server and in each of the workstations and used to protect other keys stored or transmitted on the network;

a personal identification number (PIN) for each user in the enclave;

a user unique identifier (user UID) assigned to each user in the enclave and stored in the user's personal keying device encrypted with the enclave key;

user attributes associated with each user to which a user UID has been assigned, and used to represent the privileges and other security related information that pertains to that user;

a media key for each unit of media, and used to encrypt and protect data carried on the media, the media keys stored in the personal keying devices;

a media unique identifier (media UID) for each unit of media, stored on the media, and used to identify the corresponding media key for the unit of media stored in a personal keying device, and to identify media attributes assigned to the unit of media;

media attributes associated with each unit of media to which a media UID has been assigned, and used to represent the sensitivity or other security related information that may pertain to the data carried on that unit of media;

an access vector associated with each media key to form media key/access vector pairs, stored in the personal keying devices, and used to represent the possible conditions of access to the data encrypted on the media for the user assigned to the personal keying device holding the media key/access vector pair or pairs, each access vector formed using the corresponding media attributes and user attributes, and a set of access rules;

the media key/access vector pairs stored in the personal keying devices enciphered with a combined key including the user's UID, the user's PIN and the enclave key;

device attributes assigned to each Workstation, and used to represent the security attributes of the workstations;

each crypto media controller including access control logic for restricting access to the data on the media based on the user's PIN, the access vector and the device attributes for the Workstation from which access is attempted.

4. A system according to claim 3 further comprising:

key management crypto logic in each crypto media controller for (i) receiving a requesting user's PIN from a personal keying device, (ii) receiving an encrypted user UID from the personal keying device and decrypting the user UID using the enclave key, and (iii) forming a first packet including the requesting user's PIN, the user UID and a request for initialization of a new unit of media, the request including the media attributes for the new unit of media;

key management crypto logic in the server for decrypting the first packet using the enclave key stored in the server;

storage search logic in the server for (i) reading a user attribute data base stored in the server using the user UID as an index, (ii) returning a pass value if the requesting user's PIN received in the first packet matches a valid PIN stored in the user attribute data base, (iii) aborting the request for initialization if the requesting user's PIN in not valid, (iv) extracting the media attributes from the request and commanding a media attribute data base stored in the server to make an entry for the new unit of media, and to create a new media UID for the new unit of media, and (v) indexing the user attribute data base with the user UID to extract the set of security attributes pertaining to the requesting user and passing the security attributes to security policy logic in the server;

the security policy logic for accepting the media attributes and the requesting user's security attributes and, using a set of rules and/or under the direction of a system administrator, computing a new access vector which defines limits on the access the requesting user will have to the new unit of media;

the key management crypto in the server also for (i) generating, with the optional aid of a system administrator, a new media key for the new unit of media, and (ii) and enciphering the new media key/access vector pair formed with the new media key and new access vector with a combined key including the user UID, the user PIN and the enclave key, to form a second packet;

the storage search logic also for storing the enciphered second packet in a crypto key data base stored in the server, the second packet indexed according to the requesting user's user UID and the new media UID;

the server further including logic for sending the new media UID and the second packet to the Workstation from which the first packet was received; and the crypto media controller including storage search logic for (i) receiving the new media UID and writing it to an appropriate location on the new unit of media and (ii) storing the second packet containing the new media key/access vector pair in the personal keying device attached to the Workstation using the new media UID as an index.

5. A system according to claim 3 further comprising:

key management crypto logic in each crypto media controller for (i) receiving a requesting user's PIN from a personal keying device, (ii) receiving an encrypted user UID from the personal keying device and decrypting the user UID using the enclave key, and (iii) reading the media UID off an initialized unit of media and searching the personal keying device for a media key/access vector pair for the initialized unit of media for the requesting user using the user's PIN as an index, and (iv) if no pair is found generating a request for a key assignment;

the key management crypto logic further for (i) forming a first packet including the requesting user's PIN and user UID, the media UID for the initialized unit of media, and the request for key assignment, (ii) encrypting the first packet with the enclave key, and (iii) sending the packet to the security server over the network;

key management crypto logic in the server for decrypting the first packet using the enclave key stored in the server to obtain the requesting user's PIN and user UID, and the media UID and the request;

storage search logic in the security server for (i) reading a user attribute data base stored in the server using the user UID as an index, (ii) returning a pass value if the requesting user's PIN received in the first packet matches a valid PIN stored in the user attribute data base, (iii) aborting the request for initialization set forth in the first packet if the requesting user's PIN in not valid, (iv) reading the user attribute data base using the user's PIN as an index and extracting the security attributes of the requesting user, and (v) passing the security attributes to security policy logic in the server;

the security policy logic receiving the security attributes and computing a new access vector which defines limits on the access the user may have to the initialized unit of media, the new access vector computed using a set of rules and/or with the intervention of a system administrator;

the storage search logic also for (i) finding an enciphered key packet in a crypto key data base held in the security server which has been previously stored and which contains the media key for the initialized unit of media, (ii) when a packet is found extracting the media key from it, and (iii) forming a new media key/access vector pair with the extracted media key and the new access vector, and a new key packet including the new media key/access vector pair, the user UID, and the media UID, and placing the new key packet in the crypto key data base for archival purposes;

the crypto key logic also for enciphering the new media key/access vector pair with a combined key including the user UID, the user's PIN, and the enclave key, and transmitting the enciphered packet along the network to the crypto media controller; and the crypto media controller using the media UID as an index to store the new media key/access vector pair in the personal keying device from which the user's PIN was entered whereby the personal keying device contains a media key which can only be used by someone who has physical possession of that personal keying device, knows the user PIN associated with the media key, and has physical possession of the unit of media controlled by a crypto media controller containing the enclave key, the access of the user further being restricted by the access vector paired with the media key.

6. A system according to claim 3 further comprising:

the crypto media controller also for (i) receiving a user PIN from a personal keying device from a user seeking access to an initialized unit of media under control of the crypto media controller;

storage search logic in the crypto media controller for (i) reading the initialized unit of media and extracting the media UID, (ii) searching the storage in the personal keying device and extracting the enciphered media key/access vector pair for the media UID and passing it to a key management crypto in the crypto media controller;

the key management crypto for (i) fetching the user UID from the personal keying device and deciphering it using the enclave key, (ii) combining the user UID, the user PIN, and the enclave key to form a combined key to decrypt the media key/access vector pair, and passing the extracted media key to a data crypto and the access vector to the access control logic;

the data crypto for deciphering data on a unit of media using the media key and passing it to the access control logic, the data deciphered in response to a read or write request for the data by the Workstation;

the access control logic for controlling whether the desired mode of access is permitted based on the access vector and the device attributes contained within the crypto media controller, and aborting the attempted access to the data if the access is not permitted and otherwise permitting the access whereby data is transferred to a Workstation for processing; and the crypto media controller including logic for causing a complete reset of the crypto media controller and requiring the keying process to be started from the beginning in the event that the personal keying device is uncoupled or the unit of media is removed from the Workstation.

7. A data enclave method for securing data carried on physical units of fixed and removable media in a network including a server and one or more workstations, one or more of the workstations including the physical units of fixed media, comprising the steps of:

(a) providing protected storage in the server and in each of the workstations;

(b) providing a crypto media controller in each Workstation and using it to read the fixed media and the removable media;

(c) providing a personal keying device for each user in the enclave;

(d) providing an enclave key, a copy held in the protected storage in the server and in each of the workstations, and using it to protect other keys stored or transmitted on the network;

(e) providing a personal identification number (PIN) for each user in the enclave;

(f) providing a user unique identifier (user UID) for each user in the enclave and storing it in the user's personal keying device encrypted with the enclave key;

(g) providing user attributes for each user to which a user UID has been assigned, and using them represent the privileges and other security related information that pertains to each user;

(h) providing a media key for each unit of media, and using it to encrypt and protect data carried on the media, and storing the media keys in the personal keying devices;

(i) providing a media unique identifier (media UID) for each unit of media, and storing it on the associated media, and using them to identify the corresponding media key for the unit of media stored in a personal keying device, and to identify media attributes assigned to the unit of media;

(j) providing media attributes associated with each unit of media to which a media UID has been assigned, and using them to represent the sensitivity or other security related information that may pertain to the data carried on the units of media;

(k) providing an access vector associated with each media key to form media key/access vector pairs, storing them in the personal keying devices, and using them to represent the possible conditions of access to the data encrypted on the media for the user assigned to the personal keying device holding the media key/access vector pair or pairs, and forming the access vector using the corresponding media attributes and user attributes, and a set of access rules;

(l) storing the media key/access vector pairs in the personal keying devices enciphered with a combined key including the user's UID, the user's PIN and the enclave key;

(m) providing device attributes for each Workstation, and using them to represent the security attributes of the workstations; and (n) providing access control logic in each crypto media controller for restricting access to the data on the media based on the user's PIN, the access vector and the device attributes for the Workstation from which access is attempted.

8. A method according to claim 7 further comprising the steps of:

(a) providing key management crypto logic in each crypto media controller for (i) receiving a requesting user's PIN from a personal keying device, (ii) receiving an encrypted user UID from the personal keying device and decrypting the user UID using the enclave key, and (iii) forming a first packet including the requesting user's PIN, the user UID and a request for initialization of a new unit of media, the request including the media attributes for the new unit of media;

(b) providing key management crypto logic in the server for decrypting the first packet using the enclave key stored in the server;

(c) providing storage search logic in the server for (i) reading a user attribute data base stored in the server using the user UID as an index, (ii) returning a pass value if the requesting user's PIN received in the first packet matches a valid PIN stored in the user attribute data base, (iii) aborting the request for initialization if the requesting user's PIN in not valid, (iv) extracting the media attributes from the request and commanding a media attribute data base stored in the server to make an entry for the new unit of media, and to create a new media UID for the new unit of media, and (v) indexing the user attribute data base with the user UID to extract the set of security attributes pertaining to the requesting user and passing the security attributes to security policy logic in the server;

(d) the security policy logic accepting the media attributes and the requesting user's security attributes and, using a set of rules and/or under the direction of a system administrator, computing a new access vector which defines limits on the access the requesting user will have to the new unit of media;

(e) the key management crypto in the server also (i) generating, with the optional aid of a system administrator, a new media key for the new unit of media, and (ii) and enciphering the new media key/access vector pair formed with the new media key and new access vector with a combined key including the user UID, the user PIN and the enclave key, to form a second packet;

(f) the storage search logic also storing the enciphered second packet in a crypto key data base stored in the server, the second packet indexed according to the requesting user's user UID and the new media UID;

(g) providing further logic for sending the new media UID and the second packet to the Workstation from which the first packet was received; and (h) providing storage search logic in the crypto media controller for (i) receiving the new media UID and writing it to an appropriate location on the new unit of media and (ii) storing the second packet containing the new media key/access vector pair in the personal keying device attached to the Workstation using the new media UID as an index.

9. A method according to claim 7 further comprising the steps of:

(a) providing key management crypto logic in each crypto media controller for (i) receiving a requesting user's PIN from a personal keying device, (ii) receiving an encrypted user UID from the personal keying device and decrypting the user UID using the enclave key, and (iii) reading the media UID off an initialized unit of media and searching the personal keying device for a media key/access vector pair for the initialized unit of media for the requesting user using the user's PIN as an index, and (iv) if no pair is found generating a request for a key assignment;

(b) the key management crypto logic in the workstations further (i) forming a first packet including the requesting user's PIN and user UID, the media UID for the initialized unit of media, and the request for key assignment, (ii) encrypting the first packet with the enclave key, and (iii) sending the packet to the security server over the network;

(c) providing key management crypto logic in the server for decrypting the first packet using the enclave key stored in the server to obtain the requesting user's PIN and user UID, and the media UID and the request;

(d) providing storage search logic in the security server for (i) reading a user attribute data base stored in the server using the user UID as an index, (ii) returning a pass value if the requesting user's PIN received in the first packet matches a valid PIN stored in the user attribute data base, (iii) aborting the request for initialization set forth in the first packet if the requesting user's PIN in not valid, (iv) reading the user attribute data base using the user's PIN as an index and extracting the security attributes of the requesting user, and (v) passing the security attributes to security policy logic in the server;

(f) the security policy logic receiving the security attributes and computing a new access vector which defines limits on the access the user may have to the initialized unit of media, the new access vector computed using a set of rules and/or with the intervention of a system administrator;

(g) the storage search logic also (i) finding an enciphered key packet in a crypto key data base held in the security server which has been previously stored and which contains the media key for the initialized unit of media, (ii) when a packet is found extracting the media key from it, and (iii) forming a new media key/access vector pair with the extracted media key and the new access vector, and a new key packet including the new media key/access vector pair, the user UID, and the media UID, and placing the new key packet in the crypto key data base for archival purposes;

(h) the crypto key logic also enciphering the new media key/access vector pair with a combined key including the user UID, the user's PIN, and the enclave key, and transmitting the enciphered packet along the network to the crypto media controller; and (i) the crypto media controller using the media UID as an index to store the new media key/access vector pair in the personal keying device from which the user's PIN was entered whereby the personal keying device contains a media key which can only be used by someone who has physical possession of that personal keying device, knows the user PIN associated with the media key, and has physical possession of the unit of media controlled by a crypto media controller containing the enclave key, the access of the user further being restricted by the access vector paired with the media key.

10. A method according to claim 7 further comprising the steps of:

(a) the crypto media controller also (i) receiving a user PIN from a personal keying device from a user seeking access to an initialized unit of media under control of the crypto media controller;

(b) providing storage search logic in the crypto media controller for (i) reading the initialized unit of media and extracting the media UID, (ii) searching the storage in the personal keying device and extracting the enciphered media key/access vector pair for the media UID and passing it to a key management crypto in the crypto media controller;

(c) the key management crypto (i) fetching the user UID from the personal keying device and deciphering it using the enclave key, (ii) combining the user UID, the user PIN, and the enclave key to form a combined key to decrypt the media key/access vector pair, and passing the extracted media key to a data crypto and the access vector to the access control logic;

(d) the data crypto deciphering data on a unit of media using the media key and passing it to the access control logic, the data deciphered in response to a read or write request for the data by the Workstation;

(e) the access control logic controlling whether the desired mode of access is permitted based on the access vector and the device attributes contained within the crypto media controller, and aborting the attempted access to the data if the access is not permitted and otherwise permitting the access whereby data is transferred to a Workstation for processing; and (f) providing logic in the crypto media controller for causing a complete reset of the crypto media controller and requiring the keying process to be started from the beginning in the event that the personal keying device is uncoupled or the unit of media is removed from the Workstation.

11. A trusted path system for communication between a Workstation and a secure computer over a untrusted communication medium, comprising;

a logic and control unit in the Workstation and in the secure computer;

an end-to-end authentication token exchange protocol used to assure the logic and control unit in the Workstation is communicating with an authentic logic and control unit in the secure computer, and vice versa;

the token exchange protocol operating by chaining transactions together so that a forged transaction entered into the interaction between Workstation and secure computer is detected the very next time a legitimate transaction is received by a logic and control unit;

a cryptographic checksum protocol used to assure transactions between the logic and control units have not been tampered with, the checksum protocol authenticating single transactions between the Workstation and the secure computer rather than sequences of transactions; and an identification and authentication protocol invoked when a user wishes to interact with the secure computer for some period of time, using the keyboard and display of the Workstation and the untrusted communications medium, the period of interaction being a session, and the act of initiating a session called logon, and that of terminating one is called logout.

* * * * *